US011644966B2

(12) United States Patent
Dakin et al.

(10) Patent No.: US 11,644,966 B2
(45) Date of Patent: May 9, 2023

(54) COORDINATION OF STATIC BACKGROUNDS AND RUBBERBANDING

(71) Applicant: Apple Inc., Cupertino, CA (US)

(72) Inventors: Beth Dakin, San Jose, CA (US);
Jonathan Lee, San Francisco, CA (US);
Simon M. Fraser, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/509,563

(22) Filed: Oct. 25, 2021

(65) Prior Publication Data

US 2022/0043551 A1 Feb. 10, 2022

Related U.S. Application Data

(63) Continuation of application No. 17/135,931, filed on Dec. 28, 2020, now Pat. No. 11,157,158, which is a continuation of application No. 14/871,816, filed on Sep. 30, 2015, now abandoned.

(60) Provisional application No. 62/101,346, filed on Jan. 8, 2015.

(51) Int. Cl.
| | |
|---|---|
| *G06F 3/0485* | (2022.01) |
| *G06F 3/0481* | (2022.01) |
| *G06F 3/0488* | (2022.01) |
| *G06F 3/04883* | (2022.01) |
| *G06F 3/04886* | (2022.01) |

(52) U.S. Cl.
CPC .......... *G06F 3/0485* (2013.01); *G06F 3/0481* (2013.01); *G06F 3/0488* (2013.01); *G06F 3/04883* (2013.01); *G06F 3/04886* (2013.01)

(58) Field of Classification Search
None
See application file for complete search history.

(56) References Cited

U.S. PATENT DOCUMENTS

| | | | |
|---|---|---|---|
| 4,455,452 | A | 6/1984 | Schuyler |
| 5,046,434 | A | 9/1991 | Breezer et al. |
| 5,454,960 | A | 10/1995 | Newsom |
| 5,463,725 | A | 10/1995 | Henckel et al. |

(Continued)

FOREIGN PATENT DOCUMENTS

| | | |
|---|---|---|
| AU | 2007283771 A1 | 4/2008 |
| AU | 2008201540 A1 | 6/2008 |

(Continued)

OTHER PUBLICATIONS

A truly Inventive Invention, Dec. 23, 2014, 4 pages.

(Continued)

*Primary Examiner* — Ryan Barrett
(74) *Attorney, Agent, or Firm* — DLA Piper LLP (US)

(57) ABSTRACT

Techniques for coordinating movements of various objects in an electronic document are disclosed. A first-type object remains stationary so that it becomes outside a content boundary of the electronic document, as the content boundary is pulled inside an edge of a window displaying the electronic document. A second-type object remains stationary until the content boundary reaches the edge of the window and then moves along with the scrolled electronic document as the content boundary is pulled inside the edge of the window. A third-type object and a fourth-type object may show different movement behaviors.

33 Claims, 45 Drawing Sheets

(56) References Cited

U.S. PATENT DOCUMENTS

| | | |
|---|---|---|
| 5,634,064 A | 5/1997 | Warnock et al. |
| 5,676,064 A | 10/1997 | Shuert |
| 5,686,940 A | 11/1997 | Kuga |
| 5,901,366 A | 5/1999 | Nakano et al. |
| 6,061,063 A | 5/2000 | Wagner et al. |
| 6,089,371 A | 7/2000 | Lin |
| 6,141,018 A | 10/2000 | Beri et al. |
| 6,356,283 B1 | 3/2002 | Guedalia |
| 6,501,487 B1 | 12/2002 | Taguchi |
| 6,590,595 B1 | 7/2003 | Wagner et al. |
| 6,650,343 B1 | 11/2003 | Fujita et al. |
| 6,664,991 B1 | 12/2003 | Chew et al. |
| 6,677,965 B1 | 1/2004 | Ullmann et al. |
| 6,690,387 B2 | 2/2004 | Zimmerman et al. |
| 6,757,673 B2 | 6/2004 | Makus et al. |
| 6,820,237 B1 | 11/2004 | Abu-Hakima et al. |
| 6,958,749 B2 | 10/2005 | Matsushita et al. |
| 6,985,178 B1 | 1/2006 | Morita et al. |
| 7,152,210 B1 | 12/2006 | Van Den Hoven et al. |
| 7,339,573 B2 | 3/2008 | Andert et al. |
| 7,469,381 B2 | 12/2008 | Ording |
| 7,519,223 B2 | 4/2009 | Dehlin et al. |
| 7,576,732 B2 | 8/2009 | Lii |
| 7,724,242 B2 | 5/2010 | Hillis et al. |
| 7,844,915 B2 | 11/2010 | Platzer et al. |
| 7,890,882 B1 | 2/2011 | Nelson |
| 8,209,606 B2 | 6/2012 | Ording |
| 8,255,798 B2 | 8/2012 | Ording |
| 8,312,371 B2 | 11/2012 | Ording |
| 8,365,090 B2 | 1/2013 | Ording |
| 8,570,277 B2 | 10/2013 | Rekimoto |
| 8,661,363 B2 | 2/2014 | Herz et al. |
| 9,037,995 B2 | 5/2015 | Platzer et al. |
| 9,052,814 B2 | 6/2015 | Ording |
| 9,183,661 B2 | 11/2015 | Platzer et al. |
| 9,378,577 B2 | 6/2016 | Harper et al. |
| 9,448,712 B2 | 9/2016 | Platzer et al. |
| 9,600,352 B2 | 3/2017 | Platzer et al. |
| 9,760,272 B2 | 9/2017 | Platzer et al. |
| 11,157,158 B2 * | 10/2021 | Dakin .................. G06F 3/0485 |
| 2001/0028369 A1 | 10/2001 | Gallo et al. |
| 2002/0025084 A1 | 2/2002 | Yang et al. |
| 2002/0036618 A1 | 3/2002 | Wakai et al. |
| 2002/0093578 A1 | 7/2002 | Kowno et al. |
| 2003/0122787 A1 | 7/2003 | Zimmerman et al. |
| 2003/0174149 A1 | 9/2003 | Fujisaki et al. |
| 2003/0179239 A1 | 9/2003 | Lira et al. |
| 2003/0184525 A1 | 10/2003 | Tsai |
| 2004/0021676 A1 | 2/2004 | Chen et al. |
| 2004/0027398 A1 | 2/2004 | Jaeger |
| 2004/0056880 A1 | 3/2004 | Matsuoka et al. |
| 2004/0100479 A1 | 5/2004 | Nakano et al. |
| 2004/0155888 A1 | 8/2004 | Padgitt et al. |
| 2004/0160419 A1 | 8/2004 | Padgitt |
| 2004/0205624 A1 | 10/2004 | Lui et al. |
| 2004/0252119 A1 | 12/2004 | Hunleth et al. |
| 2005/0001815 A1 | 1/2005 | Tsunoda |
| 2005/0001849 A1 | 1/2005 | Arcas |
| 2005/0012723 A1 | 1/2005 | Pallakoff |
| 2005/0017957 A1 | 1/2005 | Yi |
| 2005/0057524 A1 | 3/2005 | Hill et al. |
| 2005/0062729 A1 | 3/2005 | Hinckley et al. |
| 2005/0088418 A1 | 4/2005 | Nguyen |
| 2005/0099400 A1 | 5/2005 | Lee |
| 2005/0122806 A1 | 6/2005 | Arakawa et al. |
| 2005/0183026 A1 | 8/2005 | Amano et al. |
| 2005/0195373 A1 | 9/2005 | Feigel et al. |
| 2005/0275636 A1 | 12/2005 | Dehlin et al. |
| 2006/0010400 A1 | 1/2006 | Dehlin et al. |
| 2006/0025218 A1 | 2/2006 | Hotta |
| 2006/0026521 A1 | 2/2006 | Hotelling et al. |
| 2006/0028455 A1 | 2/2006 | Hinckley et al. |
| 2006/0034042 A1 | 2/2006 | Hisano et al. |
| 2006/0038796 A1 | 2/2006 | Hinckley et al. |
| 2006/0071949 A1 | 4/2006 | Sakuma et al. |
| 2006/0085764 A1 | 4/2006 | Klementiev et al. |
| 2006/0097991 A1 | 5/2006 | Hotelling et al. |
| 2006/0112335 A1 | 5/2006 | Hofmeister et al. |
| 2006/0136631 A1 | 6/2006 | Eid et al. |
| 2006/0139375 A1 | 6/2006 | Rasmussen et al. |
| 2006/0236263 A1 | 10/2006 | Bathiche et al. |
| 2006/0242607 A1 | 10/2006 | Hudson |
| 2006/0250358 A1 | 11/2006 | Wroblewski |
| 2006/0271870 A1 | 11/2006 | Anwar |
| 2006/0274053 A1 | 12/2006 | Kinouchi |
| 2006/0277454 A1 | 12/2006 | Chen |
| 2006/0279533 A1 | 12/2006 | Hsieh et al. |
| 2006/0288313 A1 | 12/2006 | Hillis |
| 2007/0050732 A1 | 3/2007 | Chapman et al. |
| 2007/0081726 A1 | 4/2007 | Westerman et al. |
| 2007/0087775 A1 | 4/2007 | Richardson et al. |
| 2007/0109277 A1 | 5/2007 | Lira |
| 2007/0136286 A1 | 6/2007 | Webster et al. |
| 2007/0137076 A1 | 6/2007 | Cowden |
| 2007/0146318 A1 | 6/2007 | Juh et al. |
| 2007/0152984 A1 | 7/2007 | Ording et al. |
| 2007/0182743 A1 | 8/2007 | Areas |
| 2007/0188518 A1 | 8/2007 | Vale et al. |
| 2007/0192692 A1 | 8/2007 | Chen et al. |
| 2007/0252821 A1 | 11/2007 | Hollemans et al. |
| 2007/0262964 A1 | 11/2007 | Zotov et al. |
| 2007/0277124 A1 | 11/2007 | Shin et al. |
| 2008/0005703 A1 | 1/2008 | Radivojevic et al. |
| 2008/0048978 A1 | 2/2008 | Trent et al. |
| 2008/0076567 A1 | 3/2008 | Dohta |
| 2008/0104544 A1 | 5/2008 | Collins et al. |
| 2008/0163132 A1 | 7/2008 | Lee et al. |
| 2008/0168384 A1 | 7/2008 | Platzer et al. |
| 2008/0168395 A1 | 7/2008 | Ording et al. |
| 2008/0168404 A1 | 7/2008 | Ording |
| 2008/0231610 A1 | 9/2008 | Hotelling et al. |
| 2008/0284799 A1 | 11/2008 | Hollemans et al. |
| 2009/0049385 A1 | 2/2009 | Blinnikka et al. |
| 2009/0070705 A1 | 3/2009 | Ording |
| 2009/0213086 A1 | 8/2009 | Chae et al. |
| 2009/0259969 A1 | 10/2009 | Pallakoff |
| 2009/0284478 A1 | 11/2009 | De La Torre Baltierra et al. |
| 2009/0295826 A1 | 12/2009 | Good et al. |
| 2010/0083082 A1 | 4/2010 | Lehrian et al. |
| 2010/0325575 A1 | 12/2010 | Platzer et al. |
| 2011/0004830 A1 | 1/2011 | Von Kaenel et al. |
| 2011/0037725 A1 | 2/2011 | Pryor |
| 2011/0078025 A1 | 3/2011 | Shrivastav et al. |
| 2011/0099481 A1 | 4/2011 | Bitonti et al. |
| 2011/0231785 A1 | 9/2011 | Sunday |
| 2011/0270833 A1 | 11/2011 | Von Kaenel et al. |
| 2012/0056840 A1 | 3/2012 | Benko et al. |
| 2012/0200689 A1 | 8/2012 | Friedman et al. |
| 2012/0223971 A1 | 9/2012 | Hillis |
| 2012/0324380 A1 | 12/2012 | Nurmi et al. |
| 2013/0120301 A1 | 5/2013 | Lira |
| 2014/0074717 A1 | 3/2014 | Evans et al. |
| 2014/0181730 A1 | 6/2014 | Briand et al. |
| 2015/0039494 A1 | 2/2015 | Sinton et al. |
| 2015/0121405 A1 | 4/2015 | Ates et al. |
| 2015/0234562 A1 | 8/2015 | Ording |
| 2016/0202865 A1 | 7/2016 | Fraser et al. |
| 2017/0102850 A1 | 4/2017 | Herz et al. |
| 2017/0212674 A1 | 7/2017 | Ording |
| 2018/0011616 A1 | 1/2018 | Platzer et al. |
| 2020/0241741 A1 | 7/2020 | Ording |
| 2020/0257424 A1 | 8/2020 | Platzer et al. |
| 2021/0117061 A1 | 4/2021 | Dakin et al. |
| 2021/0286511 A1 | 9/2021 | Ording |
| 2021/0326016 A1 | 10/2021 | Platzer et al. |
| 2022/0147242 A1 | 5/2022 | Ording |

FOREIGN PATENT DOCUMENTS

| | | |
|---|---|---|
| AU | 2009208103 A1 | 9/2009 |
| CN | 1620642 A | 5/2005 |
| CN | 1695105 A | 11/2005 |
| CN | 2829257 Y | 10/2006 |
| CN | 1975652 A | 6/2007 |

(56) References Cited

FOREIGN PATENT DOCUMENTS

| | | | |
|---|---|---|---|
| EP | 622722 A2 | 11/1994 |
| EP | 0701220 A1 | 3/1996 |
| EP | 536715 B1 | 7/2000 |
| EP | 1517228 A2 | 3/2005 |
| GB | 1517521 A | 7/1978 |
| GB | 2373778 A | 10/2002 |
| JP | 3-271976 A | 12/1991 |
| JP | 8-202281 A | 8/1996 |
| JP | 9-152856 A | 6/1997 |
| JP | 11-126149 A | 5/1999 |
| JP | 11-289484 A | 10/1999 |
| JP | 2000-163031 A | 6/2000 |
| JP | 2002-373312 A | 12/2002 |
| JP | 2003-345491 A | 12/2003 |
| JP | 2005-108211 A | 4/2005 |
| JP | 2006-011862 A | 1/2006 |
| JP | 2006-079312 A | 3/2006 |
| JP | 2008-508601 A | 3/2008 |
| JP | 2014-222527 A | 11/2014 |
| KR | 2001-0013325 A | 2/2001 |
| KR | 10-2001-0040410 A | 5/2001 |
| KR | 10-2003-0016313 A | 2/2003 |
| KR | 10-2003-0088374 A | 11/2003 |
| KR | 10-2006-0014874 A | 2/2006 |
| KR | 10-2006-0085850 A | 7/2006 |
| WO | 1998/55939 A1 | 12/1998 |
| WO | 99/38149 A1 | 7/1999 |
| WO | 02/01338 A1 | 1/2002 |
| WO | 03/060622 A2 | 7/2003 |
| WO | 03/060682 A1 | 7/2003 |
| WO | 03/081458 A1 | 10/2003 |
| WO | 2005/008444 A2 | 1/2005 |
| WO | 2005/052773 A2 | 6/2005 |
| WO | 2006/003591 A2 | 1/2006 |
| WO | 2006/013485 A2 | 2/2006 |
| WO | 2006/020304 A2 | 2/2006 |
| WO | 2006/020305 A2 | 2/2006 |
| WO | 2006/045530 A2 | 5/2006 |

OTHER PUBLICATIONS

Advisory Action received for U.S. Appl. No. 14/624,518, dated Sep. 27, 2016, 3 pages.
Advisory Action received for U.S. Appl. No. 90/012,332, dated Nov. 20, 2013, 10 pages.
*Apple Inc.* Vs. *Samsung Electronics Co. Ltd.*, Case No. 11-CV-01846-LHK, Aug. 9, 2011, 85 pages.
*Apple Inc.* Vs. *Samsung Electronics GmbH*, Jul. 26, 2012, 27 pages.
*Apple Inc.* Vs. *Samsung Electronics GmbH*, Landgericht Mannheim 7. Zivilkammer Beschluss, Feb. 8, 2013, 13 pages.
*Apple* Vs. *Samsung Electronics GmbH*, Landgericht Munchen 1, 21 O 26022/11, Feb. 27, 2012, 16 pages.
Auxiliary request in the Opposition Proceedings against the European Patent No. 08713567.9, filed on Dec. 5, 2014, 77 pages.
Bederson et al., "Photo Mesa 3.1.2 Screen Shots", Windsor Interfaces. Inc., 2004-2006, 5 pages.
Board Opinion received for Chinese Patent Application No. 200880001827.7, dated Apr. 9, 2015, 11 pages.
Butz Andreas, "Expert Statement Regarding European Patent No. 2126678", Sep. 21, 2013, 31 pages.
Communication of the Board of Appeal received for European Patent Application No. 11182963.6, dated Nov. 6, 2020, 10 pages.
Corcoran, "Sticky-Kit", Available at: <http://leafo.net/sticky-kit/>, Dec. 5, 2013, 6 pages.
Corrected Notice of Allowance received for U.S. Appl. No. 14/624,518, dated Feb. 13, 2017, 5 Pages.
Corrected Notice of Allowance received for U.S. Appl. No. 14/624,518, dated Jan. 20, 2017, 5 pages.
Corrected Notice of Allowance received for U.S. Appl. No. 15/483,743, dated Feb. 21, 2020, 5 pages.
Corrected Notice of Allowance received for U.S. Appl. No. 15/665,167, dated Aug. 19, 2019, 2 pages.
Corrected Notice of Allowance received for U.S. Appl. No. 15/665,167, dated Oct. 1, 2019, 2 pages.
Corrected Notice of Allowance received for U.S. Appl. No. 16/685,884, dated Jun. 24, 2020, 2 pages.
Corrected Notice of Allowance received for U.S. Appl. No. 16/685,884, dated Sep. 30, 2020, 2 pages.
Corrected Notice of Allowance received for U.S. Appl. No. 16/794,111, dated Feb. 16, 2021, 4 pages.
Corrected Notice of Allowance received for U.S. Appl. No. 16/794,111, dated Mar. 26, 2021, 4 pages.
Coyier Chris, "Scroll-Then-Fix-Content", Available at: <https://css-tricks.com/scroll-fix-content/>, Sep. 17, 2014, 16 pages.
Decision of Board of Appeal received for European Patent Application No. 11182963.6, dated Feb. 4, 2021, 12 pages.
Decision on Appeal received for European Patent Application No. 08713567.9, dated Sep. 10, 2018, 36 pages.
Decision on Appeal received for Korean Patent Application No. 10-2015-7022918, dated Oct. 29, 2018, 20 pages.
Decision on Appeal received for U.S. Appl. No. 14/871,816, dated Oct. 29, 2020, 16 pages.
Decision on Request for Rehearing received for U.S. Appl. No. 90/012,332, dated Aug. 29, 2019, 16 pages.
Decision to Grant received for European Patent Application No. 08712964.9, dated Apr. 13, 2017, 2 pages.
Decision to Grant received for European Patent Application No. 11182954.5, dated Aug. 10, 2017, 3 pages.
Decision to Grant received for European Patent Application No. 11182959.4, dated Feb. 2, 2017, 3 pages.
Decision to Grant received for European Patent Application No. 17165715.8, dated Feb. 14, 2019, 2 pages.
Decision to Grant received for European Patent Application No. 17186896.1, dated Jan. 23, 2020, 3 pages.
Decision to Grant received for European Patent Application No. 11182962.8, dated Jun. 22, 2017, 3 pages.
Decision to Refuse received for European Patent Application No. 11182963.6, dated Mar. 28, 2017, 17 pages.
Decision to Revoke Patent Received for European Patent Application No. 08713567.9. dated Jun. 23, 2015, 50 pages.
Declaration of Benjamin B. Bederson, *Apple Inc.* vs. *Samsung Electronics Co., Ltd.*, Case No. 11-cv-01846-LHK, Document 165, Filed on Aug. 22, 2011, 12 pages.
Examiner-Initiated Interview Summary received for U.S. Appl. No. 16/685,884, dated May 20, 2020, 3 pages.
Examiner's Answer to Appeal Brief received for U.S. Appl. No. 14/871,816, dated May 2, 2019, 9 pages.
Ex-parte Reexamination Non-Final Communication received for U.S. Appl. No. 90/012,332, mailed on Dec. 19, 2012, 38 pages.
Extended European Search Report received for European Patent Application No. 11182954.5, dated Nov. 29, 2011, 6 pages.
Extended European Search Report received for European Patent Application No. 11182959.4, dated Nov. 30, 2011, 7 pages.
Extended European Search Report received for European Patent Application No. 11182962.8, dated Dec. 1, 2011, 8 pages.
Extended European Search Report received for European Patent Application No. 11182963.6, dated Dec. 1, 2011, 7 pages.
Extended European Search Report received for European Patent Application No. 17186896.1, dated Dec. 15, 2017, 9 pages.
Extended European Search Report received for European Patent Application No. 19154558.1, dated Aug. 16, 2019, 8 pages.
Extended European Search Report received for European Patent Application No. 20212893.0, dated May 3, 2021, 9 pages.
Extended Search Report received for European Patent Application 17165715.8, dated Nov. 29, 2017, 5 pages.
Final Office Action received for U.S. Appl. No. 12/270,815, dated Feb. 14, 2013, dated Feb. 14, 2013, 12 pages.
Final Office Action received for U.S. Appl. No. 14/624,518, dated Jul. 13, 2016, 10 pages.
Fitzpatrick Jason, "Make the Most of Your Multiple Monitors in Windows", Online Available at: https://lifehacker.com/5526025/make-the-most-of-your-multiple-monitors-in-windows-7, Mar. 21, 2014, 11 pages.
Grounds of appeal against revocation of European Patent No. EP 2126678, Nov. 3, 2015, 41 pages.

(56) References Cited

OTHER PUBLICATIONS

Han Jeff, "Jeff Han Demos his Breakthrough Touchscreen", TED, Ideas Worth Spreading, available at: <http://www.ted.com/talks/jeff_han_demos_his_breakthrough_touchscreen.html>, retrieved on May 8, 2012, 12 pages.
Han Jeff, "Talks Jeff Han: Unveiling the Genius of Multi-touch Interface Design", Ted Ideas Worth Spreading, available at <http://www.ted.com/index.php/talks/view/id/65> Retrieved on Dec. 17, 2007, Aug. 2006, 2 pages.
Intention to Grant received for European Patent Application 17165715.8, dated Sep. 26, 2018, 7 pages.
Intention to Grant received for European Patent Application No. 08712964.9, dated Nov. 30, 2016, 7 pages.
Intention to Grant received for European Patent Application No. 11182954.5, dated Mar. 31, 2017, 10 pages.
Intention to Grant received for European Patent Application No. 11182959.4, dated Dec. 9, 2016, 9 pages.
Intention to Grant received for European Patent Application No. 17186896.1, dated Dec. 20, 2019, 6 pages.
Intention to Grant received for European Patent Application No. 17186896.1, dated Jul. 25, 2019, 9 pages.
Intention to Grant received for European Patent Application No. 11182962.8, dated Feb. 6, 2017., 9 Pages.
International Preliminary Report on Patentability received for PCT Patent Application No. PCT/US2005/000089, dated Jun. 18, 2008, 5 pages.
International Preliminary Report on Patentability received for PCT Patent Application No. PCT/US2008/050292, dated Mar. 26, 2013, 17 pages.
International Search Report and Written Opinion received for PCT Patent Application No. PCT/US2005/000089, dated May 31, 2005, 7 pages.
International Search Report and Written Opinion received for PCT Patent Application No. PCT/US2008/050292, dated Sep. 19, 2008, 19 pages.
Invitation to Pay Additional Fees received for PCT Patent Application No. PCT/US2008/050292, dated Jul. 18, 2008, 4 pages.
IOS Security, White Paper, Available online at <https://web.archive.org/web/20150526223200/http://www.apple.com/business/docs/iOS_Security_Guide.pdf>, Apr. 2015, 55 pages.
Iphone, Wikipedia, the free Encyclopedia, retrieved on Aug. 18, 2017, 46 pages.
Karlson et al., "AppLens and LaunchTile: Two Designs for One-Handed Thumb Use on Small Devices", CHI 2005, Papers: Small Devices 1, Apr. 2-7, 2005, pp. 201-210.
Klemmer Scott, "Declaration of Scott Klemmer", in the matter of European Patent No. EP21266788, Nov. 1, 2015, 3 pages.
Koren J., "Including Images in Web Pages", Available online at: http://unsco.org/webworld/infotraining/inline.html, 1998, 4 pages.
Landgericht Dusseldorf Geschftsstelle, Jun. 18, 2014, 2 pages.
Masui et al., "Elastic Graphical Interfaces for Precise Data Manipulation", ACM Conference on Human Factors in Computing Systems (CHI '95), Conference Companion, Apr. 1995, pp. 143-144.
Microsoft Word 2003 Screenshots, 1983-2003, 2 pages.
Minutes of the Oral Proceedings received for European Application No. 08713567.9, mailed on Jun. 29, 2018, 6 pages.
Minutes of the Oral Proceedings received for European Patent Application No. 11182963.6, mailed on Dec. 18, 2020, 4 pages.
*Motorola Mobility Germany GmbH* Vs. *Samsung Electronics GmbH*, Bundespatentgericht, Sep. 26, 2013, 50 pages.
Non-Final Office Action received for U.S. Appl. No. 14/712,637, dated Sep. 23, 2015, 10 pages.
Non-Final Office Action received for U.S. Appl. No. 14/871,816, dated Nov. 20, 2017, 46 pages.
Non-Final Office Action received for U.S. Appl. No. 14/624,518, dated Nov. 23, 2015, 10 pages.
Non-Final Office Action received for U.S. Appl. No. 11/620,717, dated Dec. 29, 2009, dated Dec. 29, 2009, 8 pages.
Non-Final Office Action received for U.S. Appl. No. 11/620,717, dated Jul. 8, 2009, dated Jul. 8, 2009, 6 pages.
Non-Final Office Action received for U.S. Appl. No. 12/270,805, dated Oct. 11, 2011, dated Oct. 11, 2011, 27 pages.
Non-Final Office Action received for U.S. Appl. No. 12/270,807, dated Oct. 11, 2011, dated Oct. 11, 2011, 26 pages.
Non-Final Office Action received for U.S. Appl. No. 12/270,810, dated Oct. 12, 2011, dated Oct. 12, 2011, 12 pages.
Non-Final Office Action received for U.S. Appl. No. 12/270,812, dated May 17, 2012, dated May 17, 2012, 14 pages.
Non-Final Office Action received for U.S. Appl. No. 12/270,812, dated Oct. 13, 2011, dated Oct. 13, 2011, 12 pages.
Non-Final Office Action received for U.S. Appl. No. 12/270,815, dated Aug. 23, 2013, 12 pages.
Non-Final Office Action received for U.S. Appl. No. 12/270,815, dated Jul. 11, 2014, 12 pages.
Non-Final Office Action received for U.S. Appl. No. 12/270,815, dated May 17, 2012, 13 pages.
Non-Final Office Action received for U.S. Appl. No. 12/270,815, dated Oct. 11, 2011, 12 pages.
Non-Final Office Action received for U.S. Appl. No. 12/869,182, dated Jun. 20, 2012, dated Jun. 20, 2012, 6 pages.
Non-Final Office Action received for U.S. Appl. No. 12/869,182, dated Oct. 24, 2011, 7 pages.
Non-Final Office Action received for U.S. Appl. No. 14/189,922, dated Sep. 24, 2014, 7 pages.
Non-Final Office Action received for U.S. Appl. No. 14/871,816, dated Jul. 30, 2018, 46 pages.
Non-Final Office Action received for U.S. Appl. No. 15/269,582, dated Jan. 26, 2017, 5 pages.
Non-Final Office Action received for U.S. Appl. No. 15/483,743, dated Mar. 21, 2019, 10 pages.
Non-Final Office Action received for U.S. Appl. No. 15/665,167, dated Apr. 3, 2019, 5 pages.
Non-Final Office Action received for U.S. Appl. No. 16/794,111, dated Jul. 9, 2020, 6 pages.
Non-Final Office Action received for U.S. Appl. No. 14/624,518, dated Mar. 25, 2016, 8 pages.
Notice of Acceptance received for Australian Patent Application No. 2012200689, dated Jun. 9, 2015, 2 pages.
Notice of Acceptance received for Australian Patent Application No. 2015201905, dated Jan. 13, 2017, 3 pages.
Notice of Acceptance received for Australian Patent Application No. 2017202917, dated Jun. 7, 2019, 3 pages.
Notice of Allowance received for Canadian Patent Application No. 2,759,066, dated Nov. 4, 2014, 1 page.
Notice of Allowance received for Canadian Patent Application No. 2,759,090, dated Jun. 23, 2015, 1 page.
Notice of Allowance received for Canadian Patent Application No. 2,759,091, dated Apr. 8, 2016, 1 page.
Notice of Allowance received for Canadian Patent Application No. 2,890,732, dated Apr. 19, 2017, 1 page.
Notice of Allowance received for Canadian Patent Application No. 2,915,678, dated Dec. 27, 2017, 1 page.
Notice of Allowance received for Canadian Patent Application No. 2,944,195, dated Jun. 27, 2018, 1 page.
Notice of Allowance received for Canadian Patent Application No. 3,028,777, dated Jan. 13, 2021, 1 page.
Notice of Allowance received for Chinese Patent Application No. 201210573107.6, dated Oct. 30, 2017, 3 pages.
Notice of Allowance received for Chinese Patent Application No. 201210570519.4, dated Jan. 20, 2017, 4 pages.
Notice of Allowance received for Chinese Patent Application No. 201310024905.8, dated Jul. 11, 2017, 2 pages.
Notice of Allowance received for Chinese Patent Application No. 201310073437.3, dated May 10, 2016, 4 pages.
Notice of Allowance received for Chinese Patent Application No. 201610079785.5, dated Apr. 27, 2020, 2 pages.
Notice of Allowance received for Japanese Patent Application No. 2013-102576, dated Dec. 8, 2014, 3 pages.
Notice of Allowance received for Japanese Patent Application No. 2014-140817, dated Mar. 31, 2017., 3 pages.
Notice of Allowance received for Japanese Patent Application No. 2017-090133, dated Jul. 27, 2018, 4 pages.

(56) References Cited

OTHER PUBLICATIONS

Notice of Allowance received for Japanese Patent Application No. 2018-158547, dated Jul. 3, 2020, 4 pages.
Notice of Allowance received for Korean Patent Application No. 10-2013-7034633, dated Oct. 31, 2016, 3 pages.
Notice of Allowance received for Korean Patent Application No. 10-2015-7022918, dated Nov. 27, 2018, 4 pages.
Notice of Allowance received for Korean Patent Application No. 10-2017-7002923, dated Feb. 28, 2018, 3 pages.
Notice of Allowance received for Korean Patent Application No. 10-2018-7010593, dated Jan. 30, 2019, 3 pages.
Notice of Allowance received for Korean Patent Application No. 10-2019-7012617, dated May 27, 2020, 3 pages.
Notice of Allowance received for Korean Patent Application No. 10-2020-7024816, dated Nov. 27, 2020, 3 pages.
Notice of Allowance received for U.S. Appl. No. 14/712,637, dated May 12, 2016, 10 pages.
Notice of Allowance received for U.S. Appl. No. 11/620,717, dated Jul. 20, 2010, dated Jul. 20, 2010, 11 pages.
Notice of Allowance received for U.S. Appl. No. 11/956,969, dated Oct. 29, 2008, 6 pages.
Notice of Allowance received for U.S. Appl. No. 12/270,805, dated May 17, 2012, dated May 17, 2012, 14 pages.
Notice of Allowance received for U.S. Appl. No. 12/270,807, dated May 11, 2012, dated May 11, 2012, 12 pages.
Notice of Allowance received for U.S. Appl. No. 12/270,810, dated Jul. 11, 2012, dated Jul. 11, 2012, 17 pages.
Notice of Allowance received for U.S. Appl. No. 12/270,812, dated Sep. 19, 2012, dated Sep. 19, 2012, 20 pages.
Notice of Allowance received for U.S. Appl. No. 12/270,815, dated Jan. 28, 2015, 12 pages.
Notice of Allowance received for U.S. Appl. No. 12/869,182, dated Dec. 12, 2012, dated Dec. 12, 2012, 5 pages.
Notice of Allowance received for U.S. Appl. No. 12/869,182, dated Feb. 23, 2012, 5 pages.
Notice of Allowance received for U.S. Appl. No. 13/867,950, dated Nov. 15, 2013, 7 pages.
Notice of Allowance received for U.S. Appl. No. 14/189,922, dated Apr. 7, 2015, 6 pages.
Notice of Allowance received for U.S. Appl. No. 14/624,518, dated Dec. 30, 2016, 8 pages.
Notice of Allowance received for U.S. Appl. No. 14/712,637, dated Jun. 28, 2016, 2 pages.
Notice of Allowance received for U.S. Appl. No. 15/269,582, dated May 5, 2017, 13 pages.
Notice of Allowance received for U.S. Appl. No. 15/483,743, dated Nov. 18, 2019, 7 pages.
Notice of Allowance received for U.S. Appl. No. 15/665,167, dated Jul. 18, 2019, 13 pages.
Notice of Allowance received for U.S. Appl. No. 16/685,884, dated Jun. 1, 2020, 10 pages.
Notice of Allowance received for U.S. Appl. No. 16/794,111, dated Jan. 22, 2021, 7 pages.
Notice of Allowance received for U.S. Appl. No. 17/135,931, dated Jun. 17, 2021, 8 pages.
Notice of Intent to Issue a Reexam Certificate received for U.S. Appl. No. 90/010,963, dated Jan. 13, 2011, 9 pages.
Notice of Intent to Issue a Reexam Certificate received for U.S. Appl. No. 90/012,304, dated Jun. 12, 2013, 12 pages.
Notice of Intent to Issue Ex Parte Reexamination Certificate received for U.S. Appl. No. 90/012,332, dated Feb. 14, 2020, 7 pages.
Office Action received for Australian Patent Application No. 2012200689, dated Sep. 9, 2013, 3 pages.
Office Action received for Australian Patent Application No. 2015201905, dated May 9, 2016, 3 pages.
Office Action received for Australian Patent Application No. 2017202917, dated Jul. 20, 2018, 3 pages.
Office Action received for Canadian Patent Application No. 2,759,091, dated Oct. 8, 2015, 3 pages.
Office Action received for Canadian Patent Application No. 2,759,066, dated Nov. 4, 2013, 3 pages.
Office Action received for Canadian Patent Application No. 2,759,090, dated Nov. 4, 2013, 3 pages.
Office Action received for Canadian Patent Application No. 2,759,090, dated Oct. 29, 2014, 4 pages.
Office Action Received for Canadian Patent Application No. 2,759,091, dated Oct. 31, 2014, 6 pages.
Office Action received for Canadian Patent Application No. 2,890,732, dated May 12, 2016, 5 pages.
Office Action received for Canadian Patent Application No. 2,915,678, dated Aug. 6, 2018, 4 pages.
Office Action received for Canadian Patent Application No. 2,915,678, dated Aug. 19, 2019, 4 pages.
Office Action received for Canadian Patent Application No. 2,915,678, dated Jan. 23, 2017, 5 pages.
Office Action received for Canadian Patent Application No. 2,915,678, dated Jul. 21, 2020, 5 pages.
Office Action received for Canadian Patent Application No. 2,944,195, dated Jul. 26, 2017, 3 pages.
Office Action received for Canadian Patent Application No. 3,028,777, dated Dec. 30, 2019, 3 pages.
Office Action received for Chinese Patent Application No. 201210570519.4, dated Dec. 23, 2014, 15 pages.
Office Action received for Chinese Patent Application No. 201210570519.4, dated Jul. 6, 2016, 6 pages.
Office Action received for Chinese Patent Application No. 201210570519.4, dated Oct. 23, 2015, 11 pages.
Office Action received for Chinese Patent Application No. 201210570760.7, dated Dec. 2, 2014, 7 pages.
Office Action received for Chinese Patent Application No. 201210573107.6, dated Apr. 21, 2015, 9 pages.
Office Action received for Chinese Patent Application No. 201210573107.6, dated Mar. 3, 2016, 14 pages.
Office Action received for Chinese Patent Application No. 2012105731076, dated Jan. 25, 2017, 10 pages.
Office Action received for Chinese Patent Application No. 201310024905.8 dated Apr. 30, 2015, 21 pages.
Office Action received for Chinese Patent Application No. 201310024905.8, dated Feb. 6, 2016, 9 pages.
Office Action received for Chinese Patent Application No. 201310024905.8, dated Oct. 21, 2016, 12 pages.
Office Action Received for Chinese Patent Application No. 201310073437.3, dated Sep. 2, 2015, 18 pages.
Office Action received for Chinese Patent Application No. 201610079785.5, dated Jun. 13, 2019, 11 pages.
Office Action received for Chinese Patent Application No. 201610079785.5, dated Mar. 5, 2020, 6 pages.
Office Action received for Chinese Patent Application No. 201610079785.5, dated May 31, 2018, 13 pages.
Office Action received for European Application No. 08713567.9, dated Dec. 29, 2009, 5 pages.
Office Action received for European Patent Application No. 08712964.9, dated Jan. 20, 2015, 8 pages.
Office Action received for European Patent Application No. 11182954.5, dated Nov. 19, 2014, 5 pages.
Office Action received for European Patent Application No. 11182959.4, dated Nov. 21, 2014, 3 pages.
Office Action received for European Patent Application No. 11182962.8, dated Nov. 21, 2014, 4 pages.
Office Action received for European Patent Application No. 11182963.6, dated Mar. 15, 2021, 4 pages.
Office Action received for European Patent Application No. 11182963.6, dated Nov. 21, 2014, 4 pages.
Office Action received for European Patent Application No. 17186896.1, dated Oct. 12, 2018, 5 pages.
Office Action Received for Japanese Patent Application No. 2013-102576, dated Mar. 10, 2014, 4 pages.
Office Action received for Japanese Patent Application No. 2017-090133, dated Jan. 22, 2018, 14 pages.
Office Action received for Japanese Patent Application No. 2018-158547, dated Jul. 26, 2019, 7 pages.

(56) References Cited

OTHER PUBLICATIONS

Office Action received for Japanese Patent Application No. 2014-140817, dated Aug. 19, 2016, 8 pages.
Office Action received for Japanese Patent Application No. 2014-140817, dated Oct. 2, 2015, 6 pages.
Office Action received for Korean Patent Application No. 10-2013-7000337, dated Apr. 28, 2014, 7 pages.
Office Action received for Korean Patent Application No. 10-2013-7000337, dated Jun. 25, 2013, 7 pages.
Office Action received for Korean Patent Application No. 10-2013-7034633, dated Apr. 8, 2014, 4 pages.
Office Action received for Korean Patent Application No. 10-2013-7034633, dated Dec. 29, 2015, 10 pages.
Office Action received for Korean Patent Application No. 10-2013-7034633, dated Feb. 24, 2015, 3 pages.
Office Action received for Korean Patent Application No. 10-2015-7022918, dated Nov. 29, 2016, 6 pages.
Office Action received for Korean Patent Application No. 10-2017-7002923, dated Apr. 28, 2017, 5 pages.
Office Action received for Korean Patent Application No. 10-2018-7010593, dated Jul. 11, 2018, 5 pages.
Office Action received for Korean Patent Application No. 10-2019-7012617, dated Jun. 29, 2019, 5 pages.
Office Action received for Korean Patent Application No. 10-2015-7022918, dated Dec. 17, 2015, 7 pages.
Office communication received for the European Patent Application No. 08713567.9, dated Mar. 9, 2015, 4 pages.
Oxford English Dictionary—The Definitive Record of the English Language, Oxford University Press, Jun. 2015, 11 pages.
Record of Oral Hearing received for U.S. Appl. No. 14/871,816, mailed on Sep. 28, 2020, 21 pages.
Reexam Final Office Action received for U.S. Appl. No. 90/012,304, dated Mar. 29, 2013, 87 pages.
Reexam Non-Final Office Action received for U.S. Appl. No. 90/012,304, dated Oct. 15, 2012, 11 pages.
Rubine Deanh, "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.
Statement of appeal for the European Patent Application No. 08713567.9, filed on Mar. 10, 2016, 54 pages.
Summon to attend Oral Proceedings received for European Patent Application No. 08712964.9, mailed on May 12, 2016, 6 pages.
Summons to Attend Oral Proceedings received for European Patent Application No. 08713567.9, mailed on Feb. 27, 2018, 13 pages.
Summons to Attend Oral Proceedings received for European Patent Application No. 11182954.5, mailed on Aug. 12, 2016, 5 pages.
Summons to Attend Oral Proceedings received for European Patent Application No. 11182959.4, mailed on Jun. 23, 2016, 6 pages.
Summons to Attend Oral Proceedings received for European Patent Application No. 11182962.8, mailed on Jul. 4, 2016, 7 pages.
Summons to Attend Oral Proceedings received for European Patent Application No. 11182963.6, mailed on Jul. 14, 2016, 4 pages.
Summons to Attend Oral Proceedings received for European Patent Application No. 11182963.6, mailed on Sep. 17, 2020, 2 pages.
Tidwell Jenifer, "Designing Interfaces", Section 85, magnetism, Nov. 21, 2005, 2 pages.
Notice of Allowance received for U.S. Appl. No. 17/582,692, dated Aug. 17, 2022, 8 pages.
Applicant-Initiated Interview Summary received for U.S. Appl. No. 17/080,737, dated Feb. 11, 2022, 2 pages.
Corrected Notice of Allowance received for U.S. Appl. No. 17/200,672, dated Dec. 13, 2021, 4 pages.
Intention to Grant received for European Patent Application No. 11182963.6, dated Jan. 5, 2022, 8 pages.
Non-Final Office Action received for U.S. Appl. No. 17/080,737, dated Nov. 26, 2021, 10 pages.
Notice of Allowance received for U.S. Appl. No. 17/200,672, dated Nov. 29, 2021, 9 pages.
Notice of Allowance received for U.S. Appl. No. 17/582,692, dated Apr. 29, 2022, 8 pages.
Office Action received for Canadian Patent Application No. 3,111,850, dated Mar. 23, 2022, 3 pages.
Corrected Notice of Allowance received for U.S. Appl. No. 17/582,692, dated May 26, 2022, 4 pages.
Office Action received for Korean Patent Application No. 10-2021-7006176, dated Oct. 7, 2022, 7 pages (3 pages of English Translation and 4 pages of Official Copy).
Corrected Notice of Allowance received for U.S. Appl. No. 17/582,692, dated Jul. 1, 2022, 4 pages.
Malik et al., "Visual Touchpad: A Two-Handed Gestural Input Device", ICMI'04, ACM, Oct. 13-15, 2004, pp. 289-296.
Non-Final Office Action received for U.S. Appl. No. 17/080,737, dated Jul. 12, 2022, 9 pages.
Decision to Grant received for European Patent Application No. 11182963.6, dated May 12, 2022, 3 pages.
Decision to Grant received for German Patent Application No. 112008000144.8, dated Sep. 28, 2021, 11 pages (1 page of English Translation and 10 pages of Official Copy).
Notice of Allowance received for Japanese Patent Application No. 2020-131857, dated Oct. 1, 2021, 4 pages (1 page of English Translation and 3 pages of Official Copy).
Office Action received for Canadian Patent Application No. 2,915,678, dated Aug. 31, 2021, 6 pages.
Office Action received for European Patent Application No. 19154558.1, dated Aug. 2, 2021, 8 pages.
Summons to Oral Proceedings received for German Patent Application No. 112008000144.8, mailed on Jul. 31, 2021, 2 pages (1 page of English Translation and 1 page of Official Copy).
Summons to Oral Proceedings received for German Patent Application No. 112008000144.8, mailed on Jun. 11, 2021, 18 pages (4 pages of English Translation and 14 pages of Official Copy).

* cited by examiner

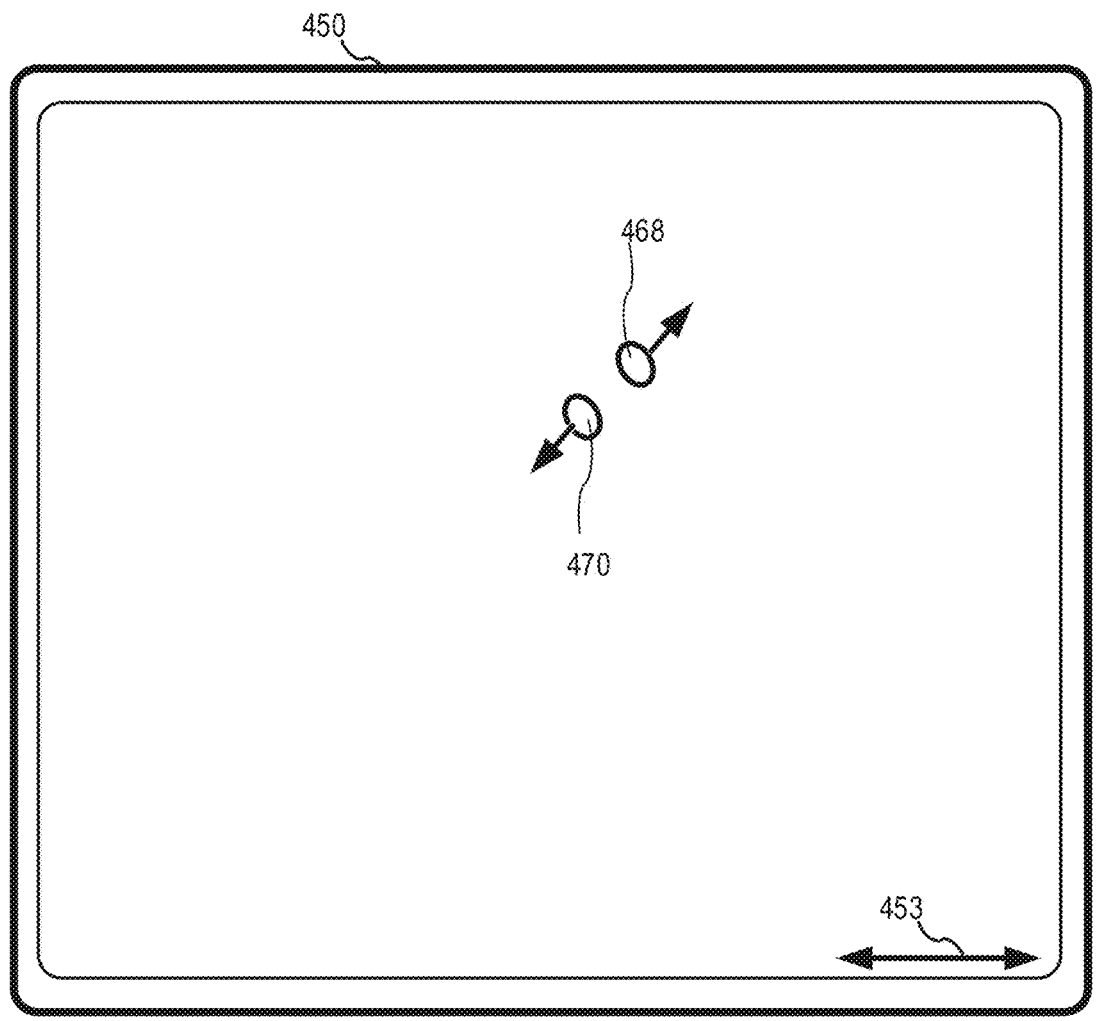
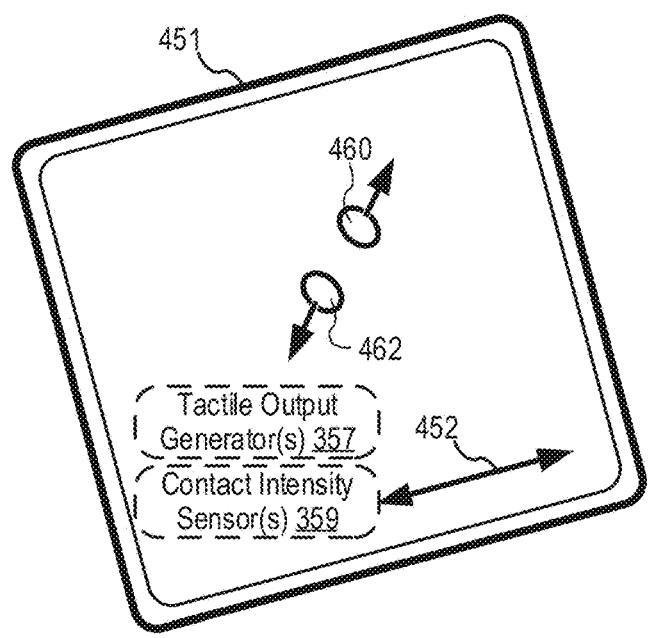
FIG. 4B

700

702
Display an electronic document comprising a first object and a content boundary

704
While displaying the electronic document, detect an input corresponding to a request to translate the electronic document in a first direction Optionally, the display is a touch-sensitive display, and the input comprises movement of a finger contact on the display

706
In response to detecting the input, translate a respective portion of the electronic document in the first direction in accordance with the detected input without moving the first object, so that the first object is outside the content boundary of the electronic document Optionally, translating the respective portion of the electronic document in the first direction in accordance with the detected input comprises: translating the respective portion of the electronic document in the first direction in a linear relationship with the detected input until the content boundary of the electronic document reaches an edge of a window displaying the electronic document; and/or translating the respective portion of the electronic document in the first direction in a non-linear relationship with the detected input as the content boundary of the electronic document is pulled inside the edge of the window.

Optionally, translating the respective portion of the electronic document in the first direction in a linear relationship with the detected input comprises translating the respective portion of the electronic document in the first direction by an amount that is proportional to the distance moved by the finger on the touch-sensitive display; and/or translating the respective portion of the electronic document in the first direction in a non-linear relationship with the detected input comprises translating the respective portion of the electronic document in the first direction by an amount that has a non-linear relationship with the distance moved by the finger on the touch-sensitive display.

Optionally, the first object is fixed relative to the edge of the window

Optionally, translating the respective portion of the electronic document in the first direction in accordance with the input without moving the first object comprises passing a portion of the electronic document under the first object.

Optionally, the electronic document further comprises a second object; and translating the respective portion of the electronic document in the first direction in accordance with the detected input comprises: maintaining the second object stationary until the content boundary of the electronic document reaches the edge of the window displaying the electronic document; and translating the second object with the electronic document in the first direction in the non-linear relationship with the detected input as the content boundary of the electronic document is pulled inside the edge of the window Optionally, the electronic document further comprises a third object; and translating the respective portion of the electronic document in the first direction in accordance with the detected input comprises: translating the third object with the respective portion of the electronic document in the first direction in the linear relationship with the detected input until the content boundary of the electronic document reaches the edge of the window; and translating the third object with the respective portion of the electronic document in the first direction in the non-linear relationship with the detected input as the content boundary of the electronic document is pulled inside the edge of the window Optionally, the electronic document further comprises a fourth object; and translating the respective portion of the electronic document in the first direction in accordance with the detected input comprises: translating the fourth object with the respective portion of the electronic document in the first direction in the linear relationship with the detected input until the content boundary of the electronic document reaches the edge of the window; and maintaining the fourth object stationary as the content boundary of the electronic document is pulled inside the edge of the window

708
Detect an end of the input

Optionally, the display is a touch-sensitive display, and the end of the input comprises a lift-off of the finger contact from the display

710
In response to detecting the end of the input, translate the respective portion of the electronic document in a second direction different from the first direction without translating the first object, so that the first object is within the content boundary of the electronic document Optionally, the second direction is opposite the first direction Optionally, the respective portion of the electronic document is translated in the second direction until the content boundary reaches the edge of the window Optionally, the respective portion of the electronic document is translated in the second direction at a speed faster than a speed of the respective portion of the translation of the electronic document in the first direction in accordance with the detected input.

802
Display, in a window on a display, an electronic document comprising a background and a content boundary

804
While displaying the electronic document, detect an input corresponding to a request to translate the electronic document in a first direction Optionally, the display is a touch-sensitive display, and the input comprises movement of a finger contact on the display

806
In response to detecting the input, translate the electronic document in the first direction in accordance with the detected input without translating the first object, so that the content boundary is pulled inside the edge of the window; and
in conjunction with translating the electronic document so that the content boundary is pulled inside the edge of the window, display an additional background in at least a portion of an area between the content boundary and the edge of the window, wherein one or more attributes of the additional background matches the corresponding one or more attributes of the background of the electronic document.

Optionally, prior to displaying the additional background in at least the portion of the area between the content boundary and the edge of the window, generating the additional background based at least on the one or more attributes of the background of the electronic document Optionally, the one or more attributes of the background comprise at least one of a color, a pattern, an orientation, and a size.

Optionally, the additional background is generated based on an extrapolation of the background of the electronic document Optionally, the additional background is generated prior to detecting the input or after detecting the input

Optionally, in response to detecting the input corresponding to a request to translate the electronic document in the first direction: translating the electronic document in the first direction in a linear relationship with the detected input until the content boundary of the electronic document reaches the edge of the window; and translating the electronic document in the first direction in a non-linear relationship with the detected input as the content boundary of the electronic document is pulled inside the edge of the window Optionally, while translating the electronic document in the first direction in the non-linear relationship with the detected input: the additional background is displayed in at least the portion of the area between the content boundary and the edge of the window, and the size of the portion of the area where the additional background is displayed increases as the content boundary of the electronic document continues to be pulled deeper inside the edge of the window Optionally, the electronic document further comprises a first object that remains stationary as a respective portion of the electronic document that does not include the first object is translated in accordance with the detected input Optionally, translating the respective portion of the electronic document comprises translating a portion of the respective portion of the electronic document under the first object Optionally, the portion of the respective portion of the electronic document is at least partially visible through the first object from underneath

Optionally, a respective portion of the window is at least partially transparent to the electronic document but is not transparent to the additional background Optionally, while the content boundary of the electronic document has been translated under the respective portion of the window in accordance with the detected input, adjusting an appearance of the respective portion of the window based on an appearance of the electronic document including the background of the electronic document; and
while the content boundary of the electronic document that was adjacent to the additional background is adjacent to the respective portion of the window such that the respective portion of the electronic document is not scrolled under the respective portion of the window, displaying the respective portion of the window without adjustment for the appearance of the additional background Optionally, the respective portion of the window has a first value of transparency prior to detecting the input and has a second value of transparency after detecting the input, wherein the second value is higher than the first value

808
Detect an end of the input

Optionally, the display is a touch-sensitive display, and the end of the input comprises a lift-off of the finger contact from the display

810
In response to detecting the end of the input, translating the electronic document in the second direction opposite the first direction until the content boundary of the electronic document reaches the edge of the window; and reducing the size of the portion in which the additional background is displayed in accordance with the translation of the electronic document in the second direction until the portion in which the additional background is displayed is removed Optionally, the electronic document is translated in the second direction at a speed faster than a speed of the translation of the electronic document in the first direction in accordance with the detected input.

FIG. 8C

COORDINATION OF STATIC BACKGROUNDS AND RUBBERBANDING

CROSS-REFERENCE TO RELATED APPLICATIONS

This application is a continuation of U.S. patent application Ser. No. 17/135,931, entitled "COORDINATION OF STATIC BACKGROUNDS AND RUBBERBANDING," filed on Dec. 28, 2020, which is a continuation of U.S. patent application Ser. No. 14/871,816, entitled "COORDINATION OF STATIC BACKGROUNDS AND RUBBERBANDING," filed on Sep. 30, 2015, which claims benefit of U.S. Provisional Patent Application No. 62/101,346, entitled "COORDINATION OF STATIC BACKGROUNDS AND RUBBERBANDING," filed Jan. 8, 2015, the entire contents of each of which are incorporated herein by reference in their entireties.

FIELD OF THE DISCLOSURE

This disclosure relates generally to a coordination of movements on a display of an electronic document and one or more objects contained in the electronic document.

BACKGROUND OF THE DISCLOSURE

Modern display techniques often involve displaying moving contents on a display, for example, displaying a moving electronic document that includes other objects (e.g., text blocks, images, etc.). However, with an increasing complexity of movements required for electronic documents and individual components contained therein in modern display designs, a streamlined coordination of different movement behaviors of the electronic document and the contained objects is becoming more and more difficult. In view of these increasing difficulties, provided below are various techniques that can be used to easily and seamlessly coordinate the various different movement behaviors of an electronic document and a plurality of objects contained therewithin as they are subject to various different animation (e.g., movement) effects.

SUMMARY OF THE DISCLOSURE

Described herein are various ways to coordinate different movement behaviors of an electronic document that includes one or more objects. Specifically, the description provided herein concerns moving an electronic document in the context of translation in response to a user input (e.g., scrolling)—for example, the electronic document is scrolled on a display as the user provides an associated scroll input, and, in sonic instances, the electronic document is subject to an animation effect known as "rubber-banding," at the end of document scrolling. In some embodiments, this behavior is also used as a "pull-to-refresh" function to cause the displayed electronic document to be refreshed.

There are various components of this rubber-banding behavior—the electronic document is scrolled in one way in accordance with the scroll input provided by the user, but starts scrolling in a different way once certain conditions arise (e.g., scrolling beyond an edge of the document). This behavior also includes movement of the electronic document even after the scroll input stops being provided by the user (e.g., restoration behavior), as will be explained in further detail below.

The descriptions below provide various techniques for coordinating movements of the electronic document and objects contained therein as the electronic document undergoes the rubber band effect, and the different objects contained in the electronic document optionally show different or similar movement behaviors as the electronic document.

While the descriptions provided herein primarily concern the coordinated movements of the electronic document and objects in the context of the animation of scrolling and rubber banding, the concepts and teachings of the present disclosure are applied to many other types of animation effects (e.g., flashing effect, swirl effect) as will be apparent to those skilled in the art. Such applications and permutations are deemed within the scope of the present disclosure.

In some embodiments, an electronic device with a display is provided. The device displays, on the display, an electronic document that includes a first object and a content boundary. While displaying the electronic document, the device detects an input corresponding to a request to translate the electronic document in a first direction, and in response to detecting the input corresponding to a request to translate the electronic document, the device translates a respective portion of the electronic document (e.g., the content boundary) in the first direction in accordance with the detected input without translating the first object, so that the first object is outside of the content boundary of the electronic document. After translating the respective portion of the electronic document without translating the first object, the device detects an end of the input. In response to detecting the end of the input, the device translates the respective portion of the electronic document in a second direction different from the first direction without translating the first object, so that the first object is within the content boundary of the electronic document.

Optionally, the first object is fixed relative to the edge of the window displaying the electronic document. Optionally, translating the respective portion of the electronic document in the first direction in accordance with the detected input without translating the first object includes passing a portion of the electronic document under the first object. For example, the first object is maintained in a fixed position relative to the window when the rest of the electronic document is subject to a rubber-band effect, even if that means that the edge of the electronic document is pulled out from under the first object.

Optionally, in response to detecting the end of the input, the respective portion of the electronic document is translated in the second direction at a speed faster than a speed of the translation of the respective portion of the electronic document in the first direction in accordance with the detected input. Optionally, in response to detecting the end of the input, the respective portion of the electronic document is translated in the second direction until the content boundary of the electronic document reaches the edge of the window. Optionally, the second direction is opposite the first direction.

Optionally, translating the respective portion of the electronic document in the first direction in accordance with the detected input includes: translating the respective portion of the electronic document in the first direction in a linear relationship with the detected input until the content boundary of the electronic document reaches an edge of a window displaying the electronic document; and translating the respective portion of the electronic document in the first direction in a non-linear relationship with the detected input as the content boundary of the electronic document is pulled inside the edge of the window.

Optionally, the display is a touch-sensitive display, and the detected input includes movement of a finger on the touch-sensitive display. Translating the respective portion of the electronic document in the first direction in a linear relationship with the detected input includes translating the electronic document in the first direction by an amount that is proportional to the distance moved by the finger on the touch-sensitive display; and translating the respective portion of the electronic document in the first direction in a non-linear relationship with the detected input includes translating the electronic document in the first direction by an amount that has a non-linear relationship with the distance moved by the finger on the touch-sensitive display.

Optionally, the electronic document further c includes a second object. Translating the respective portion of the electronic document in the first direction in accordance with the detected input includes maintaining the second object stationary until the content boundary of the electronic document reaches the edge of the window displaying the electronic document; and translating the second object with the respective portion of the electronic document in the first direction in the non-linear relationship with the detected input as the content boundary of the electronic document is pulled inside the edge of the window.

Optionally, the electronic document further includes a third object. Translating the respective portion of the electronic document in the first direction in accordance with the detected input includes: translating the third object with the respective portion of the electronic document in the first direction in the linear relationship with the detected input until the content boundary of the electronic document reaches the edge of the window; and translating the third object with the respective portion of the electronic document in the first direction in the non-linear relationship with the detected input as the content boundary of the electronic document is pulled inside the edge of the window.

Optionally, the electronic document further includes a fourth object. Translating the respective portion of the electronic document in the first direction in accordance with the detected input includes: translating the fourth object with the respective portion of the electronic document in the first direction in the linear relationship with the detected input until the content boundary of the electronic document reaches the edge of the window; and maintaining the fourth object stationary as the content boundary of the electronic document is pulled inside the edge of the window.

In some embodiments, an electronic device with a display is provided. The device displays, in a window on the display, an electronic document comprising a background and a content boundary, and while displaying the electronic document, detects an input corresponding to a request to translate the electronic document in a first direction. In response to detecting the input corresponding to a request to translate the electronic document in the first direction, the device translates the electronic document in the first direction in accordance with the detected input so that the content boundary is pulled inside the edge of the window; and in conjunction with translating the electronic document as the content boundary is pulled inside the edge of the window, the device displays an additional background in at least a portion of an area between the content boundary and the edge of the window, wherein one or more attributes of the additional background matches the corresponding one or more attributes of the background of the electronic document.

Optionally, prior to displaying the additional background in at least the portion of the area between the content boundary and the edge of the window, the device generates the additional background based at least on the one or more attributes of the original background of the electronic document. For example, the information about the original background is obtained from the electronic document itself or any other related documents (e.g., CSS). The additional background is generated by the device on an as-needed basis (e.g., procedurally generated by the device as conditions arise in which the electronic device scrolls beyond an edge of the electronic document in the window). Optionally, the additional background is generated prior to detecting the input that corresponds to a request to translate the electronic document beyond an edge of the electronic document. Optionally, the additional background is generated after detecting the input that corresponds to a request to translate the electronic document beyond an edge of the electronic document. Optionally, the one or more attributes of the background comprise at least one of a color, a gradient, a pattern, an orientation, and a size. Optionally, the additional background is generated based on an extrapolation of the background of the electronic document.

Optionally, in response to detecting the input corresponding to a request to translate the electronic document in the first direction, the device translates the electronic document in the first direction in a linear relationship with the detected input until the content boundary of the electronic document reaches the edge of the window; and translates the electronic document in the first direction in a non-linear relationship with the detected input as the content boundary of the electronic document is pulled inside the edge of the window.

Optionally, the electronic document further includes a first object that remains stationary as a respective portion of the electronic document that does not include the first object is translated in accordance with the detected input. Optionally, translating the respective portion of the electronic document includes translating, under the first object, at least a portion of the respective portion of the electronic document. Optionally, the portion of the respective portion of the electronic document is at least partially visible through the first object from underneath.

Optionally, while the electronic document is translated in the first direction in the non-linear relationship with the detected input, the additional background is displayed in at least the portion of the area between the content boundary and the edge of the window, and the size of the portion of the area where the additional background is displayed increases as the content boundary of the electronic document continues to be pulled further inside the edge of the window.

Optionally, a respective portion of the window (e.g., a toolbar, a menu bar, etc.) is at least partially transparent to the electronic document but is not transparent to the additional background. Optionally, while a portion of the electronic document has been scrolled under the respective portion of the window, the device adjusts an appearance of the respective portion of the window based on an appearance of the electronic document including the background of the electronic document; and while an edge of the electronic document that was adjacent to the additional background is adjacent to the respective portion of the window such that the electronic document is not scrolled under the respective portion of the window, the device displays the respective portion of the window without adjustment for the appearance of the additional background. For example, the additional background is not displayed through the semi-transparent menu bar as it is not actually part of the document. This creates the appearance that the "extra background" being generated just in time to be displayed on display.

Optionally, the device detects an end of the input corresponding to a request to translate the electronic document in the first direction (e.g., a liftoff of the contact), and in response to detecting the end of the input corresponding to a request to translate the electronic document in the first direction, the device translates the electronic document in the second direction different from the first direction, so that the content boundary of the electronic document substantially coincides with the edge of the window; and removes the display of the additional background. Optionally, the second direction is opposite the first direction.

While the illustrated embodiments are described in the context of the electronic document translating in accordance with the scroll input, the concept of different object behavior coordination can be applied to various other types of the movement of the electronic document such as, non-exclusively, a translation o based on an input other than a user input (e.g., a change in the orientation of the device) and automatic translation after an elapse of a predetermined time period.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 4A and 4B illustrate an exemplary user interface for a menu of applications on a portable multifunction device in accordance with some embodiments.

FIGS. 5A-5P also illustrate an exemplary implementation of coordinated movements of an electronic document and an object of a third type according to various embodiments of the disclosure.

FIGS. 7A-7B illustrate an exemplary flow diagram of coordinating movements of an electronic document and various objects contained therein according to various embodiments of the disclosure.

FIGS. 8A-8C illustrate an exemplary flow diagram of coordinating movements of an electronic document with a background and objects contained in the electronic document according to various embodiments of the disclosure.

DETAILED DESCRIPTION

Figure 1A:
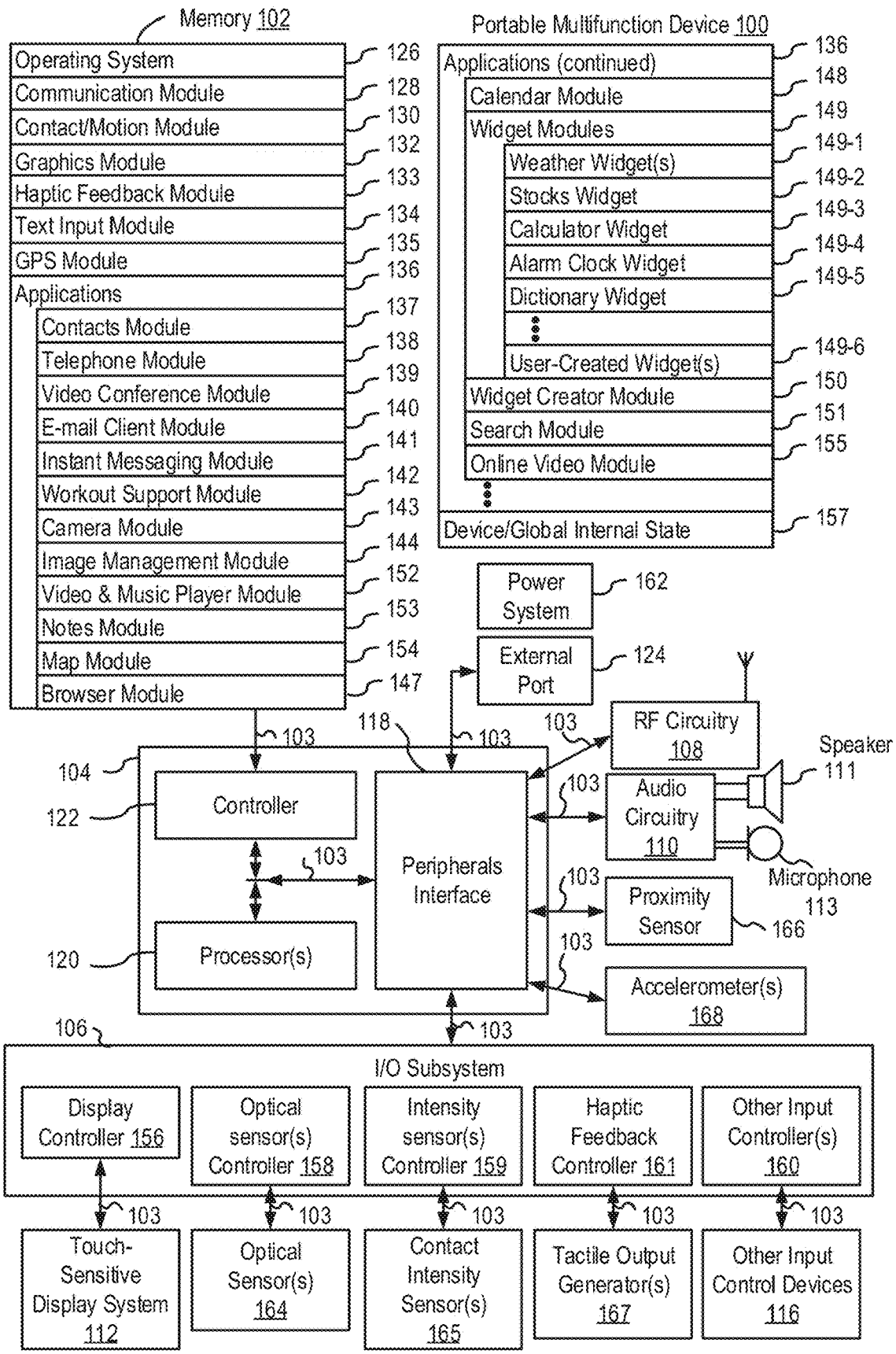
FIG. 1A is a block diagram illustrating a portable multifunction device with a touch-sensitive display in accordance with some embodiments.

Modern display techniques often involve displaying moving contents on a display, for example, displaying a moving electronic document that includes other objects (e.g., text blocks, images, etc.). However, with an ever-increasing complexity of movements required for electronic documents and individual components contained therein in modern display designs, a streamlined coordination of different movement behaviors of the electronic document and the contained objects is needed. Below described are various ways to coordinate different movement behaviors of an electronic document that includes one or more objects. Specifically, the description provided herein concern scrolling a document while maintaining display of relevant information (e.g., objects, toolbars, menus, other contents of the document). Also, appropriate feedback is provided when the user has reached an end of scrolling the document. For example, the electronic document is scrolled on a display as the user provides an associated scroll input (e.g., a touch and drag, a mouse drag) and, sometimes, the electronic document is subject to an animation effect known as "rubber-banding" when the user has reached an end of the document. Sometimes, this behavior is also used as a "pull-to-refresh" function to cause the displayed electronic document to be refreshed.

There are various components of the rubber-banding effect—for example, the electronic document is scrolled in one way in accordance with the scroll input provided by the user, but the electronic document starts scrolling in a different way once a certain condition is met. This behavior also includes a certain type of movement of the electronic document even after the scroll input stops (e.g., a restoration behavior), as will be explained in further detail below. To still add another layer of complexity, some individual objects contained in the electronic document show movement behaviors that are different from that of the electronic document as it is subject to the scrolling and rubber-handing. These movements of the objects and the electronic document are coordinated so as to not create a jarring effect on the display that would be distracting or confusing to the users and to prevent the users from experiencing any disruption in the animated movements of various objects displayed on the display.

For example, while the electronic document is scrolled, some objects are moved with the electronic document while other objects remain stationary. Optionally, the electronic document is subject to the rubber hand effect as the user continues to scroll the electronic document after the user has reached the end of the document. While the electronic document is subject to the rubber band effect, some objects are subject to the rubber band effect along with the electronic document while other objects remain stationary and are not subject to the rubber band effect. Optionally, as the electronic document is subject to the rubber band effect (e.g., pulling an edge of the electronic document inside the edge of the display window), a gap i s created between the pulled edge of the electronic document and the edge of the display window. Optionally, this gap is displayed with a background created based on the background of the electronic document so as to bring about the visual effect of this gap area being an extended background from the electronic document.

In the following description of the disclosure and embodiments, reference is made to the accompanying drawings in which it is shown by way of illustration specific embodiments that can be practiced. It is to be understood that other embodiments and examples can be practiced and changes can be made without departing from the scope of the disclosure.

Below, FIGS. 1A-1B, 2, 3 and 4A-4B provide a description of exemplary devices that display movement of an electronic document with one or more graphical objects of various types. FIGS. 5A-5R illustrate exemplary implementations of the rubber-band effect with the coordinated behavior of the moving electronic document with various types of objects that behave differently in response to the movement of the document. FIGS. 6A-6J illustrate exemplary implementations of the rubber-band effect with the extended background filling at least a portion of the gap that is created as the user pulls the document boundary inside the display window. The various coordination techniques illustrated in these figures are also used to illustrate the methods and processes described below, including the processes in FIGS. 7A-7B and 8A-8C.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The terminology used in the description of the various described embodiments herein is for the purpose of describing particular embodiments only and is not intended to be limiting. As used in the description of the various described embodiments and the appended. claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises." and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RE signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," tiled Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30. 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data. representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586.862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
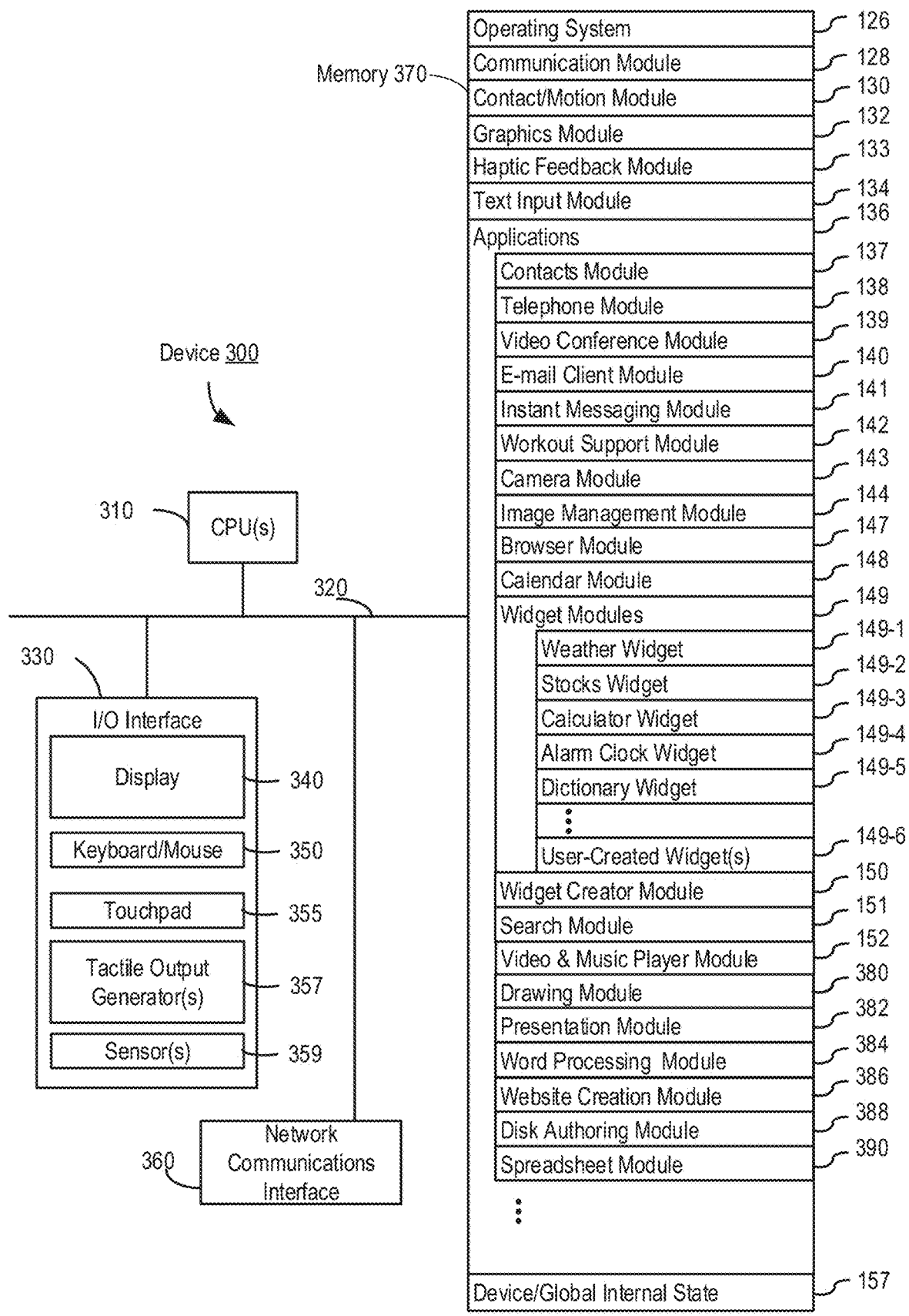
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132 text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LIN UX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a linger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including ,without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:

- Contacts module 137 (sometimes called an address book or contact list);
- Telephone module 138;
- Video conferencing module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155, Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, (IPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130 graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156. contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g, user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected. display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions, In conjunction with touch screen 112, display controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via. external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No, 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
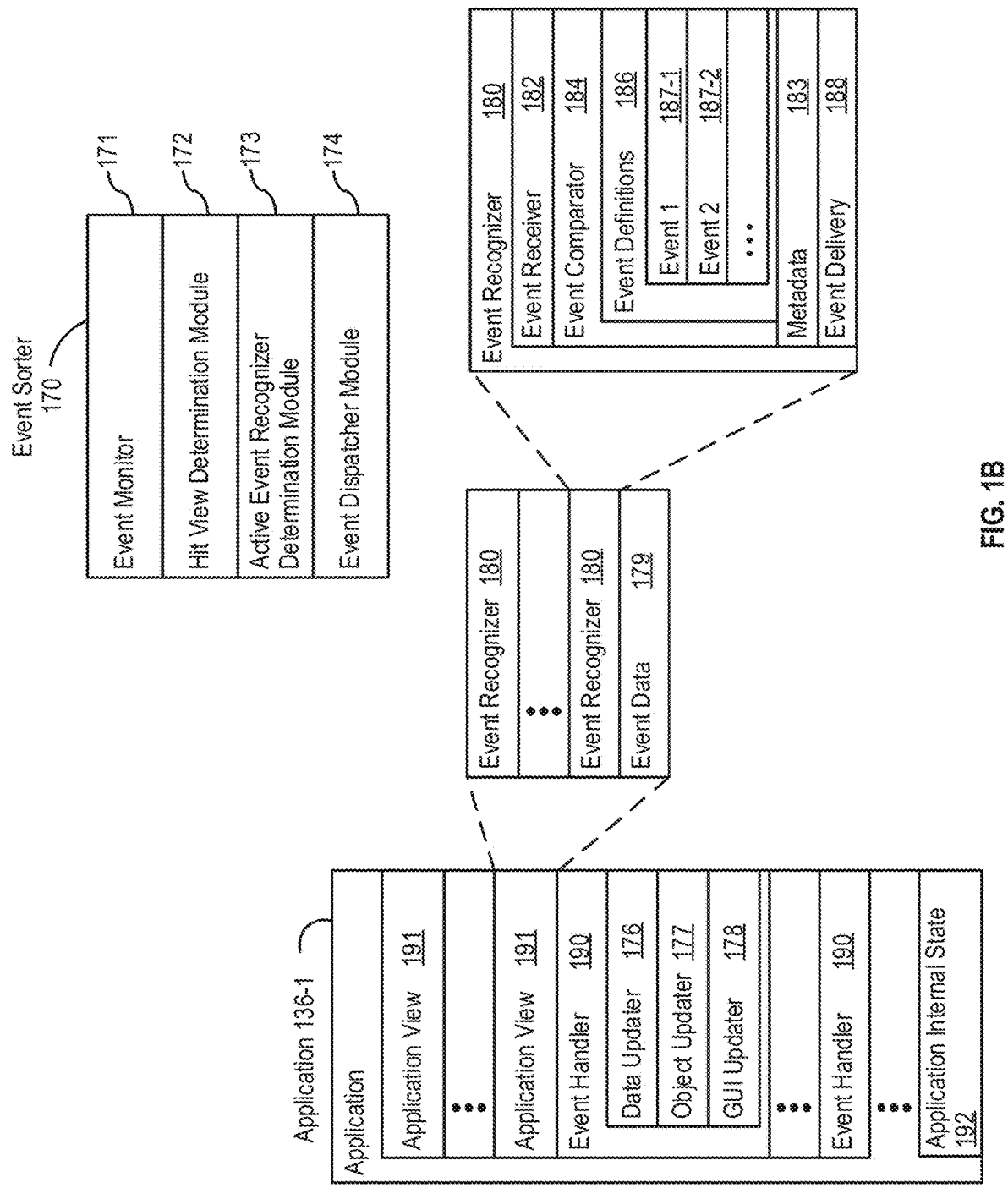
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from 110 subsystem 106 or a sensor, such as proximity sensor 166, accelerometers) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit, view is identified by the hit, view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
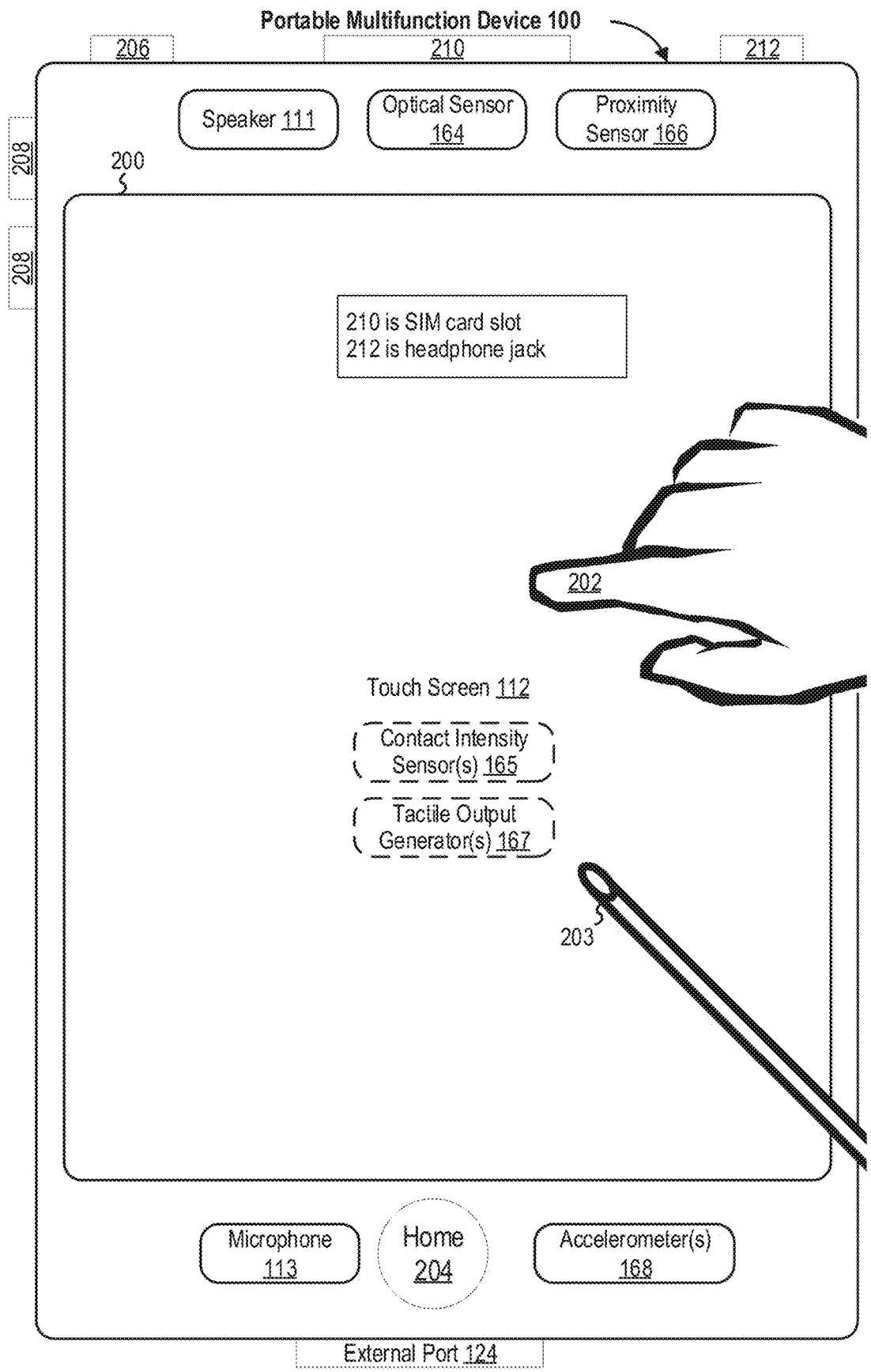
FIG. 2 illustrates a portable multifunction device having a touch-sensitive display in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a ellipse) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures ,or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
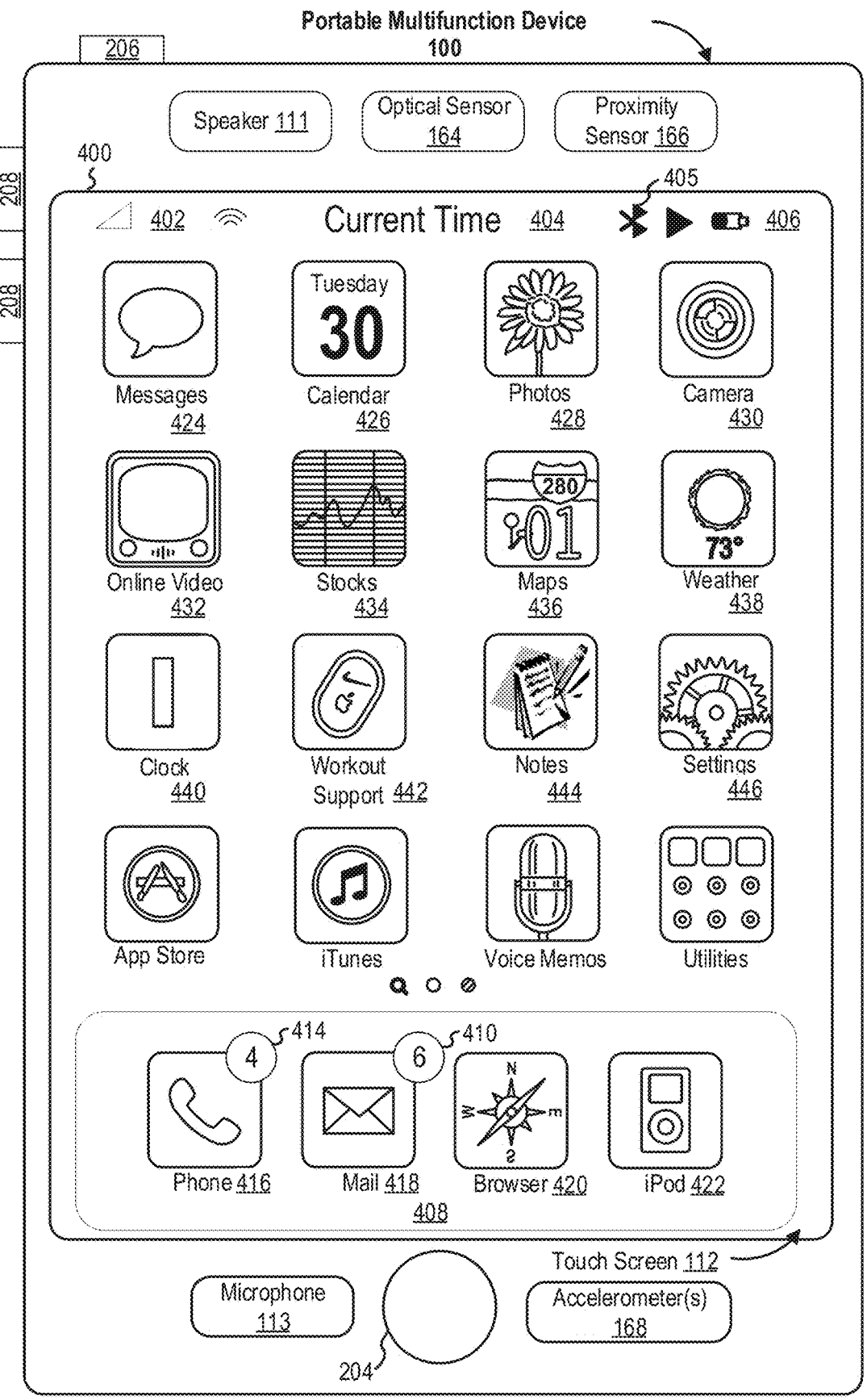
Figure 5A:
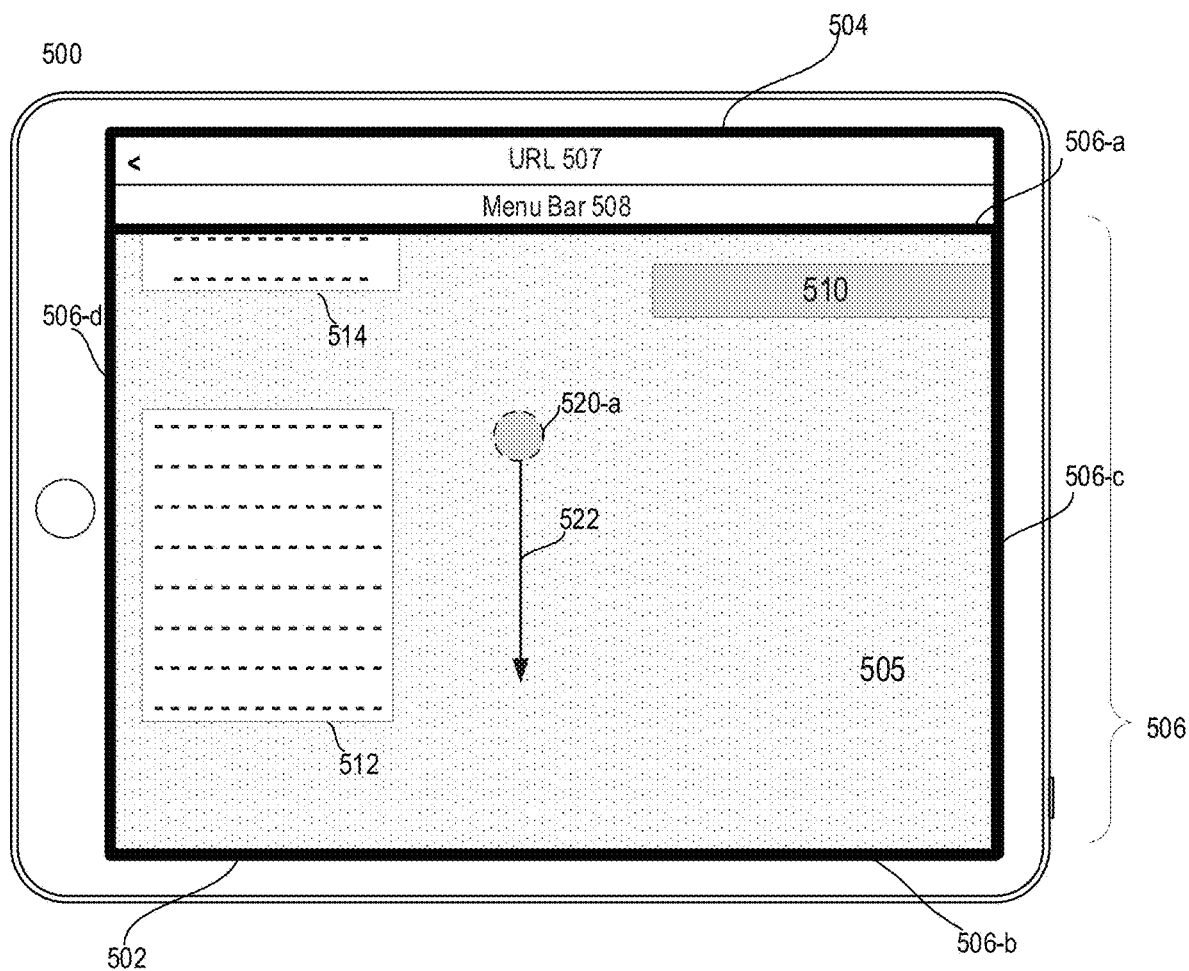
FIGS. 5A-5F illustrate an exemplary implementation of coordinated movements of an electronic document and an object of a first type according to various embodiments of the disclosure.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405:

Battery status indicator 406;

Tray 408 with icons for frequently used applications, such as:
 Icon 416 for telephone module 138, labeled "Phone," which optionally includes an indicator 414 of the number of missed calls or voicemail messages;
 Icon 418 for e-mail client module 140, labeled "Mail," which optionally includes an indicator 410 of the number of unread e-mails;
 Icon 420 for browser module 147, labeled "Browser;" and
 Icon 422 for video and music player module 152, also referred to as iPod (trademark of Apple Inc.) module 152, labeled "iPod;" and Icons for other applications, such as:
 Icon 424 for IM module 141, labeled "Messages;"
 Icon 426 for calendar module 148, labeled "Calendar;"
 Icon 428 for image management module 144, labeled "Photos;"
 Icon 430 for camera module 143, labeled "Camera;"
 Icon 432 for online video module 155, labeled "Online Video;"
 Icon 434 for stocks widget 149-2, labeled "Stocks;"
 Icon 436 for map module 154, labeled "Maps;"
 Icon 438 for weather widget 149-1, labeled "Weather;"
 Icon 440 for alarm clock widget 149-4, labeled "Clock;"
 Icon 442 for workout support module 142, labeled "Workout Support;"
 Icon 444 for notes module 153, labeled "Notes;" and
 Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used here, the term "affordance" refers to a user-interactive graphical user interface object that may be displayed on the display screen of devices 100 and/or 300 (FIGS. 1 and 3). For example, an image (e.g., icon), a button, and text (e.g., hyperlinks ray each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In sonic embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed to various exemplary embodiments of techniques for coordinating movements of an electronic document displayed on a display with one or more objects contained therein as they undergo various different animation effects such as scrolling and rubber-banding.

1. Coordination of Movement Behaviors of Electronic Document Objects

FIGS. 5A-5F illustrate an example of coordinated movements of an electronic document and an object of a first type (e.g., object 510) contained therewithin. FIGS. 5G-5K illustrate an example of coordinated movements of an electronic document and an object of a second type (e.g., object 530) contained therewithin. FIGS. 5L-5P illustrate an example of coordinated movements of an electronic document and an object of a fourth type (e.g., object 550) contained therewithin. FIGS. 5Q-5R illustrate another example of coordinated movements of an electronic document and an object of a first type (e.g., object 510) contained therewithin. All of these drawings illustrate examples of coordinated movements of a respective electronic document and an object of a third type (e.g., objects 514 and/or 512) contained therewithin.

FIG. 5A illustrates electronic device 500 with touch-sensitive display 502. On display 502, window 504 is displayed in a full screen mode. In a regular mode, window 504 is displayed in a portion of display 502. Window 504 contains URL bar 507, menu bar 508, and/or content window 506 (e.g., a box below menu bar 508) for displaying at least a portion of electronic document 505. Optionally, URL bar 507 contains an address associated with electronic document 505 (e.g., a webpage). Optionally, menu bar 508 contains various menu items such as, non-exclusively, File, Edit, View, Favorites, Tools and Help. Optionally, menu bar 508 and/or URL bar 506 are hidden from display (e.g., not displayed), or the display appearances of these fields are changed manually in response to an input from a user and/or automatically based on various factors predetermined in the system (e.g., display properties, display orientation, properties of electronic document 505).

In some embodiments, electronic document 505 is a webpage. Optionally, electronic document 505 is displayed on display 502 using one or more applications installed on device 500 (e.g., web-browsers, Finder™ developed by Apple, Inc. in Cupertino, Calif.), In some embodiments, electronic document 505 has a predefined shape and includes one or more content boundaries. In FIG. 5A, electronic document 505 has a rectangular shape and thus contains four content boundaries—the first content boundary at the top edge of electronic document 505 (e.g., an edge of electronic document 505 above upper window edge 506-*a*), the second content boundary at the bottom edge of electronic document 505 (e.g., an edge of electronic document 505 below the edge of the window 506-*b*), the third content boundary at the right edge of electronic document 505 (e.g., an edge of electronic document 505 on or to the right of the edge of the window 506-*c*), and the fourth content boundary at the left edge of electronic document 505 (e.g., an edge of electronic document 505 on or to the left of window edge 506-*a*).

In some embodiments, although the electronic document has a rectangular shape having four boundaries on the four edges, the device recognizes a select number of the boundaries as the content boundaries to be used in the movement coordination system in response to a scroll input. For example, only the content boundaries of the electronic document that are in the direction(s) in which the electronic document is scrolled are recognized as the content boundaries for use in the system (e.g., the top and bottom content boundaries if the electronic document is scrolled in the vertical direction, and the right and left content boundaries if the electronic document is scrolled in the horizontal direction).

In FIG. 5A, the displayed portion of the electronic document 505 does not contain the top content boundary of the electronic document 505 there is more content beyond window edge 506-*a* that can be scrolled down to be within inside content window 506). The displayed portion of the electronic document 505 does not contain the bottom content boundary of the electronic document 505 (e.g., there is more content below the edge of the window 506-*b* that can be scrolled up to be within inside content window 506). The right-side content boundary of the electronic document is on or near the right edge of the window 506-*c*, and the left-side content boundary of the electronic document is on or near the left edge of the window 506-*d*.

In FIG. 5A, the electronic document 505 includes object 510 of the first type, objects 512 and 514 of the third type and a background (a dotted background in electronic document 505 displayed underneath the objects). Optionally, the objects contained within the electronic document are one or more of user interface objects, graphical Objects, text blocks, images, data containers where the data contained is received from an external device and is updated in real-time (e.g., advertisement banners), user interfaces that are activated to cause device 500 to perform associated functions (e.g., touch-activated user interface objects), etc.

In FIG. 5A, while device 500 is displaying the portion of the electronic document 505 with object 510 of the first type and objects 512 and 514 of the third type, an input is detected that corresponds to a request to translate the electronic document 505 in a first direction. Optionally, the request is a request to scroll the electronic document in the first direction.

In FIG. 5A, the detected input that corresponds to a request to translate the electronic document 505 in a first direction includes an initial finger contact with the touch-sensitive display at 520-*a* and subsequent continuous movement of the finger contact in direction 522. This finger contact followed by the continuous movement is recognized as a request to translate the electronic document 505 in the same direction of the movement of the contact (the downward direction 522 in FIG. 5A).

Optionally, the detected input that corresponds to a request to translate the electronic document 505 in a first direction includes, non-exclusively, a stylus input, a mouse input, a hand-motion input, a face-motion input, an eye-movement input, and/or other bodily part motion input, etc. Optionally, the device determines that the first direction in which the translation of the electronic document is requested (e.g., the downward direction in FIG. 5A) is the same direction in which the detected input is moved (e.g., direction 522 in FIG. 5M. Optionally, the device determines that the first direction in which the translation of the electronic document is requested is not the same direction as the direction in which the detected input is moved. For example, a user swipes to the left, and the device interprets the detected swipe as a request to translate the electronic documents in the rightward direction. Optionally, the correlation between the detected input and the translation request is based on, non-exclusively, setting preferences of the application being used to display the electronic document on display 502, types of input mechanism used to provide the input that corresponds to a translation request, characteristics of the displayed electronic document, etc.

Figure 5B:
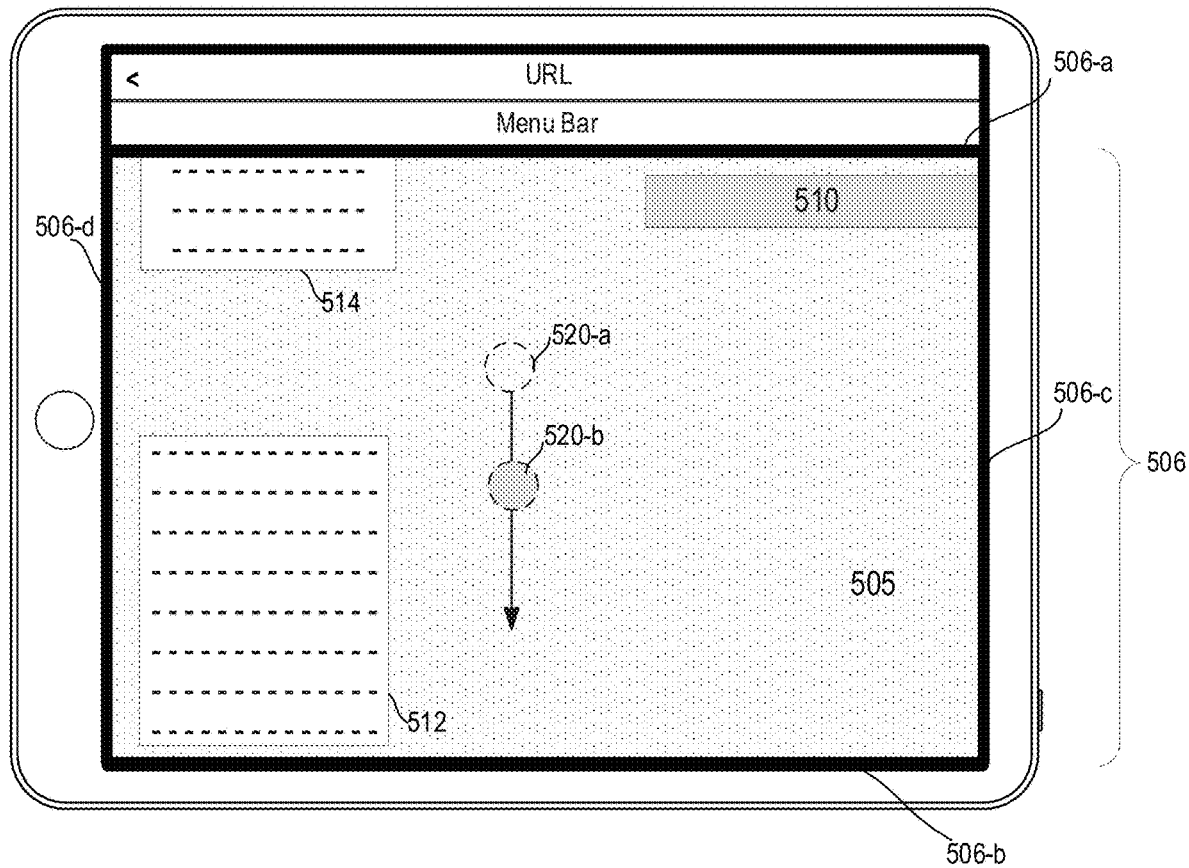

In FIG. 5B, in response to detecting the input that corresponds to a request to translate the electronic document 505 in direction 522 (finger movement from 520-a to 520-b), a respective portion of the electronic document 505 is translated in direction 522 in accordance with the detected input. The respective portion of the electronic document 505 that is translated in accordance with the detected input includes the background of the electronic document 505 and content boundary 505-a. Optionally, the respective portion of the electronic document includes one or more components of the electronic document including objects (e.g., text blocks, images, content boxes in a structured document). The respective portion of an electronic document optionally includes CSS position-fixed objects (e.g., for an electronic document of web content). In some embodiments, different electronic documents have different components of the document as the respective portion to be treated. as having fixed positions relative to the content boundaries of the electronic document. Optionally, the respective portion of the electronic document includes parts that are not continuous with each other and, optionally includes, for example, one or more continuous or non-continuous portions of the background of the document and continuous or non-continuous portions of the contents of the electronic document.

The third-type objects 512 and 514 are translated with the respective portion of the electronic document 505. These objects are translated as having fixed positions relative to content boundaries of the electronic document. When implemented, these objects are, optionally, designated as part of the respective portion of the electronic document, or, optionally, coded as separate objects that behave in a similar manner as the respective portion of the electronic document. While the third-type objects are translated along with the respective portion of the electronic document 505, the first-type object 510 does not move and remains stationary relative to the edge(s) of the display window (e.g., 506-a, 506-b, 506-c, 506-c) as the respective portion of the electronic document 505 is translated in the downward direction.

For example, as the third-type objects 512 and 514 are translated in the downward direction along with the background of the electronic document in accordance with the input, the upper portion of object 514, which was not previously displayed, is now displayed as it is translated in the downward direction to be within inside content window 506. Also, object 512 is moved down closer to the bottom edge of the window 506-b.

In some embodiments, the amount by which each individual component of the respective portion of the electronic document is translated in accordance with the input is consistent the distance moved by object 512 is the same as the distance moved by object 514, and the same amount is moved by the background of the electronic document 505. For example, objects 514 and 512 are translated as if they are fixed in respective locations in the background of the electronic document (e.g., fixed relative to the content boundaries of the electronic document). Optionally, the amount by which each individual component of the respective portion of the electronic document is translated in accordance with the input varies, for example, to maintain the display ratio, etc. For example, while objects 512 and 514 are both translated in accordance with the input, object 514 is translated by a greater or smaller amount than the amount by which object 512 is translated from the same input.

In some embodiments, the amount of the translation performed by the respective portion of the electronic document 505 has a linear relationship with the input (e.g., the magnitude of the input). For example, in FIG. 5B, the input is the contact movement from 520-a to 520-b, and the distance between 520-a and 520-b has a linear relationship with the distance translated by the respective portion of the electronic document 505. In some embodiments, the linear relationship is a proportional relationship (e.g., a direct proportional relationship). Optionally, the linear relationship between the input and the amount of the translation caused by the input is predefined. Optionally, the linear relationship between the input and the amount of the translation caused by the input is dynamically determined based on, for example, a speed associated with the input, types of input (e.g., touch input, mouse input), overall length of the electronic document, etc.

In some embodiments, the speed of the translation of the respective portions of the electronic document that are translated in accordance with the input has a linear relationship with the speed associated with the input. For example, in FIG. 5B, if the user moves the finger contact from 520-a to 520-b at a first speed, the respective portions of the electronic document 505 are translated at a speed that has a linear relationship with the first speed. If the user moves the finger contact from 520-a to 520-b at a second speed faster than the first speed, the respective portions of the electronic document 505 are translated at a speed that has a linear relationship with the second speed and is faster than the first speed.

While the respective portions of the electronic document 505 (including the background and content boundary 505-a) are translated in accordance with the input, the object of the first type (object 510) does not move. For example, object 510 remains stationary relative to the edge(s) of the window 506. In FIG. 5B, object 510 has remained stationary in a fixed location relative to the edge(s) of the window including 506-a—e.g., the distance between the top edge of the window 506-a and object 510 has remained the same in FIGS. 5A and 5B while the positions of objects 512 and 514 relative to the top edge of the window 506-a have changed.

In FIG. 5B, in accordance with the detected input of the finger contact movement from 520-a to 520-b, the top content boundary of the electronic document 505-a. (not yet shown in FIG. 5B but shown in FIG. 5C) as it has not yet reached the top edge of the window 506-a, but has been pulled closer to window edge 506-a. If the user continues to further move the finger contact down to 520-c as shown in FIG. 5C, the top content boundary of the electronic document 505-a reaches the top edge of the window 506-a.

Figure 5C:
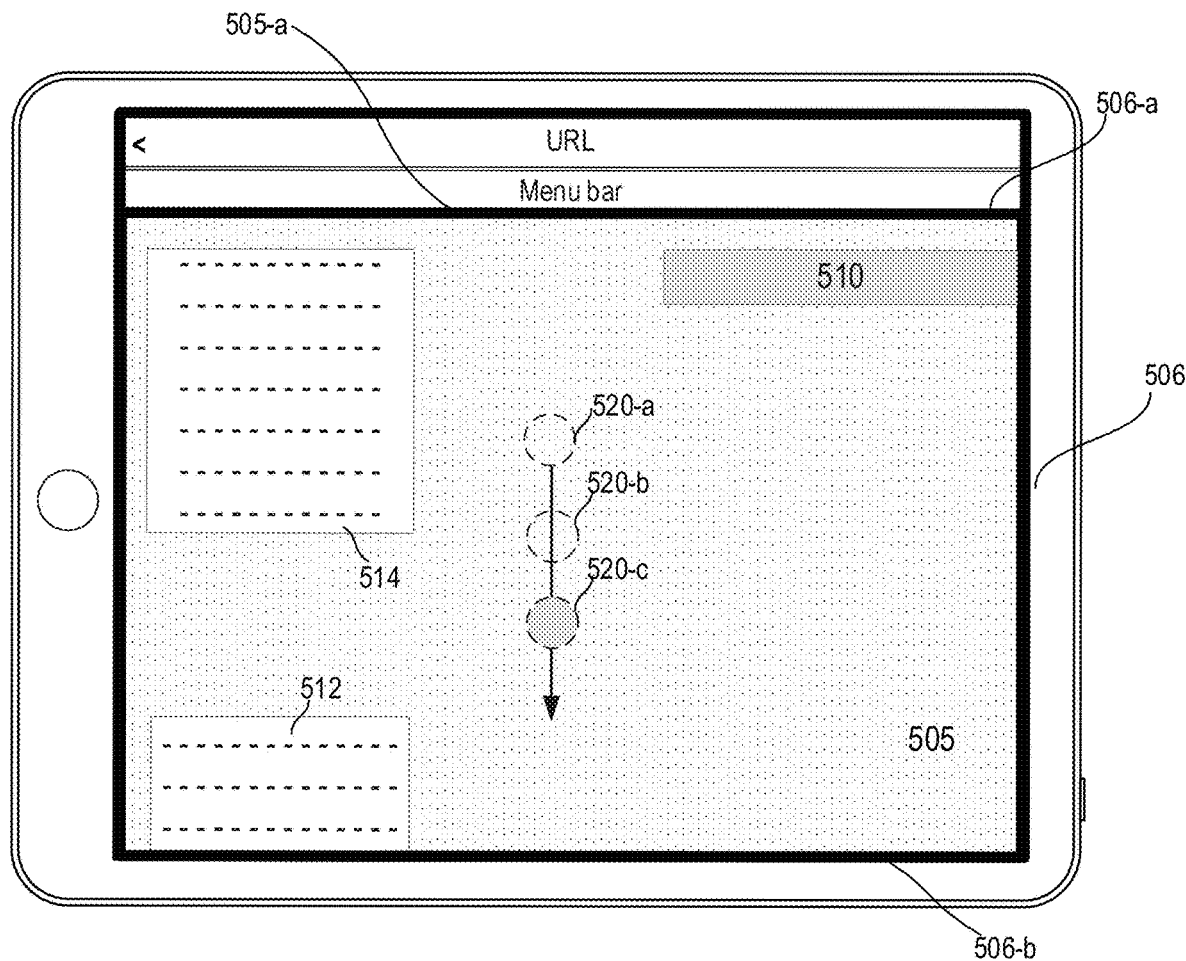

In FIG. 5C, in accordance with the detected input of the further finger contact movement from 520-b to 520-c, the top content boundary of the electronic document 505-a has reached the top edge of the window 506-a. In so doing, the respective portions of the electronic document, including content boundary 505-a and the background, as well as the third-type objects 512 and 514, are translated in the downward direction in accordance with the further contact movement from 520-b to 520-c, while the first-type object 510 has remained stationary, as shown in FIG. 5C.

In some embodiments, as the respective portions of the electronic document 505 are translated, a part of such portions (a portion of the background in FIGS. 5B-5C) is translated under the first-type object that remains stationary. For example, the part of the background of the electronic document 505 that becomes directly under object 510 as it is translated in the downward direction in accordance with the finger movement is moved by passing under the object 510. Optionally, the part of the background that is translated under object 510 is at least partially visible through object 510 from underneath.

Figure 5D:
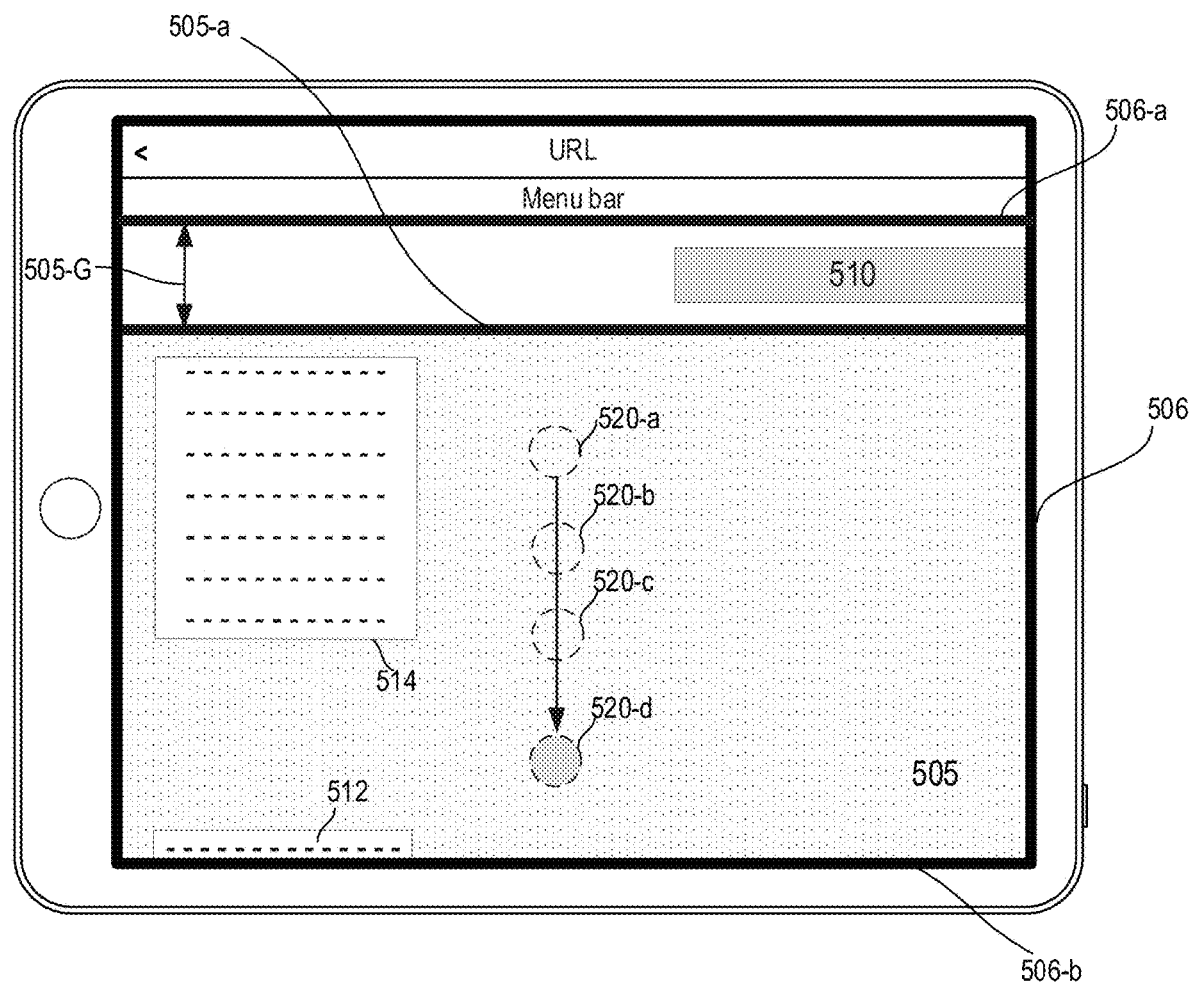

In FIG. 5D, the user continues to further move the finger contact from 520-*c* to 520-*d* so that the top content boundary of the electronic document 505-*a* is pulled inside window edge 506-*a*. The respective portions of the electronic document, including the background and content boundary 505-*a*, are also pulled in the downward direction in accordance with this further finger movement from 520-*c* to 520-*d* (as well as the objects 512 and 514 of the third type) while the first-type object 510 remains stationary. As shown in the illustrated example, as the top content boundary 505-*a* is pulled down sufficiently inside window edge 506-*a* with object 510 being stationary, the object 510 becomes positioned outside the content boundary 505-*a*.

In some embodiments, the translation behavior of the respective portion of the electronic document (e.g., content boundary 505-*a* and the background) and objects 512 and 514 of the third type, is performed in a first relationship with the finger movement (finger movement from 520-*a*, to 520-*c*) until content boundary 505-*a* reaches window edge 506-*a*. After the content boundary 505-*a* has reached window edge 506-*a* and as the content boundary 505-*a* is pulled inside the window edge, the translation behavior of the respective portion of the electronic document (e.g., content boundary 505-*a* and the background) and objects 512 and 514 of the third type, is performed in a second relationship different than the first relationship with the finger movement (finger movement from 520-*c* to 520-*d*). Optionally, the first relationship includes the amount of the translation having a linear relationship with the amount of the finger movement, and the second relationship includes the amount of the translation having a non-linear relationship with the amount of the finger movement. Optionally, the first relationship includes the speed of the translation having a linear relationship with the speed of the finger movement, and the second relationship includes the speed of the translation having a non-linear relationship with the speed of the finger movement.

In some embodiments, the non-linear relationship is a relationship that simulates behaviors of an elastic material—for example, the amount of the input simulating a force being applied on an elastic material for stretching, and the respective portion of the electronic document to be translated in accordance with the input simulating the elastic material being stretched from the force. Optionally, gap area 505-G, which has been created between the pulled content boundary 505-*a* and window edge 506-*a*, is simulated to be the elastic material that stretches in accordance with the force, e.g., contact movement from 520-*c* to 520-*d*. Optionally, the movement behavior of the respective portion of the electronic document as the content boundary 505-*a* is pulled inside window edge 506-*a* is simulated to be the behavior of a rubber band or a spring that has a predefined elasticity or a spring coefficient. Optionally, the simulated behavior includes the elastic material being stretched upon application of a force and does not deform regardless of the magnitude of the force. Upon release of the force (e.g., a liftoff of the contact), the simulated elastic material returns to an equilibrium position. The equilibrium position, in the illustrated examples, is the position in which the content boundary 505-*a* lies on or near window edge 506-*a* (as shown in FIGS. 5C and 5F). Optionally, the equilibrium position is a point at which the movement behavior of the electronic document switches between having a linear relationship with the scroll input and having a non-linear relationship with the scroll input.

In some embodiments, the equilibrium position changes depending on characteristics of the input that has caused the non-linear translation behavior. For example, depending on the direction, position, magnitude, orientation, etc., of the finger movement, the equilibrium position varies to different positions (e.g., content boundary that was previously pulled inside the edge of the window is outside or inside the edge of the window by a predefined amount, etc.).

As will be apparent to those skilled in the art, there are various ways to simulate a behavior of an elastic material like a spring or a rubber band, for example, with the input representing a force applied to an elastic material, and the amount translated by the respective portions of the electronic document representing an amount stretched by the elastic material from the force. Optionally, a mathematic formula representing a linear elasticity is used—e.g., $F=-kx$, where x represents the displacement (e.g., the amount of translation), k represents a spring constant (e.g., which is a predefined value, or a value that changes dynamically depending on the speed, position, and/or orientation of the scroll input). and F represents the force (e.g., the input, the distance moved by the finger). Optionally, the non-linear relationship includes a logarithmic relationship to simulate an elastic behavior of the translation based on the input.

In some embodiments, the speed of the translation by the respective portions of the electronic document in accordance with the finger movement from 520-*a* to 520-*c* until the content boundary reaches the edge of the window has a linear relationship with the speed of the finger movement from 520-*a* to 520-*c*. On the other hand, the speed of the translation by the respective portions of the electronic document in accordance with the finger movement from 520-*c* to 520-*d* after the content boundary has reached the edge of the window and as the content boundary is pulled inside the edge of the window has a non-linear relationship with the speed of the finger movement from 520-*c* to 520-*d*.

In some embodiments, there is a predefined upper limit for the size of the gap 505-G (e.g., the length of the gap in the direction in which the content boundary is translated). The size of the gap 505-G increases in accordance with the finger movement but stops increasing despite the continued finger movement after the size of the gap 505-G has reached the upper limit. For example, the content boundary 505-*a* continues to be pulled further inside window edge 506-*a* in accordance with the finger movement, but after the content boundary 505-*a* has reached the maximum amount that it can be pulled inside the edge of the window, it stops being pulled further down despite the continued finger movement.

Referring back to FIG. 5C, as the content boundary 505-*a* is pulled inside window edge 506-*a*, a gap is created between the content boundary and the edge of the window as shown in area referred to as 505-G in FIG. 5D. The size of this gap area increases as the content boundary 505-*a* is pulled further inside window edge 506-*a*. The first-type object 510 that remains stationary and becomes outside the content boundary 505-*a* is displayed in the gap area 505-G.

Figure 5E:
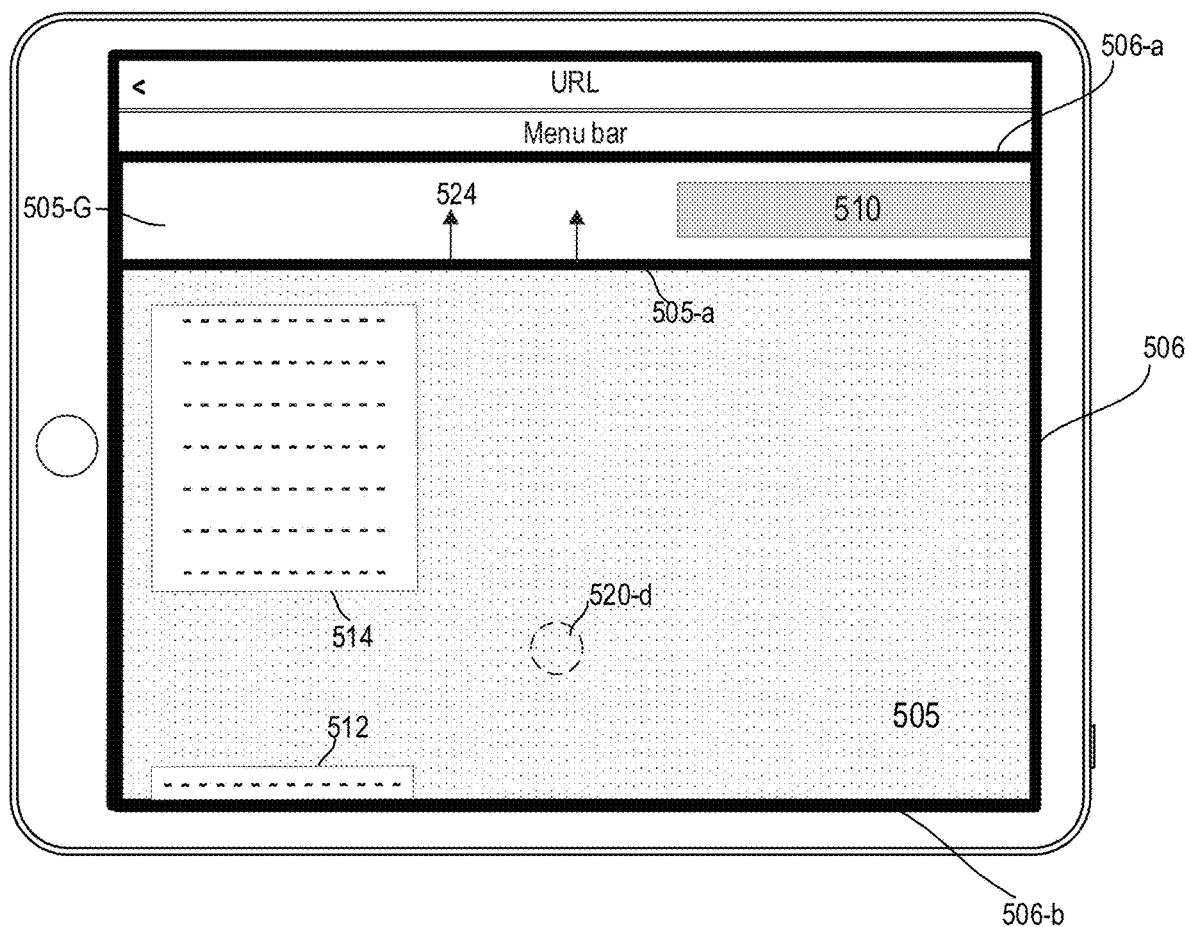
Figure 5F:
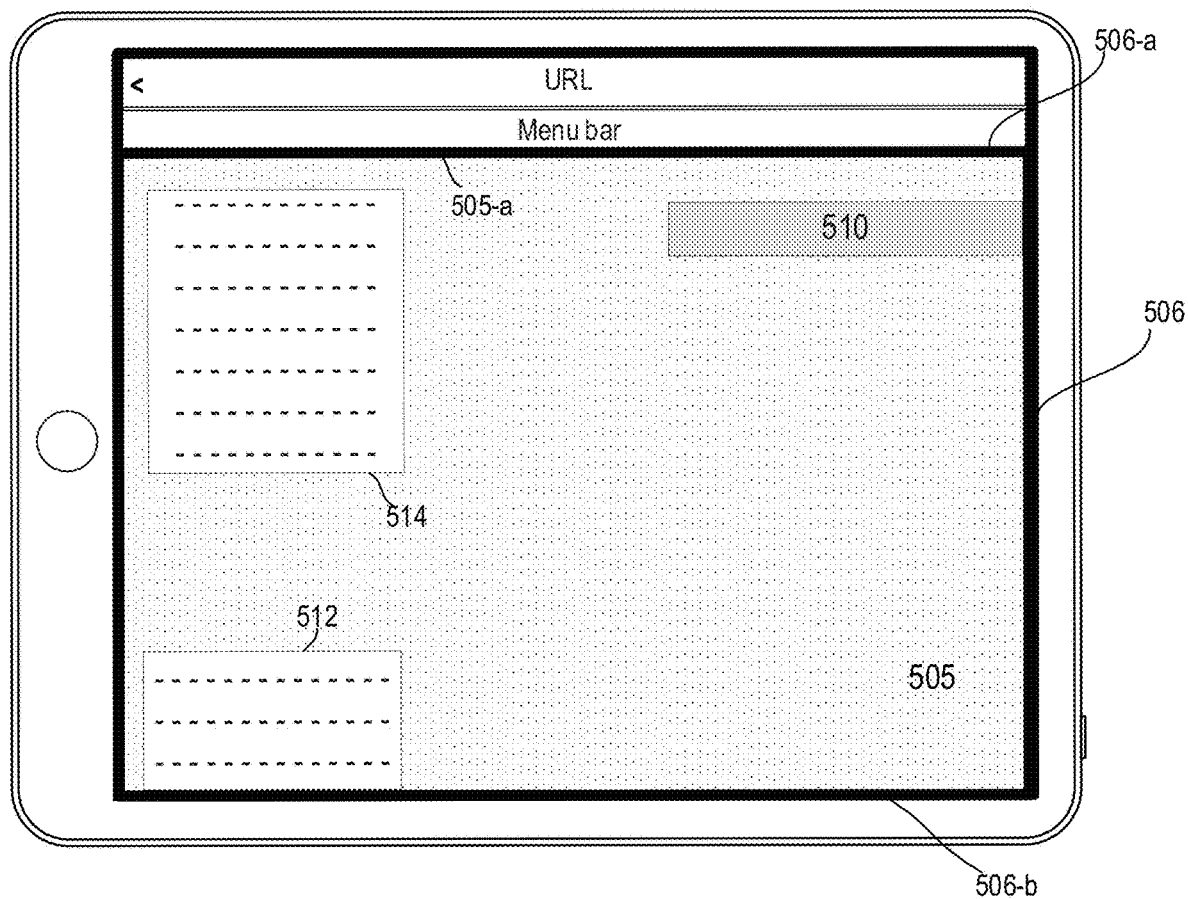

In FIG. 5E, the user releases the contact at 520-*d*. In response to detecting the release of the contact, the respective portion of the electronic document that has been translated in accordance with the finger movement returns to the equilibrium position where the content boundary 505-*a* is on window edge 506-*a*, as shown in FIG. 5F. Optionally, this return movement occurs without further user intervention (e.g., the respective portion of the document bounces back automatically upon detection of the release of the contact).

Optionally, during the return movement, the respective portion of the electronic document, including content boundary 505-*a* and the background, is translated in the second direction (524), which is opposite the direction in which the electronic document was previously translated in response to the finger movement, until the content boundary 505-*a* reaches window edge 506-*a* (FIG. 5F). The objects 512 and 514 of the third type are, optionally, translated in the same manner as the respective portion of the electronic document. The objects 512 and 514 are, optionally, treated as part of the respective portion of the electronic document.

In some embodiments, the return movement to the equilibrium position is triggered by the detection of the release of the contact, as shown in FIG. 5E. Optionally, the return movement is triggered by the detection of the end of the scroll input (e.g., a user stops dragging but keeps the contact on the display). Optionally, the return movement is not triggered from the detection of the end of the scroll input if the gesture that provided the scroll input does not completely come to an end (e.g., no longer detected). For example, if the user stops dragging but still maintains the contact on the display, the electronic document is kept stationary at the position at which the document was previously pulled from the user's dragging gesture and does not initiate a return movement until after the liftoff of the contact is detected. Optionally, the return movement is triggered by ceasing to detect the input that provided the scroll input such as, non-exclusively, ceasing to detect a mouse input, a hand-motion input, a motion input of any other bodily parts, a stylus input, and any other mechanical or physical inputs that were at least partially recognized as the scroll input.

Referring to FIG. 5E, during the return movement, content boundary 505-*a* is translated in the second direction after the end of the input, and, thus, the size of the gap 505-G reduces until the gap is completely removed as content boundary 505-*a* reaches window edge 506-*a* (FIGS. 5E-5F). As content boundary 505-*a* is translated in the second direction (in the upward direction in FIGS. 5E-5F), first-type object 510 returns to be inside content boundary 505-*a*.

In some embodiments, the return movement is simulated to be a restoring behavior of an elastic material after the force that was previously applied to stretch the material stops being applied (e.g., stops being detected). For example, the gap area 505-G that is created as content boundary 505-*a* is pulled inside the edge of the window 5060-*a* is simulated to behave as an elastic material (e.g., a rubber band or spring) that does not undergo a deformation regardless of the magnitude of the force (e.g., amount of the finger movement). After the detection of the liftoff of the contact, the lower end of the gap 505-G (e.g., content boundary 505-*a*) returns to the equilibrium position as if the rubber band or spring is let go after being stretched from the pulling force. The equilibrium position is the position in which the lower end of the gap 505-G substantially coincides with its upper end at window edge 506-*a*.

In some embodiments, the speed of the return movement in the second direction after the end of the input is performed at a speed faster than a speed at which the respective portions of the electronic document were previously translated in accordance with the input. Optionally, the return movement in the second direction is performed at a predetermined speed. Optionally, the return movement in the second direction is performed at a varying speed so as to be completed in a predefined time period regardless of how deep inside the edge of the window was the content boundary previously pulled (e.g., completed in 0.1 sec., 0.2 sec., 0.3 sec, 0.4 sec, 0.5 sec, etc.).

The various features described above with reference to FIGS. 5A-5F are optional, and any one or more of these features can be removed, modified, or combined with any other features described herein with reference to other figures (e.g., FIGS. 5G-5T and FIGS. 6A-6K), as will be apparent to those skilled in the art. For brevity, such modifications and permutations are not repeated for every subsequent example described below but are deemed within the scope of the present disclosure.

Figure 5G:
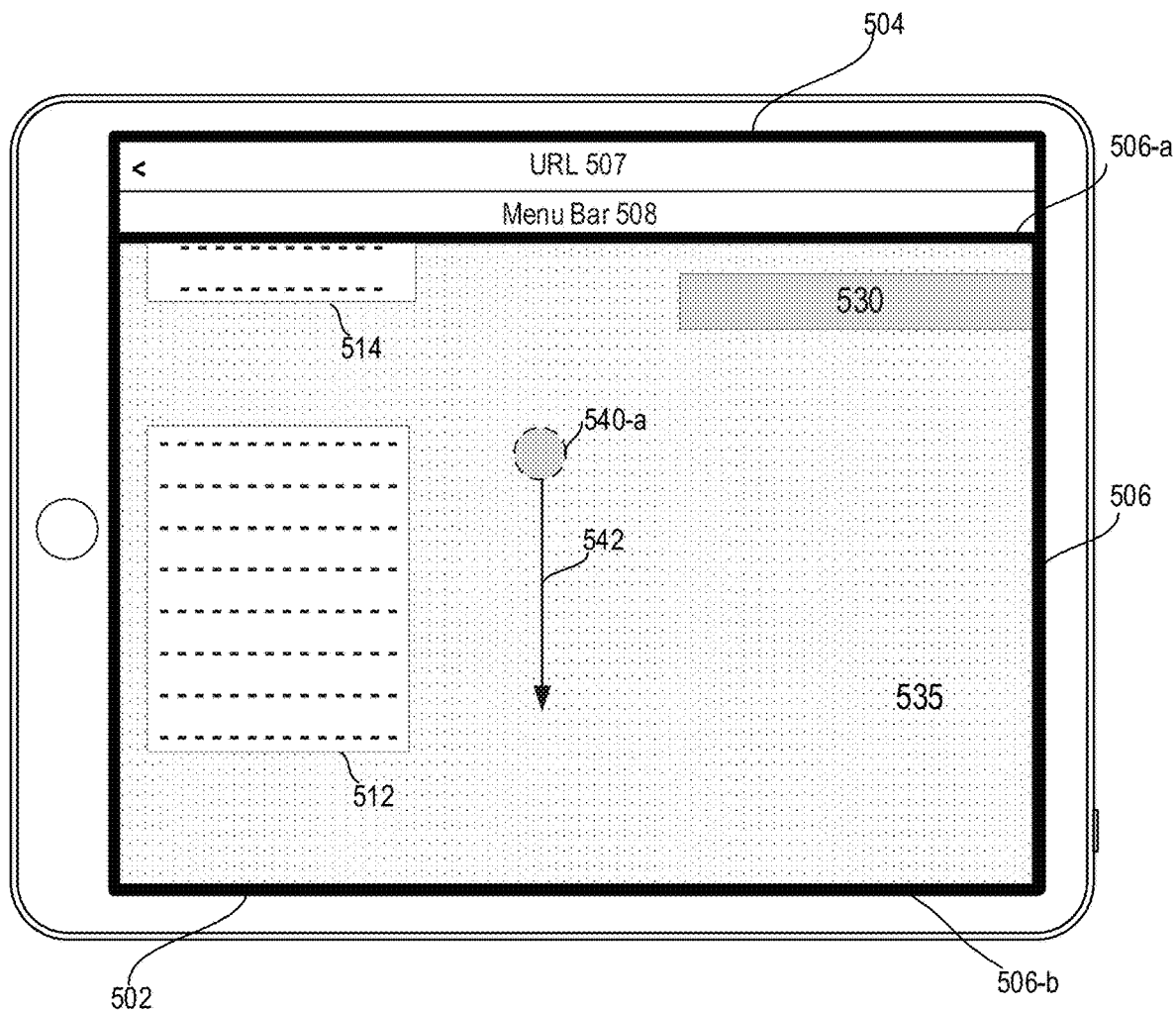
FIGS. 5G-5K illustrate an exemplary implementation of coordinated movements of an electronic document and an object of a second type according to various embodiments of the disclosure.

FIGS. 5G-5K illustrate an example of coordinated movements of an electronic document and an object of a second type (e.g., object 530) contained therewithin. FIG. 5G illustrates an electronic device with a touch-sensitive display. On the display, an electronic document 535 is displayed in content window 506. The electronic document 535 contains objects 512 and 514 of the third type and object 530 of the second type. The behaviors of the third-type objects are similar to those explained above with reference to FIGS. 5A-5F.

In FIG. 5G, the user provides an input that corresponds to a request to translate the electronic document in the first direction by making an initial finger contact at 540-*a* and continuously moving the finger contact in direction 542. This input is recognized as a request to translate the electronic document 535 in direction 542, and in response to detecting this input device 500 translates respective portions of electronic document 535 in direction 542 in accordance with the detected input.

Figure 5H:
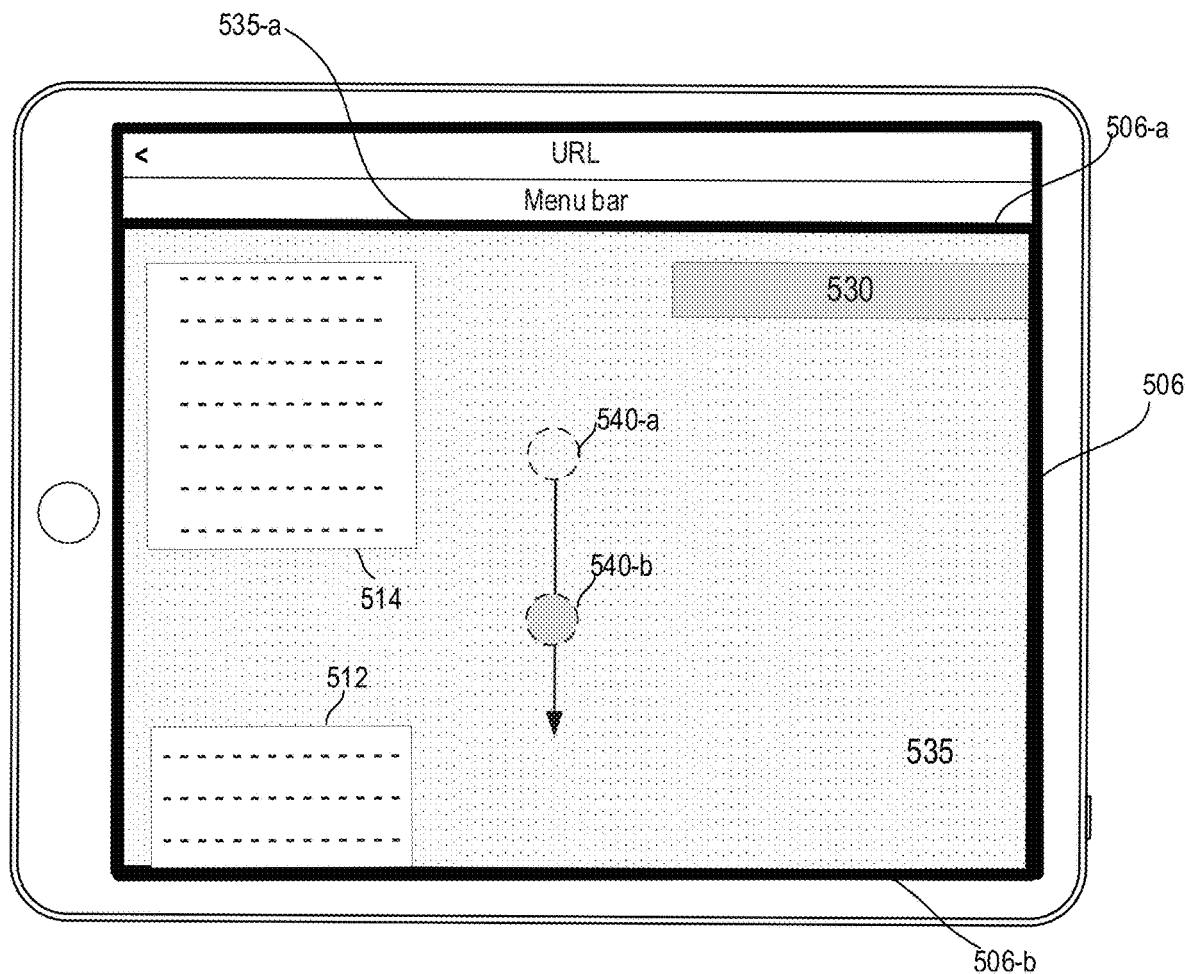

In FIG. 5H, in accordance with the detected input (e.g., the downward finger movement from 540-*a* to 540-*b*), the respective portion of the electronic document 535, including content boundary 535-*a* and the background, is translated in the downward direction. The objects 512 and 514 of the third type are translated with the respective portion of the electronic document. In comparison, the second-type object 530 does not move and remains stationary relative to the edge(s) of the window. The object 530 remains stationary until the content boundary 535-*a* reaches window edge 506-*a* and starts being translated with the respective portions of the electronic document 535, once the content boundary 535-*a* has passed window edge 506-*a* and as the content boundary 535-*a* is pulled inside window edge 506-*a*. Optionally, the object 530 remains stationary relative to the edges of the window while the respective portions of the electronic document 535 are translated. This causes at least a part of the respective portions (a part of the background that is directly under the second object 530 in FIGS. 5G-5H) to be translated under the object 530. Optionally, the part of the respective portions that is passed under the object 530 is at least partially visible through the object 530 from underneath.

For example, the second-type object 530 remains stationary in a fixed position relative to one or more edges of the content window (e.g., 506-*a*, 506-*b*, 506-*c*, and/or 506-*d*) while the respective portions of the electronic document 535 are translated in accordance with the input (finger movement from 540-*a* to 540-*b*) until the content boundary 535-*a* reaches window edge 506-*a*. The second-type object 530 then starts being translated along with the respective portions of the electronic document 535 in accordance with the input after the content boundary passes window edge 506-*a* and as the content boundary is pulled inside window edge 506-*a* from the input, as shown in FIG. 5I.

Figure 5I:
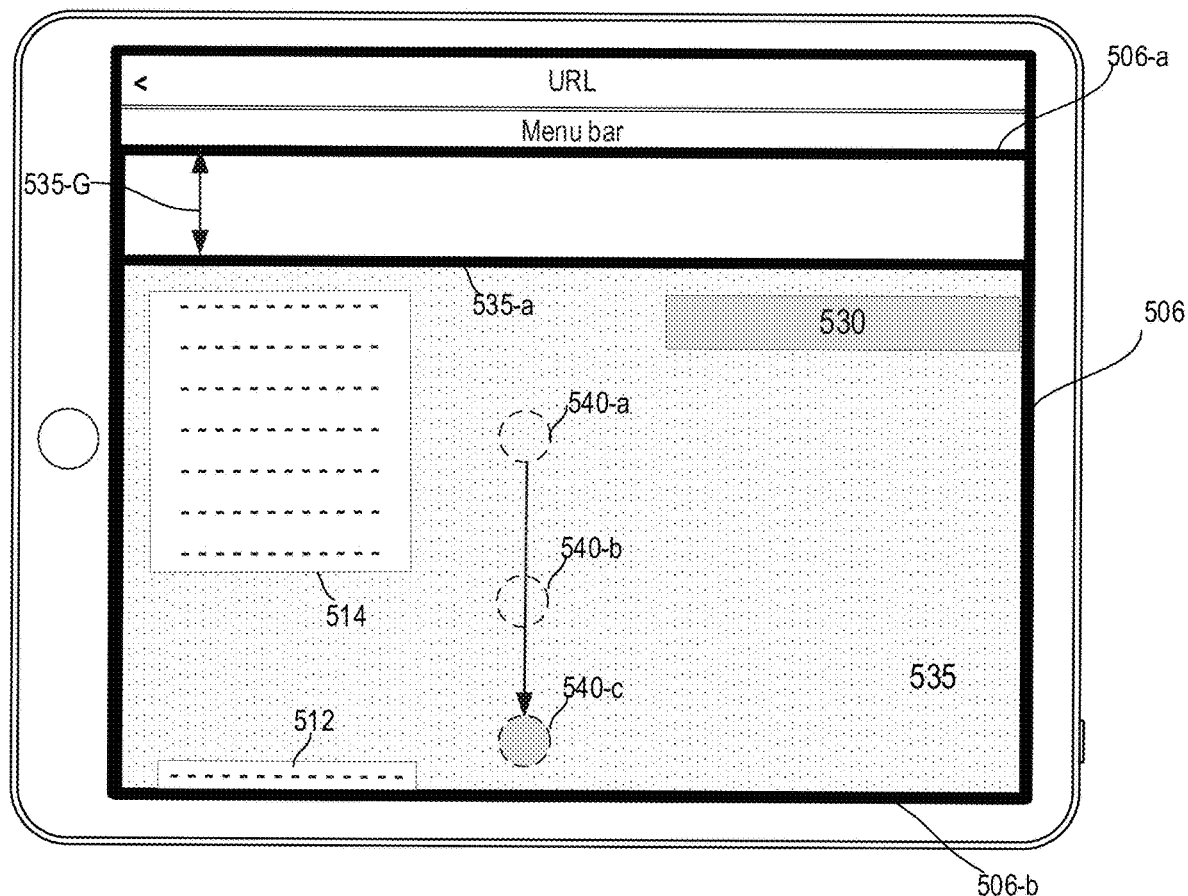

In FIG. 5I, as the content boundary 535-*a* passes and is pulled inside window edge 506-*a* in accordance with the finger movement from 540-*b* to 540-*c*, the object 530 is translated with the respective portions of the electronic document 535, although the object 530 has remained stationary in response to the finger movement from 540-a to 540-b. Optionally, the object 530 of the second type has a fixed position relative to the edge(s) of the content window (e.g., 506-a, 506-b, 506-c, and/or 506-d) before the content boundary 535-a of the electronic document 535 reaches window edge 506-a, Furthermore, object 530 of the second type has a fixed position relative the edges(s) of the electronic document 535 (the content boundaries of the electronic document 535) after the content boundary 535-a has reached window edge 506-a and as the content boundary 535-a is pulled inside window edge 506-a. The translation of the respective portions of the electronic document 535 has a linear relationship with the input until the content boundary 535-a reaches window edge 506-a, and the translation of the respective portions of the electronic document 535 and the object 530 has a non-linear relationship with the input after the content boundary 535-a has reached window edge 506-a and as it is pulled inside the edge of the window. The various characteristics of such behaviors are explained with reference to FIGS. 5A-5F and will not be repeated here, for brevity.

Figure 5J:
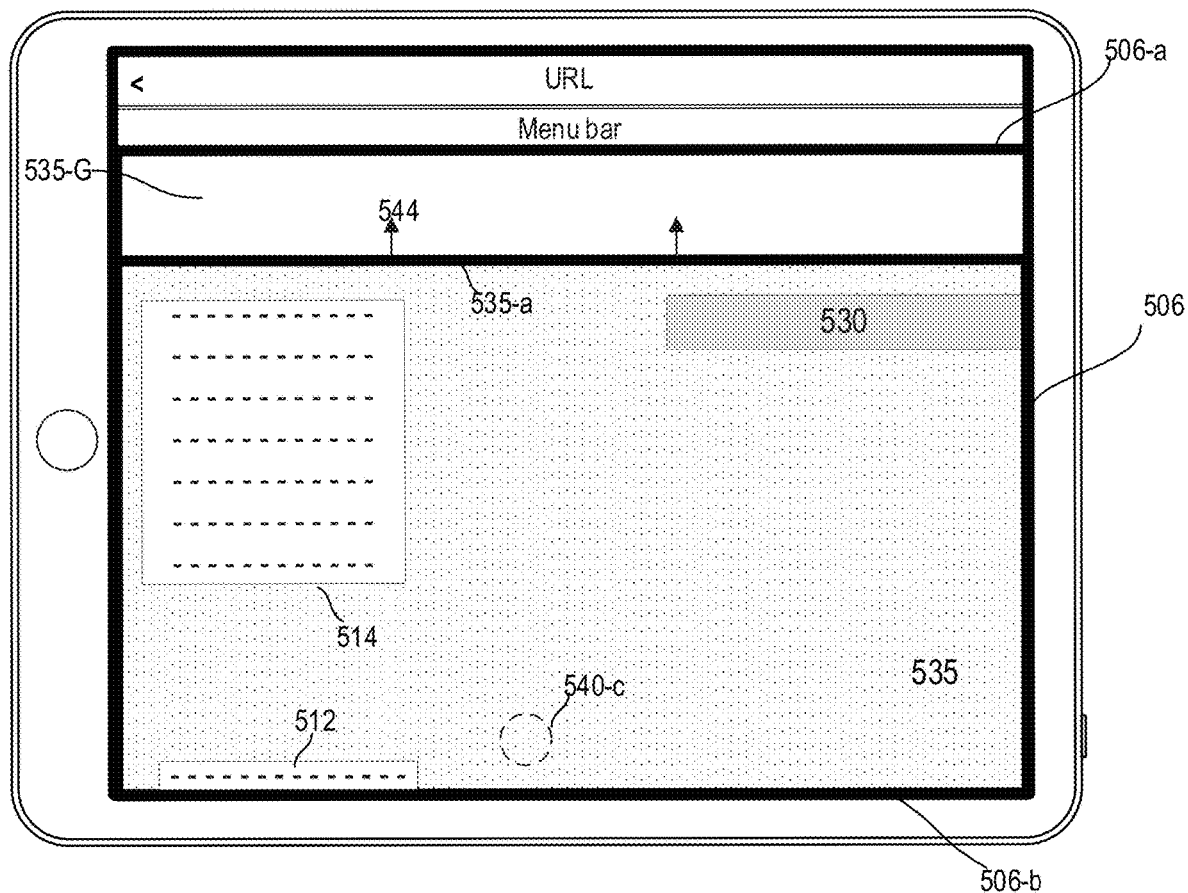
Figure 5K:
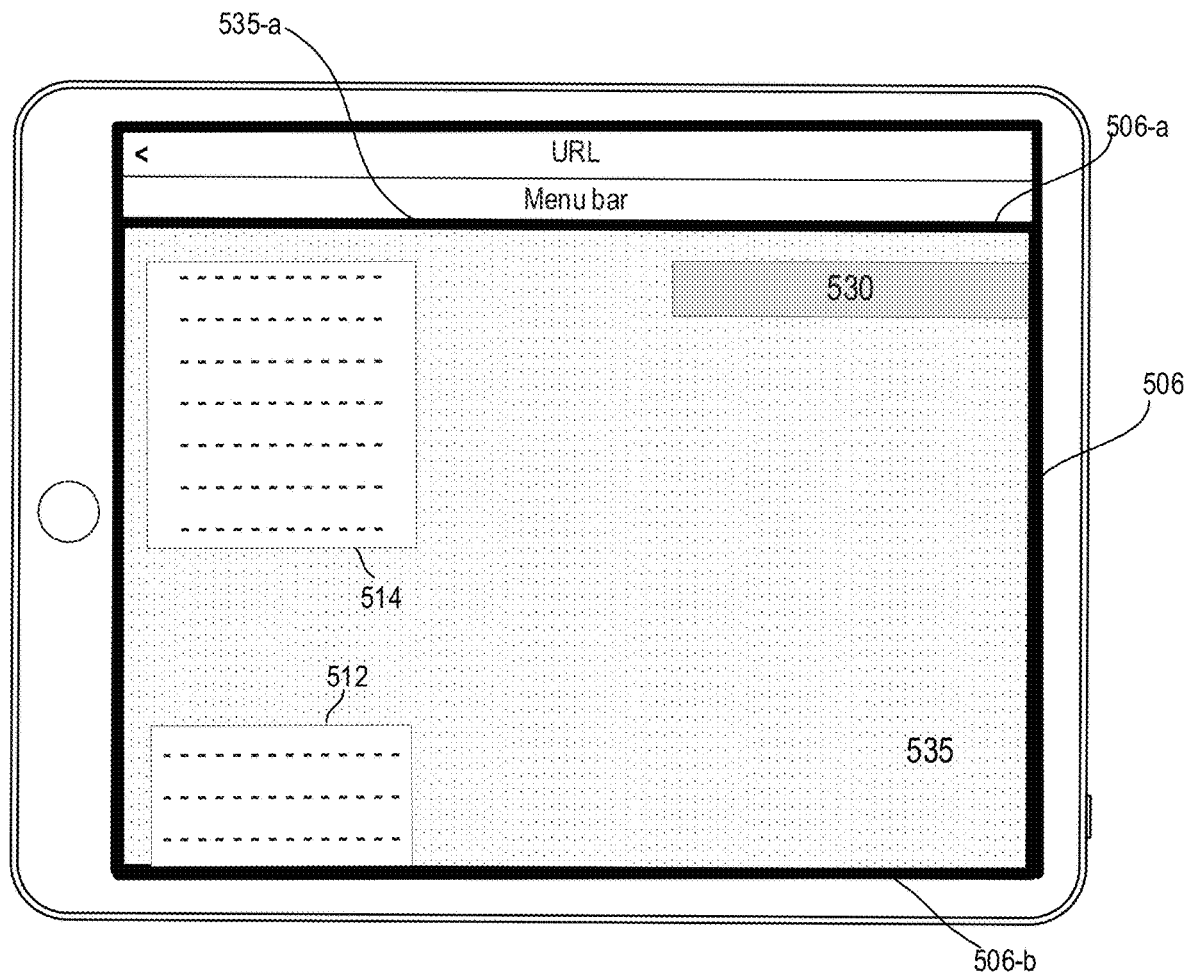

Referring to FIG. 5I, as the content boundary 535-a is pulled inside the edge 506-a of the window, gap 535-G is created therebetween. The size of this gap increases as the content boundary 535-a is pulled further inside the edge of the window. In FIG. 5J, the user releases the contact at 540-c. In response to detecting the release of the contact (or, optionally, the end of the scroll input), the respective portions of the electronic document 535 and the object 530 return to the equilibrium position. The equilibrium position is the position in which the content boundary 535-a is translated in the second direction (upward direction 544 in FIG. 5J) to be on or approximately near window edge 506-a. The second object 530 is subject to the same restoration behavior as the respective portions of the electronic document 535, including the background and content boundary 535-a. The objects 512 and 514 of the third type are also translated with the respective portion of the electronic document 535 during the restoring behavior. After the restoration is complete, the content boundary 535-a is back on window edge 506-a, and the objects 514, 512 and 530 are returned to their respective positions as shown in FIG. 5K. Such restoring movement occurs without further user intervention (e.g., the pulled portions of the document bounce back automatically to return to the equilibrium position). The details of the restoration behavior are explained with reference to FIGS. 5D-5F and will not be repeated here, for brevity.

The various features described above with reference to FIGS. 5G-5K are optional, and any one or more of these features can be removed, modified, or combined with any other features described herein with reference to other figures (e.g., FIGS. 5A-5F, FIGS. 5K-5T, and FIGS. 6A-6K), as will be apparent to those skilled in the art. For brevity, such modifications and permutations are not repeated but are deemed within the scope of the present disclosure.

Figure 5L:
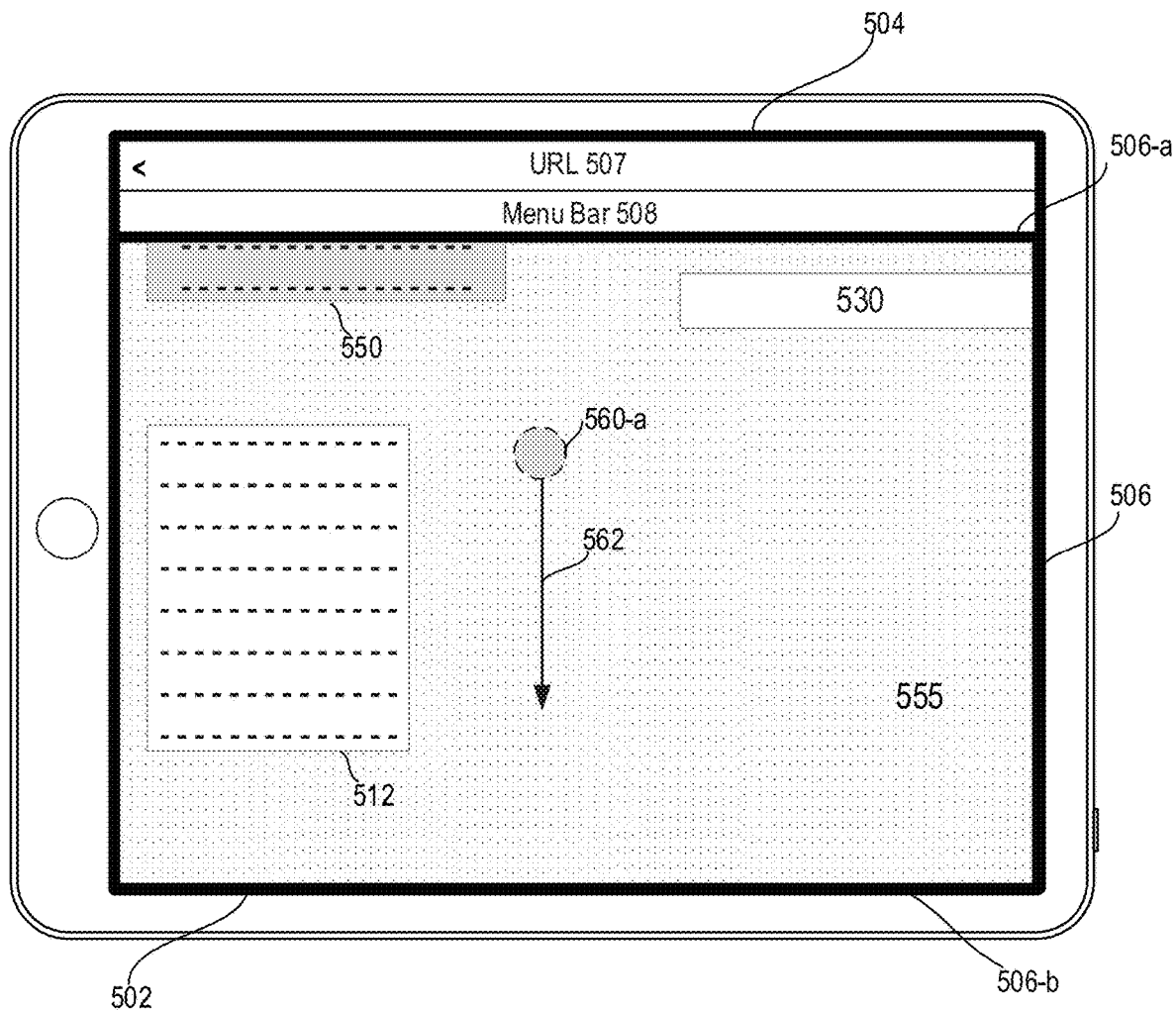
FIGS. 5L-5P illustrate an exemplary implementation of coordinated movements of an electronic document and an object of a fourth type according to various embodiments of the disclosure.

FIGS. 5L-5P illustrate an example of coordinated movements of an electronic document and an object of a fourth type (e.g., object 550) contained therein. FIG. 5L illustrates an electronic device with a touch-sensitive display. On the display, an electronic document 555 is displayed in content window 506. The electronic document 555 contains object 512 of the third type, object 530 of the second type, and object 550 of the fourth type.

In FIG. 5L, the user provides an input that corresponds to a request to translate the electronic document 555 in a first direction by making an initial finger contact at 560-a and continuously moving the finger contact in direction 562. This input is recognized as a request to translate the electronic document 555 in direction 562, and in response to detecting this input, the device translates respective portions of the electronic document 555 in direction 562 in accordance with the input (as shown in FIG. 5M).

Figure 5M:
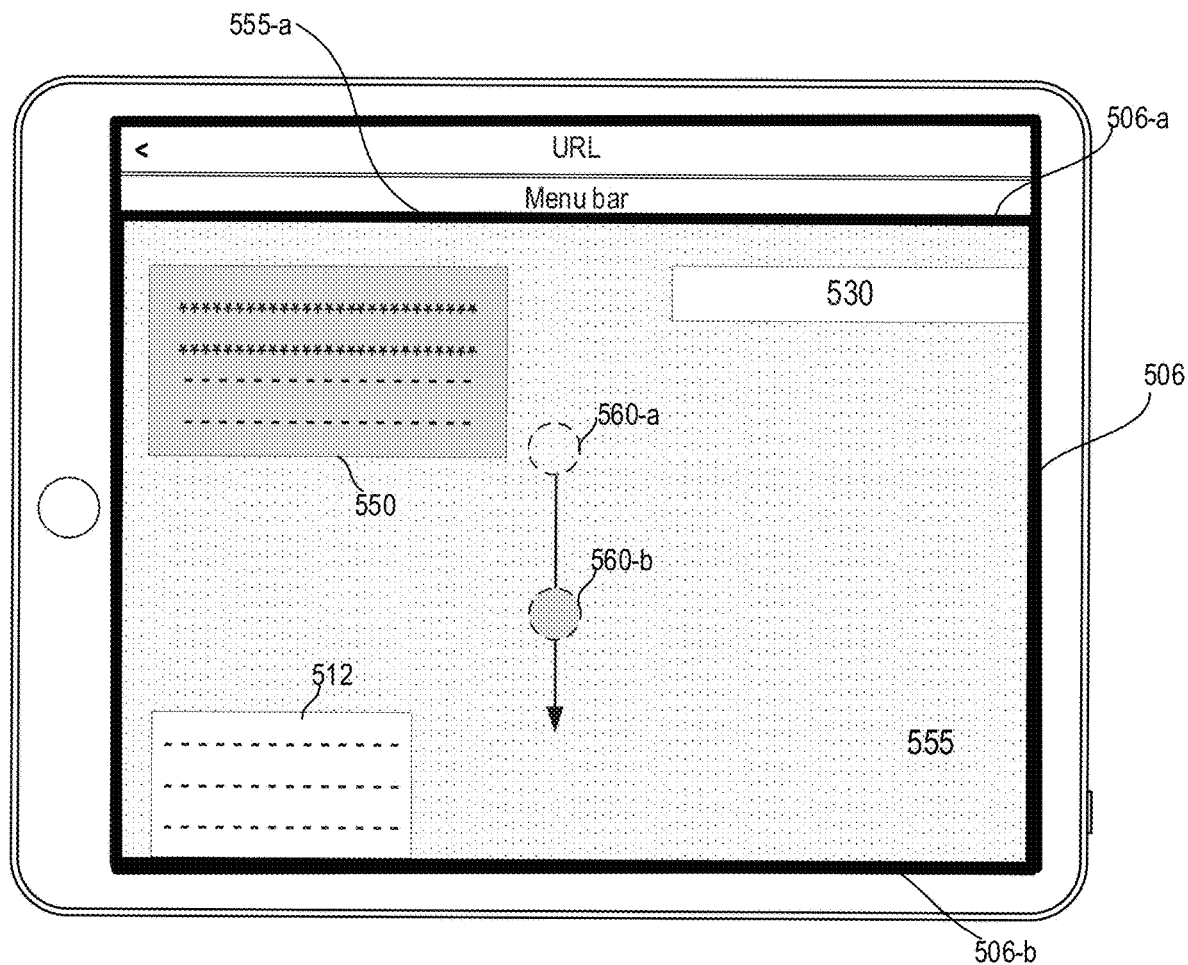

In FIG. 5M, in accordance with the downward finger movement from 560-a to 560-b, the respective portion of the electronic document 555, including the background and content boundary 555-a, is translated in direction 562. The object 512 of the third-type is also translated with the respective portion of the electronic document 555. The object 550 of the fourth type is also translated along with the respective portions of the electronic document 555 in accordance with the finger movement from 560-a to 560-b until the content boundary 555-a reaches window edge 506-a. The object 530 of the second type, as explained above, remains stationary before the content boundary 555-a reaches window edge 506-a.

Figure 5N:
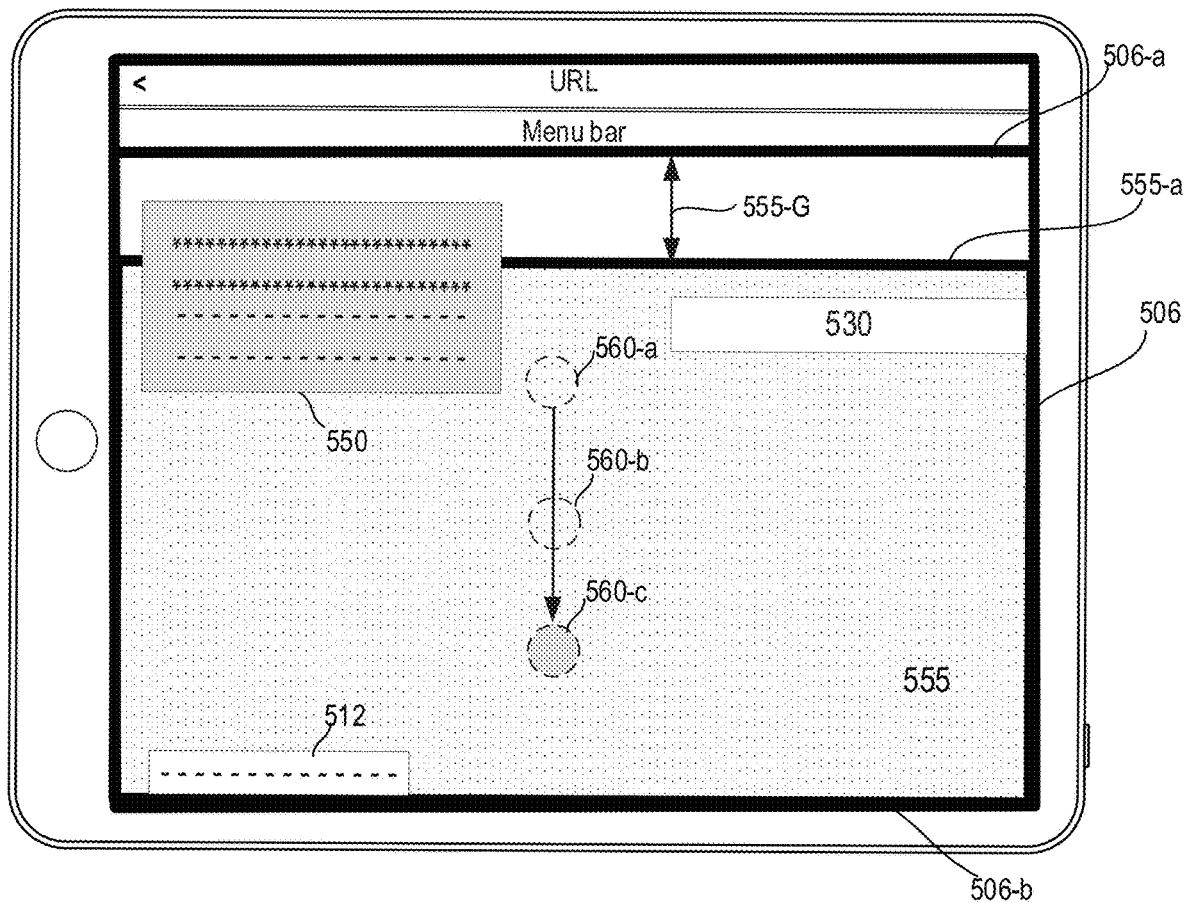

As shown in FIG. 5M, when the finger is moved to 560-b, the content boundary 555-a reaches window edge 506-a. At this point, the object 550 of the fourth type remains stationary despite the further finger movement, and the object 530 of the second type begins to be translated along with the respective portions of the electronic document 555, including the content boundary 555-a and background (as shown in FIG. 5N). The object 512 of the third type is translated with the respective portion of the electronic document 555. Specifically, in FIG. 5N, the object 550 remains stationary while the respective portions of the electronic document 555 (the background, content boundary 555-a) and object 512 of the third type and object 530 of the second type, are translated in the downward direction in accordance with the finger movement from 560-b to 560-c.

In some embodiments, the objects 550 of the fourth type is fixed relative to the edges of the electronic document 555 (content boundaries of the electronic document 555) before the content boundary 555-a reaches window edge 506-a; and the objects 550 of the fourth type is fixed relative to the edges of the window 506 after the content boundary 555-a reaches window edge 506-a and as the content boundary 555-a is pulled inside window edge 506-a. The translation of the respective portions of the electronic document 555 and object 550 has a linear relationship with the input until the content boundary 555-a reaches window edge 506-a (FIGS. 5L and 5M). After that, the translation of the respective portions of the electronic document 555 and the object 530 has a non-linear relationship with the input after content boundary 555-a has reached window edge 506-a, and as the content boundary is pulled inside window edge 506-a (FIG. 5N). The various characteristics of such behaviors are explained with reference to FIGS. 5A-5F and will not be repeated here, for brevity.

Figure 5O:
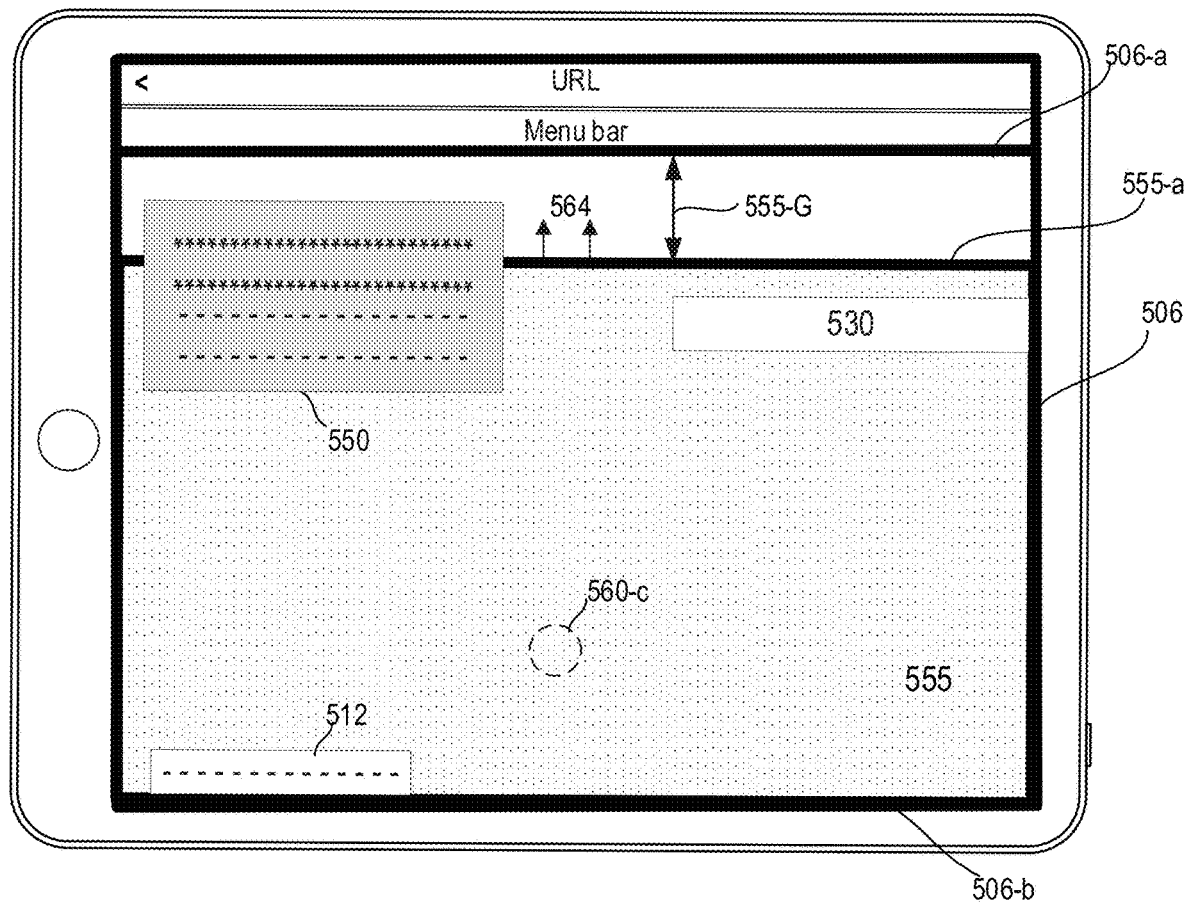

In FIG. 5O, the user releases the contact at 560-c. Upon detection of the release of the contact (or, optionally, the end of the scroll input), the respective portions of the electronic document 555 (the background and content boundary 555-a) and objects 512 and 530, are translated in the upward direction (direction 564) while the object 550 continues to remain stationary. In some embodiments, the object 530 of the second type remains stationary as the user moves the finger from 560-a to 560-b (FIGS. 5L and 5M) but starts being translated in accordance with the user's finger movement from 560-b to 560-c (FIG. 5N). The object 512 of the third type is translated in accordance with the finger movement, both in response to the finger movement from 560-*a* to 560-*b* (FIGS. 5L and 5M) and the finger movement from 560-*b* to 560-*c* (FIG. 5N). The object 550 of the fourth type is translated in accordance with the user's finger movement from 560-*a* to 560-*b* (FIGS. 5L and 5M) but remains stationary in response to the user's finger movement from 560-*b* to 560-*c* (FIG. 5N). The object 550 of the fourth type remains stationary even if that means that the object 550 is outside the content boundary 555-*a*, as shown in FIG. 5N, as the content boundary 555-*a* is pulled under and out of the object 550.

In some embodiments, as shown in FIGS. 5N and 5O, the content boundary 555-*a* and portions of the background of the electronic document 555 are passed under the object 550 as those are translated in the downward and upward directions in accordance with the finger movement or the restoration behavior. Optionally, the content boundary 555-*a* and the portions of the background that becomes under the stationary object 550 are at least partially visible through the object 550 from underneath.

Figure 5P:
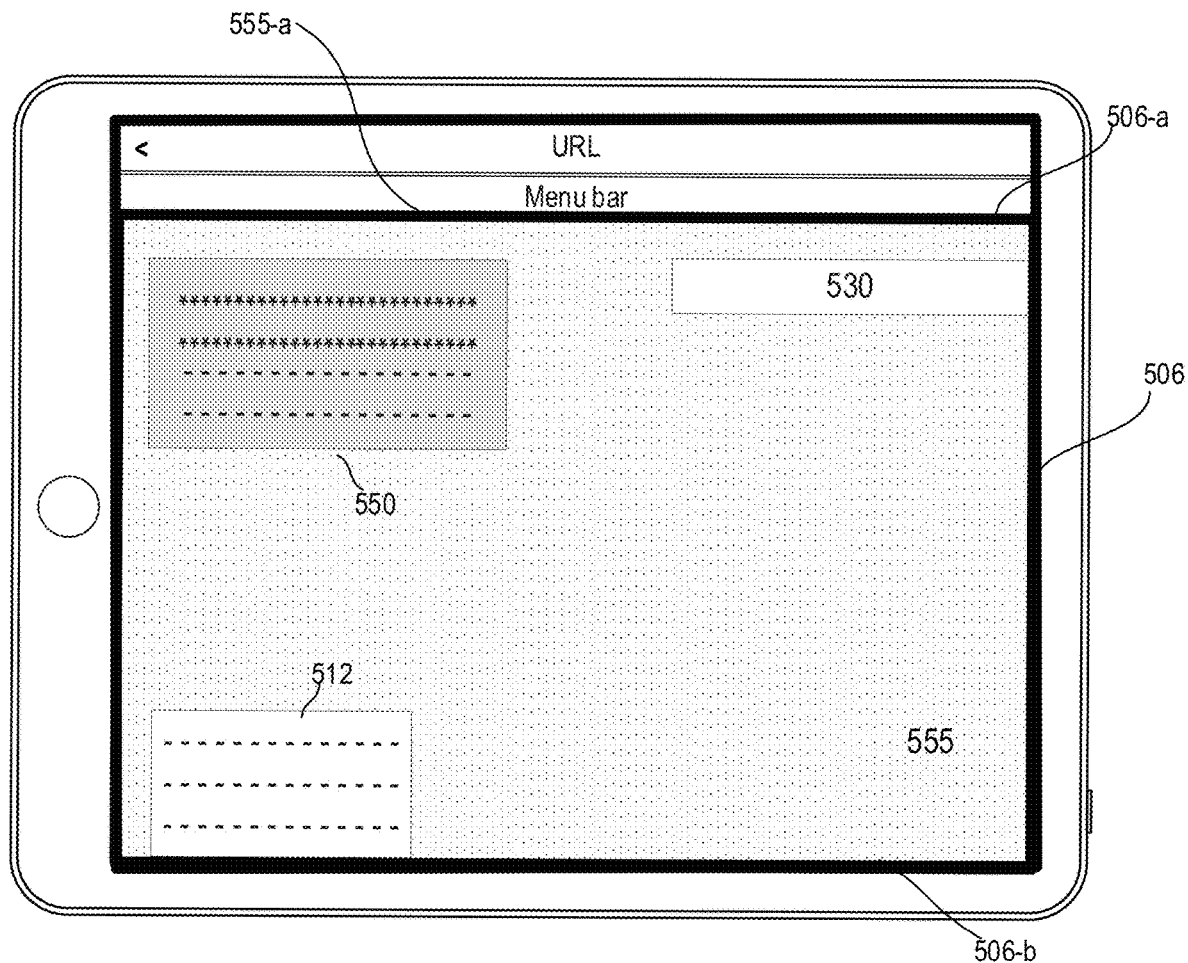
Figure 5Q:
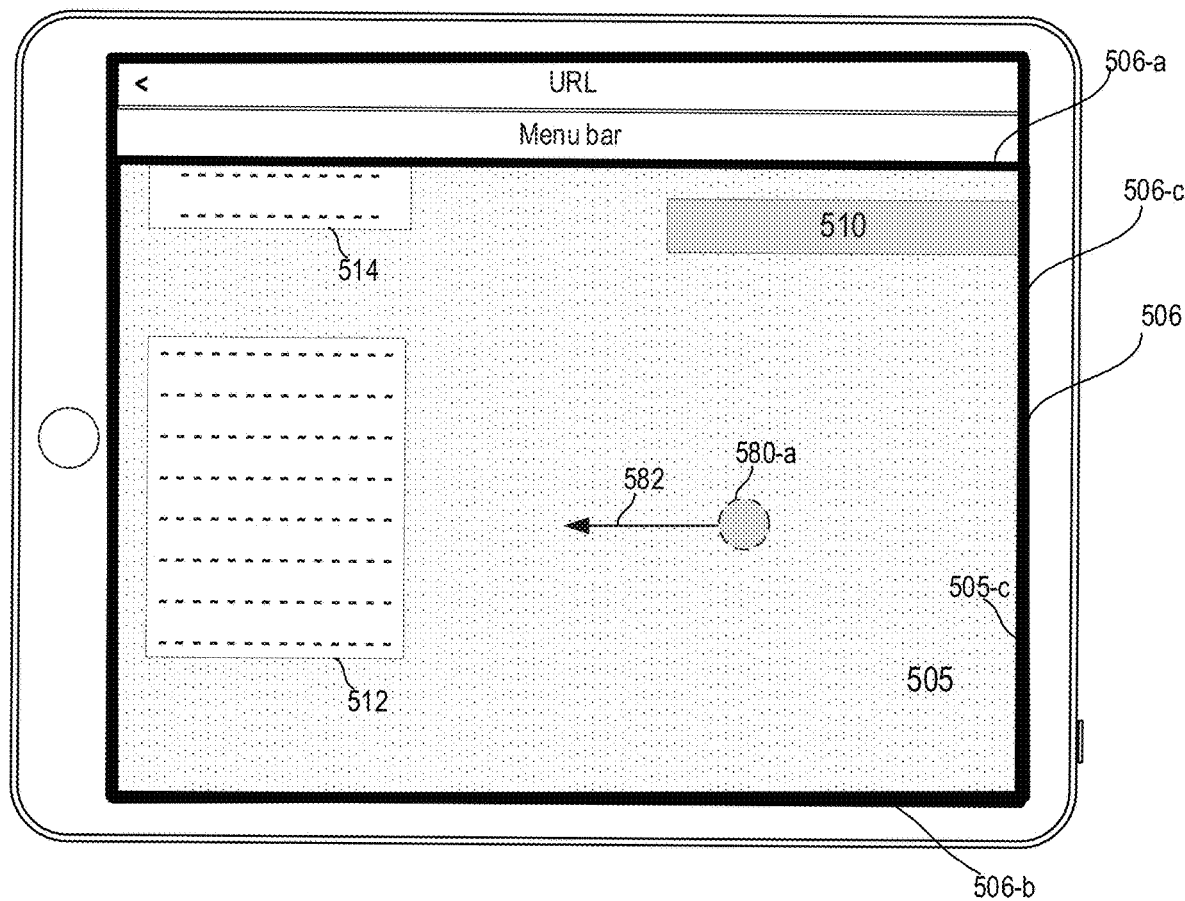
FIGS. 5Q-5T illustrate a further exemplary implementation of coordinated movements of an electronic document and an object of a first type according to various embodiments of the disclosure.
Figure 5R:
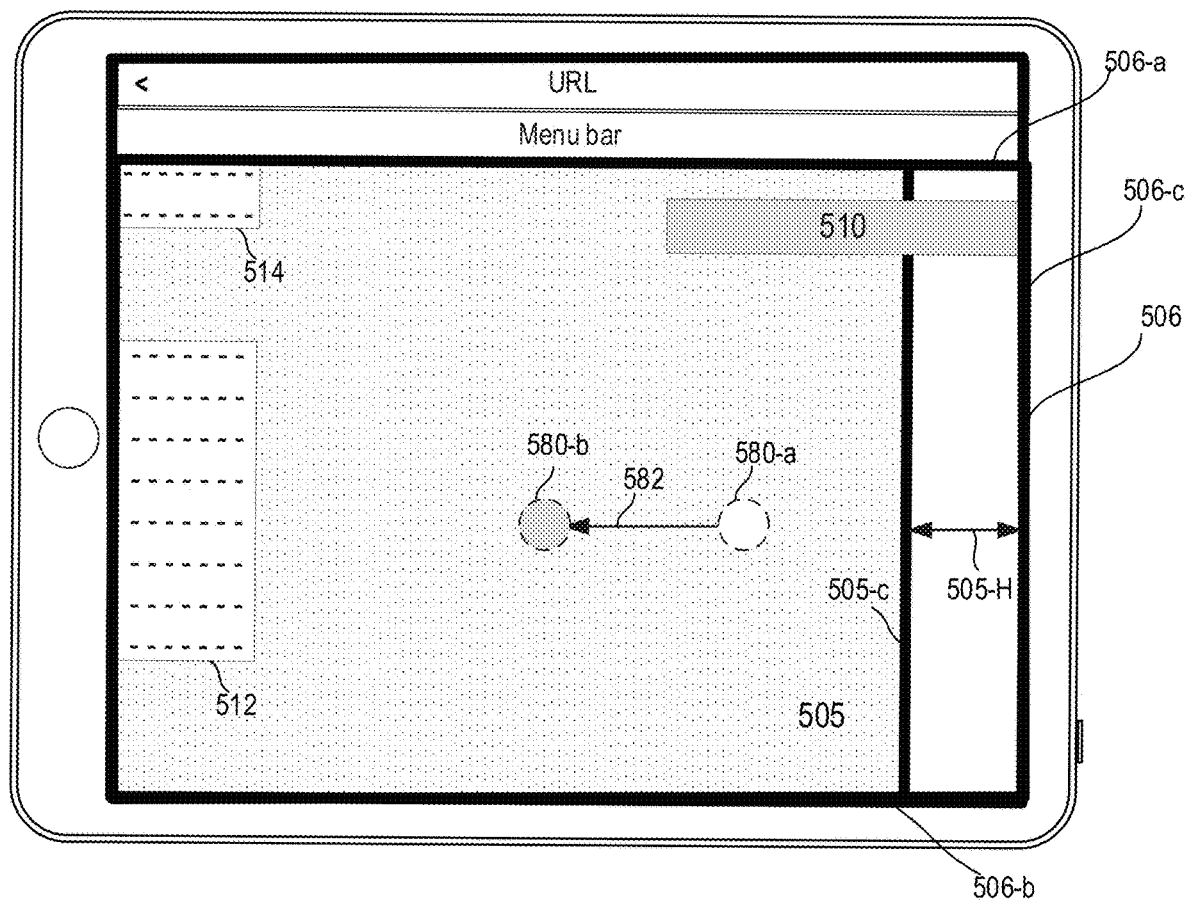

As shown in FIG. 5N, as the content boundary 555-*a* is pulled inside the top edge 506-*a* of the window, gap 555-G is created therebetween. The size of this gap increases as the content boundary 555-*a* is pulled further inside the edge of the window. In FIG. 5O, the user releases the touch contact at 560-*c*. In response to detecting the release of the contact, which is recognized as the end of the input, the respective portions of the electronic document 555, which have been pulled down in accordance with the finger movement from 560-*b* to 560-*c*, return to the equilibrium position. The equilibrium position is the position in which the content boundary 555-*a* is translated in the second direction (upward direction 564 in FIG. 5O) to be on or approximately near window edge 506-*a*. The second-type object 530 and third-type object 512 are subject to the same restoration behavior as the respective portions of the electronic document 555, including the background and content boundary 555-*a*. As the restoration behavior is carried out, the size of the gap 555-G is reduced accordingly. After the restoration is complete, the content boundary 555-*a* is on window edge 506-*a*, and the objects 514, 512 and 530 are returned to their respective positions, as shown in FIG. 5P. The fourth-type object 550 is not subject to the restoration behavior and remains stationary during the restoration movement of the respective portions of the electronic document 555 and objects 512, 514 and 530, as shown in FIGS. 5O and 5K. The details of the restoration behavior are explained with reference to FIGS. 5D-5F and will not be repeated here, for brevity.

The various features described above with reference to FIGS. 5L-5P are optional, and any one or more of these features can be removed, modified, or combined with any other features described herein with reference to other figures (e.g., FIGS. 5A-5K, FIGS. 5Q-5T, and FIGS. 6A-6K), as will be apparent to those skilled in the art. For brevity, such modifications and permutations are not repeated but are deemed within the scope of the present disclosure.

In some embodiments, an electronic document includes any combination of one or more of first type objects (e.g., object 510), second type objects (e.g., object 530), third type objects (e.g., objects 512 and 514), and fourth type objects (e.g., object 550). The characteristics of each of these types of objects optionally include the following:

The first-type objects such as object 510 (e.g., a toolbar, a menu bar, a background of a webpage) in an electronic document remains stationary (e.g., in a fixed position relative to edge(s) of the content window 506) at all relevant times of the translation—including (i) when a respective portion of the electronic document is translated in accordance with the input (e.g., a request to translate the document in a first direction, a scroll input) before the content boundary of the electronic document reaches the edge of the window; (ii) when the respective portion of the electronic document is translated in accordance with the input after the content boundary has reached the edge of the window and as the content boundary is pulled inside the edge of the window; and (iii) when the respective portion of the electronic document is translated after the end of the input to restore the position of the content boundary to an equilibrium position.

Optionally, the first-type objects have fixed positions relative to the edge(s) of the window regardless of whether the amount of the translation of the respective portion of the electronic document has a linear or non-linear relationship with the input.

The second type objects such as object 530 (e.g., a banner, a pop-up, a content box of a webpage) in an electronic document remains stationary (e.g., in a fixed position relative to edge(s) of the content window 506) when a respective portion of the electronic document is translated in accordance with the input (e.g., a request to translate the document in a first direction, a scroll input) before the content boundary of the electronic document reaches an edge of the window. But, the second-type objects are translated in accordance with the input (e.g., becomes to be in a fixed position relative to content boundaries of the electronic document) (ii) when the respective portion of the electronic document is translated in accordance with the input after the content boundary has reached the edge of the window and as the content boundary is pulled inside the edge of the window; and (iii) when the respective portion of the electronic document is translated after the end of the input to restore the position of the content boundary to an equilibrium position.

Optionally, the second-type objects have fixed positions relative to the edge(s) of the window when the amount of the translation of the respective portion of the electronic document has a linear relationship with the input. The second-type objects have fixed positions relative to the content boundaries of the electronic document when the amount of the translation of the respective portion of the electronic document has a non-linear relationship with the input.

The third-type objects such as objects 512 and 514 (e.g., content of a webpage, a text/image of a webpage, a background of a webpage) in an electronic document are translated in accordance with the input along with a respective portion of the electronic document at all relevant times of the translation (i) when a respective portion of the electronic document is translated in accordance with the input (e.g., a request to translate the document in a first direction, a scroll input) before the content boundary of the electronic document reaches the edge of the window; (ii) when the respective portion of the electronic document is translated in accordance with the input after the content boundary has reached the edge of the window and as the content boundary is pulled inside the edge of the window; and (iii) when the respective portion of the electronic document is translated after the end of the input to restore the position of the content boundary to an equilibrium position.

Optionally, the third-type objects have fixed positions relative to the content boundaries of the electronic document regardless of whether the amount of the translation of the respective portion of the electronic document has a linear relationship with the input or a non-linear relationship with the input.

The fourth-type objects such as object 550 (e.g., content of a webpage, a text/image of a webpage, a background of a webpage) in an electronic document are translated along with a respective portion of the electronic document (e.g., having a fixed position relative to the content boundaries of the electronic document) (i) when a respective portion of the electronic document is translated in accordance with the input (e.g., a request to translate the document in a first direction, a scroll input) before the content boundary of the electronic document reaches the edge of the window. However, the fourth-type objects remain stationary (e.g., having a fixed position relative to edge(s) of the content window) (ii) when the respective portion of the electronic document is translated in accordance with the input after the content boundary has reached the edge of the window and as the content boundary is pulled inside the edge of the window; and (iii) when the respective portion of the electronic document is translated after the end of the input to restore the position of the content boundary to an equilibrium position.

Optionally, the fourth-type objects have fixed positions relative to the content boundaries of the electronic document when the amount of the translation of the respective portion of the electronic document has a linear relationship with the input. And, the fourth-type objects have fixed positions relative to the edge(s) of the window when the amount of the translation of the respective portion of the electronic document has a non-linear relationship with the input.

In some embodiments, the type of an object changes dynamically based on factors such as, non-exclusively, a display mode and a scroll direction. For example, an object behaves like an object of a certain type when the electronic document is displayed in a full-screen mode, and the same object behaves like an object of a different type when the electronic document is displayed in other modes. Alternatively or additionally, an object behaves like an object of a certain type when the scroll input is in one direction, and the same object behaves like an object of a different type when the scroll input is in another direction.

In some embodiments, the electronic document is translated in multiple including, non-exclusively, left/right horizontal directions, up/down vertical direction, diagonal directions, 3-D directions, etc. It should be understood that the concepts of the present disclosure described above with reference to examples in FIGS. 5A-5P, which concern a downward vertical translation, are applicable to other examples involving translations in various other directions. For example, FIGS. 5Q-5R illustrate an example of an application of the concepts for a horizontal translation. In FIG. 5Q, the user provides an input that corresponds to a request to translate the electronic document 505 in the leftward direction, for example, by making an initial finger contact at 580-*a* and continuously moving the finger contact in direction 582. The same scroll request can be made in a variety of other ways including, non-exclusively, a mount drag, a key-input, a hand-motion, etc. The electronic document 505 includes objects 514 and 512 of the third type and object 51( )of the first type.

In FIG. 5R, in response to detecting the input that is recognized as a request to translate the electronic document 505 in the leftward direction, the device translates respective portions of the electronic document 505 in the requested direction in accordance with the input (finger movement from 580-*a* to 580-*b*). The respective portions of the electronic document 505 (including the background and content boundary 505-*c*) and objects 512 and 514 of the third type, are translated in accordance with the finger movement from 580-*a* to 580-*b*, and the first-type object 510 remains stationary so that the content boundary 505-*c* is pulled under and out of the first object 510. The translation of the respective portions of the electronic document 505 has a linear relationship with the finger movement until the content boundary 505-*c* reaches the edge of the window 506-*c*, and the translation of the respective portions of the electronic document 505 has a non-linear relationship with the finger movement as the content boundary 505-*c* passes the edge of the window 506-*c* and is pulled inside the edge of the window 506-*c*. The details of these behaviors are explained with reference to FIGS. 5A-5F and will not be repeated here, for brevity.

Referring to FIG. 5R, as the content boundary 505-*c* is pulled inside the edge 506-*c* of the window, gap 505-H is created therebetween. The size of this gap increases as the content boundary 505-*c* is pulled further inside the edge of the window 506-*c*. When the content boundary 505-*c* is pulled inside the edge of the window so that object 510 is outside the content boundary, object 510 is displayed in this gap area 505-H.

Figure 5S:
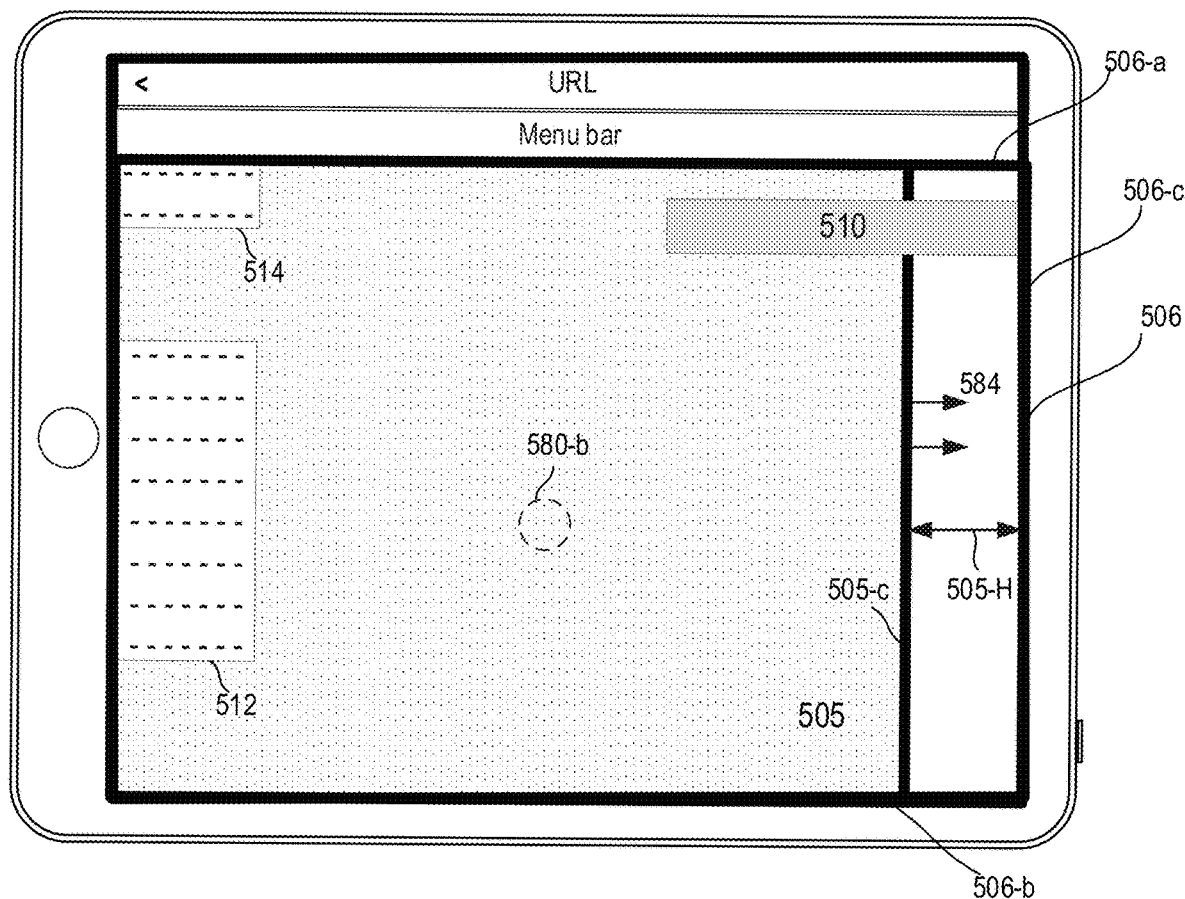
Figure 5T:
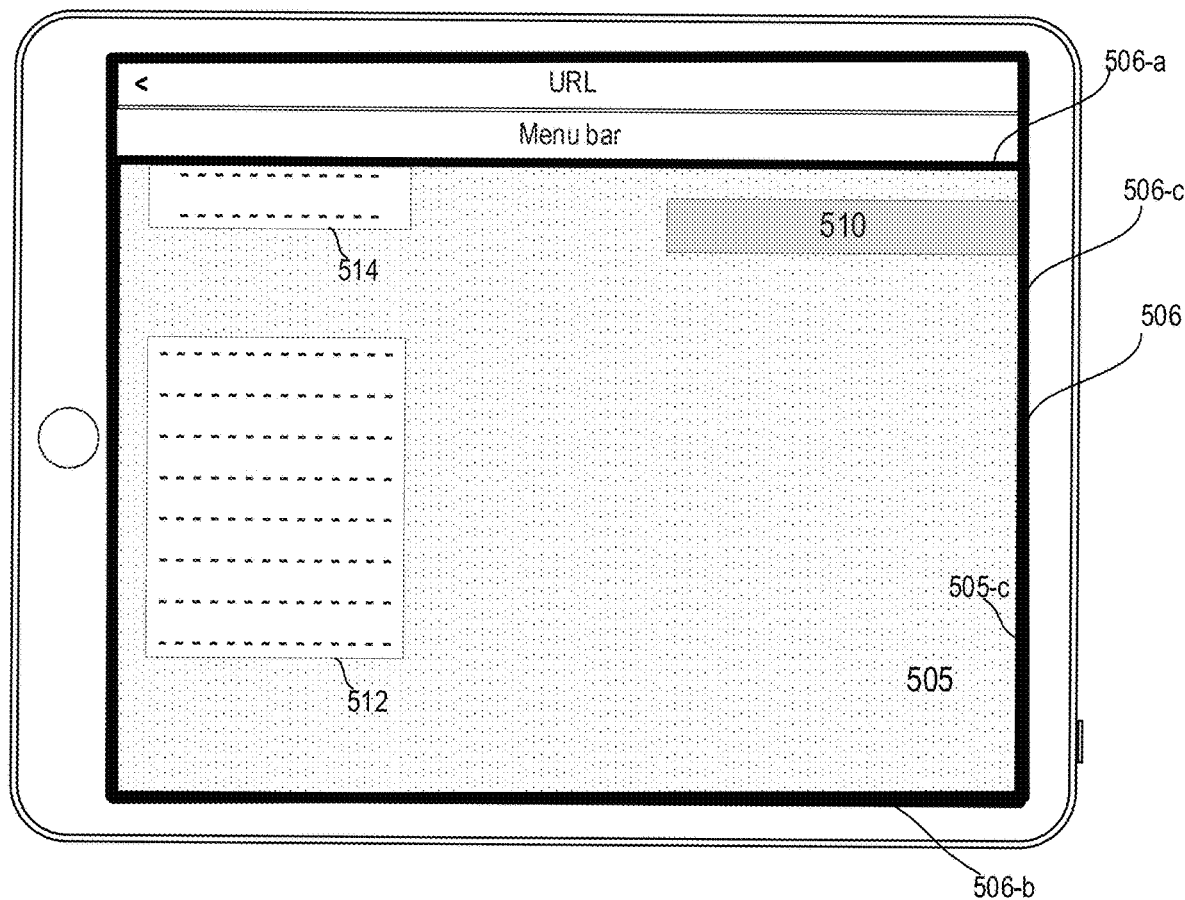

In FIG. 5S, the user releases the touch contact at 580-*b*. In response to detecting the release of the contact (or, optionally, the end of the scroll input), the respective portions of the electronic document 505 return to the equilibrium position where the content boundary 505-*c* is on or near the edge of the window 506-*c*. As the content boundary 505-*c* is translated toward the edge of the window 506-*c* in the rightward direction (584) during the restoration behavior, the gap 505-H reduces in size accordingly and is completely removed when the content boundary 505-*c* reaches the edge of the window 506-*c* (FIG. 5T). The first-type object 510 is not subject to the restoring behavior and remains stationary so that the object 510 is within inside the content boundary 505-*c* as the content boundary 505-*c* is translated in the rightward direction, as shown in FIG. 5T. The details of the restoring behaviors are described with reference to FIGS. 5D-5F and will not be repeated here, for brevity.

The illustrated features are only exemplary, and the same concepts can be applied in a similar manner to other embodiments (e.g., involving translations in a diagonal direction, z-direction, etc., a 3-D direction), as will be apparent to those skilled in the art. Such applications and permutations are deemed within the scope of the present disclosure.

The various features described above with reference to FIGS. 5Q-5T are optional, and any one or more of these features can be removed, modified, or combined with any other features described herein with reference to other figures (e.g., FIGS. 5A-5P and FIGS. 6A-6K), as will be apparent to those skilled in the art. For brevity, such modifications and permutations are not repeated but are deemed within the scope of the present disclosure.

2. Extended Background

As described above, the gap is generated between the pulled content boundary and the edge of the content window (e.g., 505-G in FIG. 5D, 535-G in FIG. 5I, 555-G in FIG. 5O, and 505-H in FIG. 5R) as the user attempts to translate the electronic document beyond the edge of the document (as the content boundary is pulled inside the edge of the window). The size of the gap area increases and decreases as the content boundary is pulled further inside the edge of the window, or is translated in the opposite direction from the restoring behavior. In some embodiments, this gap is displayed as distinct from the electronic document (e.g., so that the gap area is visually separated from the content boundary or the electronic document). For example, the gap is displayed in one color (e.g., grey, white) while the background of the electronic document has a different color or unrelated pattern or image. In some embodiments, the gap is displayed with a background that is generated based on the background of the electronic document. The background that is generated for display in at least a part of the gap area is referred hereinafter as an "additional background." Optionally, the additional background is generated so as to create a visual illusion that it is an extended part of the background actually contained in the electronic document. The descriptions below provide several examples of such applications involving the additional background for display in the gap area.

Figure 6A:
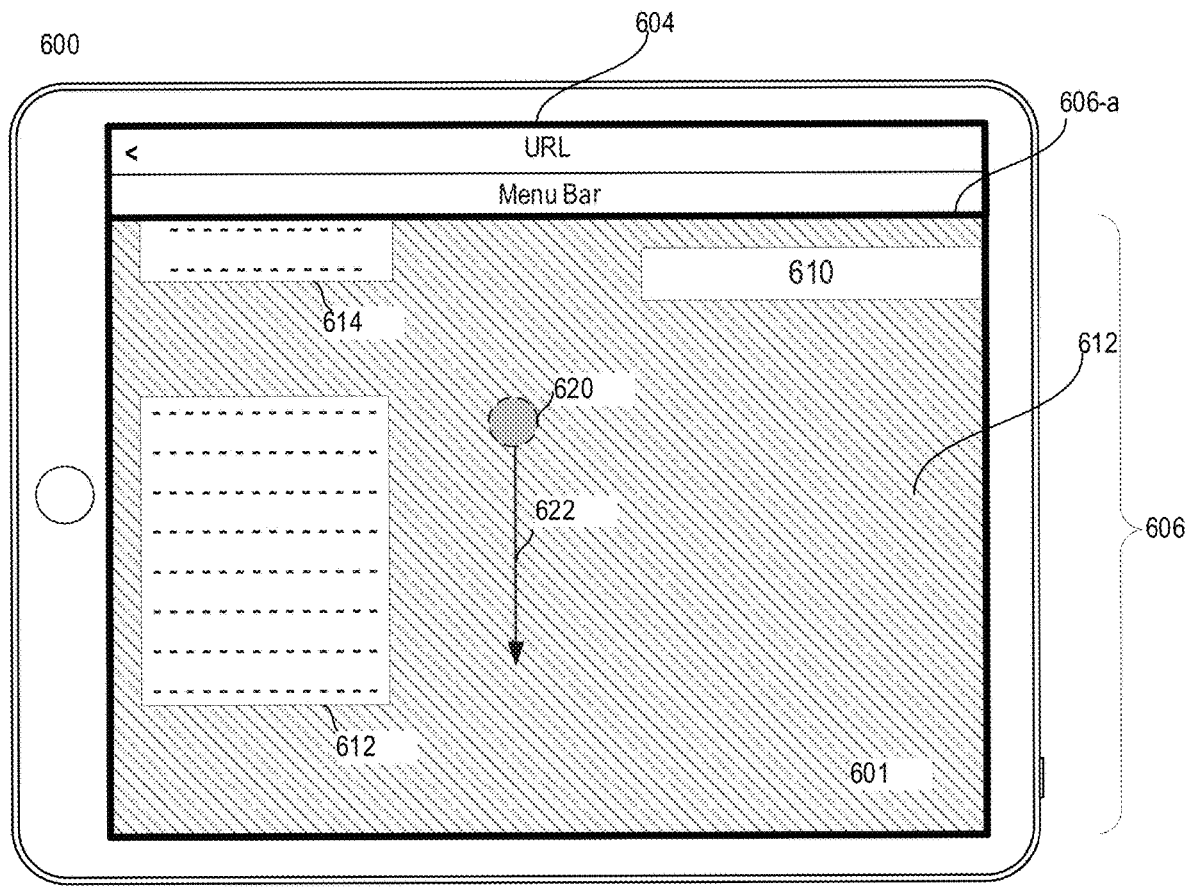
FIGS. 6A-6F illustrate an exemplary implementation of coordinated movement of an electronic document with a background according to various embodiments of the disclosure.

FIGS. 6A-6F illustrate an example of displaying additional background in a gap between a content boundary of an electronic document and an edge of a window. In FIG. 6A, electronic document 601 has objects 612 and 614 of the third type, object 610 of the first type, top content boundary 601-a (not shown in FIG. 6A but shown in FIG. 6B) and background 612 (a pattern of solid diagonal lines). The device 600 detects an input that corresponds to a request to translate the electronic document 601 in a first direction (e.g., a finger contact at 620 and subsequent continuous movement of the finger in direction 622, without lifting the finger).

Figure 6B:
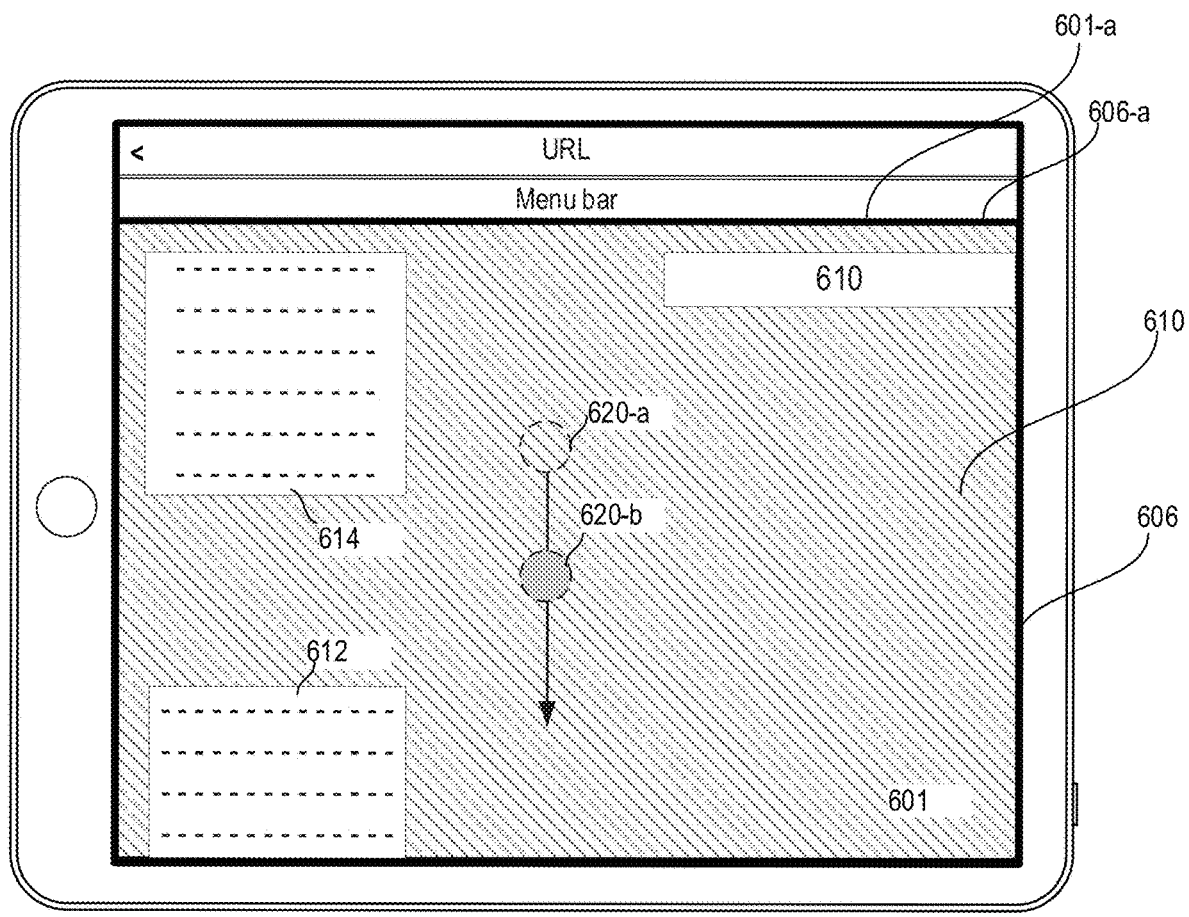

In FIG. 6B, in accordance with the finger movement from 620-a to 620-b, respective portions of the electronic document 601 (including the background 612 and top content boundary 601-a) and third-type objects 612 and 614, are translated in the first direction (the downward direction). The translation behavior of the respective portions of the electronic document 601 has a linear relationship with the finger movement from 620-a to 620-b until the content boundary 601-a reaches the edge of the content window 606-a, as shown in FIG. 6B. The first-type object 610 remains stationary.

Figure 6C:
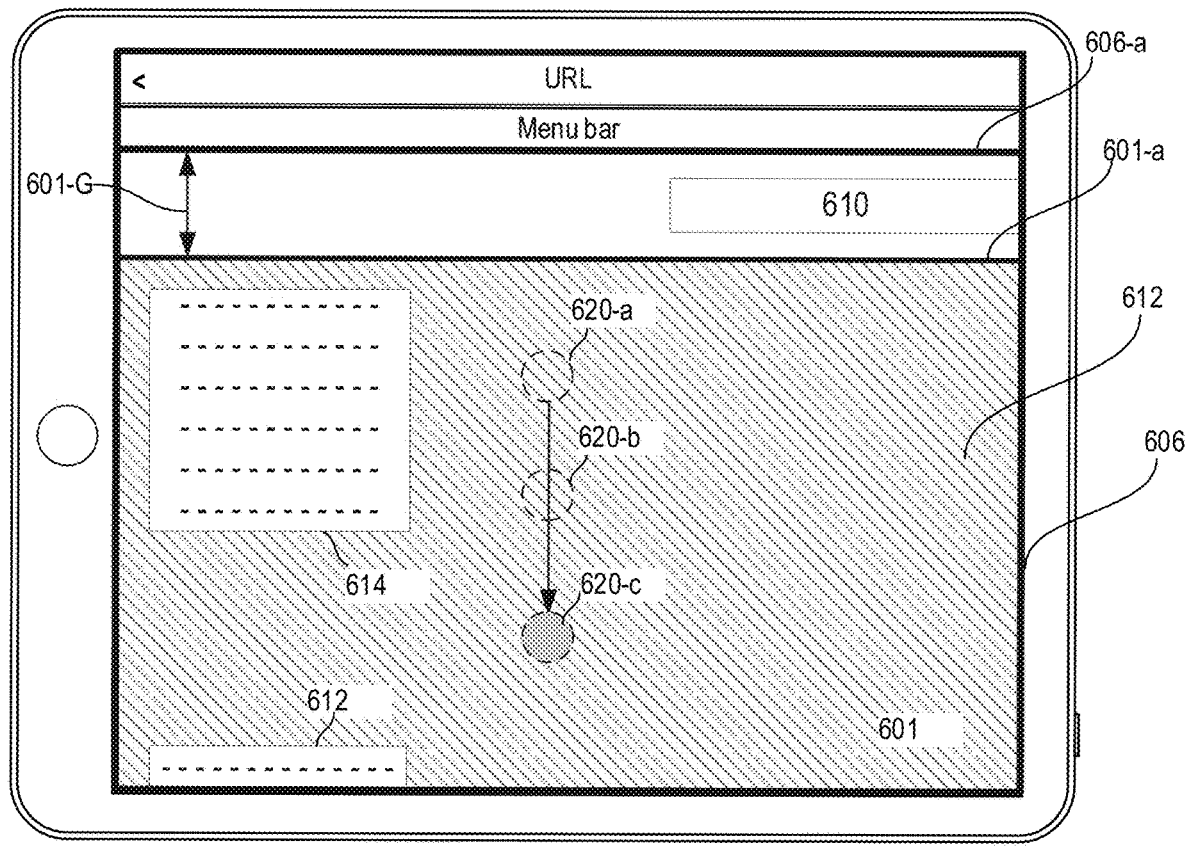

In FIG. 6C, as the user continues to move the finger down from 620-b to 620-c, the respective portions of the electronic document 601 are translated in a non-linear relationship with the finger movement from 620-b to 620-c, while the first-type object 610 continues to remain stationary. As the content boundary 601-a is pulled inside the edge of the window 601-a, the gap 601-G is created between the pulled content boundary 606-a and the edge of the content window 606-a.

Figure 6D:
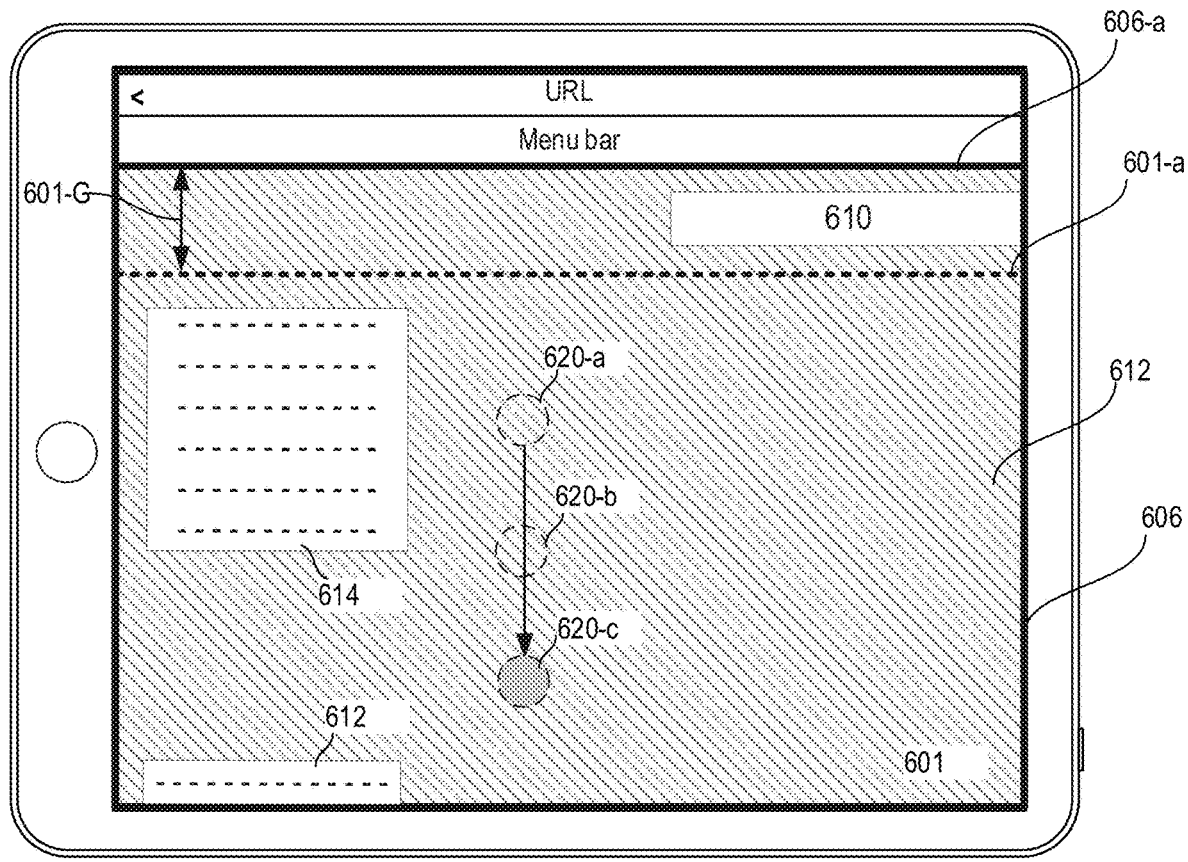
Figure 6E:
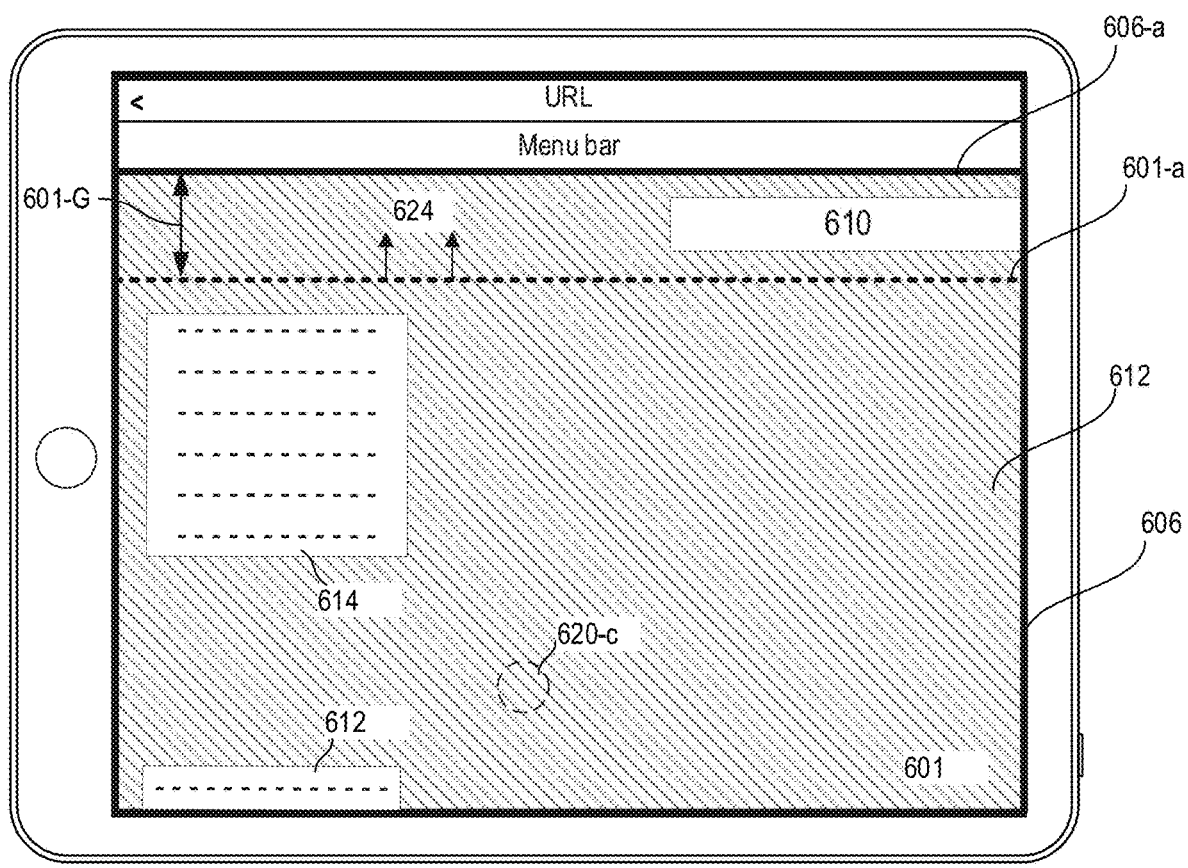

In FIG. 6C, the gap 601-G is displayed as distinct from the electronic document 601 (e.g., displayed with a background that is not continuous from the background 612, displayed in solid white or grey). However, in some embodiments, instead of displaying the gap 601-G as shown in FIG. 6C, the device 600 displays the gap 601-G with an additional background that is generated based on the background 612 of the electronic document 601, as shown in FIG. 6D. For example, the gap area 601-G is displayed with an additional background that has the same pattern of solid diagonal lines as in the background 612 of the electronic document 601.

In some embodiments, the additional background is created by the device 600 by matching one or more attributes of the original background 612 of the electronic document 601. The attributes of the original background of the electronic document to be used in the creation of the additional background for display in the gap area 601-G include, non-exclusively, a pattern, color, shading, pixel, resolution, orientation, image, text included or used in the original background. For example, if the original background is a solid color, the extended background is created by matching the solid color so as to create the visual effect of the newly-created additional background being an extension of the original background 612. Optionally, the visual effect causes a visual illusion that the edge of the electronic document (e.g., content boundary 601-a) is affixed to window edge 606-a even though the content boundary 601-a is actually pulled inside window edge 606-a.

In some embodiments, the original background has a specific pattern along any one or more axes (e.g., x-axis, y-axis, straight-line axis, curved-line axis, etc.), and the additional background is created by selecting a portion of the original background and replicating and/or extrapolating the pattern in the selected portion of the original background. Optionally, the selected portion of the original background is the portion of the electronic document that is near the content boundary that is pulled inside the edge of the window. For example, if the top content boundary 601-a is pulled inside the edge of the window as shown in FIGS. 6A-6D, the top portion of the original background 612 near the content boundary 601-a is selected for the generations of the additional background. Optionally, the selection process is determined so as to maximize the visual continuity between the original background and the additional background to be displayed in the gap between the content boundary and the edge of the window as the content boundary is pulled inside the edge of the window.

In some embodiments, the device retrieves relevant information about the original background from the electronic document itself or any related documents (e.g., CSS documents), or requests for such information from an external device, and upon receipt, uses the retrieved information to create the additional background. For example, the original background has a numerically defined gradient, the information about which is retrieved by the device 600 to create the additional background. The device obtains the gradient-defining information (e.g., a formula, a computer code) and extends and/or extrapolates the gradient in the additional background using the obtained information.

In some embodiments, the device 600 creates the additional background by matching every attribute of the original background. Optionally, the device 600 does not match every attribute of the original background in the additional background and instead matches a select set of attributes of the original background. Optionally, the set of the attributes to be matched in the additional background is dynamically selected based on various factors (e.g., relating to the scroll input, the display, the electronic document). For example, the original background has a gradient in the x-axis and another gradient in the y-axis, the device determines which gradient to be used in creating the additional background (e.g., based on the direction of the scroll input, orientation, size and/or shape of the gap area to be at least partially filled in with the additional background). Further, when the original background includes an image file, the device uses a first set of attributes (e.g., pixels, resolution) of the original background to be replicated and/or extrapolated in the additional background. When the original background has a numerically-defined gradient, the device uses a second set of attributes (e.g., pattern, gradient) of the original background, which are different from the first set of attributes, to be replicated and/or extrapolated in the additional background.

Optionally, the set of attributes of the original background to be matched in the additional background is predetermined. For example, the device stores a list of attributes (e.g., color, pattern, orientation) to be used in creating the additional background, and any other attributes of the original background outside those in the list (e.g., transparency, resolution) are not matched in the additional background.

In some embodiments, the additional background is created after the device detects an input that causes the content boundary to be pulled inside the window edge, thereby creating the gap area. Optionally, the additional background is created before the gap is created so that the additional background is ready for display once the gap is displayed on the display.

In some embodiments, when the device is triggered to create the additional background, the device creates the additional background that would be sufficient to fill the largest size of the gap area, and determines how much and which portion of the additional background should be used in filling the gap area. Optionally, when the gap area is increased in size as the user continues to pull the content boundary further inside the edge of the window, the device does not need to create the additional background again, but instead simply adjusts the portion of the additional background to be displayed in the gap area based on the changed size of the gap area. Optionally, when the gap area is decreased in size from the scroll input in different directions or from the return movement (upon detection of the release of the contact or, optionally, end of the input), the device adjusts the portion of the additional background so that a smaller portion of the additional background is selected for display in the shrinking gap area.

In some embodiments, when the device is triggered to create the additional background, the device creates the additional background just for the current size of the gap area. As the gap area is increased in size from the continued scroll input from the user, the device creates further additional background to be displayed in the enlarged gap area. Optionally, as the gap area is decreased in size from the scroll input in different directions or from the return movement (upon detection of the release of the contact or, optionally, end of the input), the device removes (e.g., erases from the memory) the unnecessary additional background in view of the shrinking gap area.

In some embodiments, the display of the additional background occupies the entire gap area 601-G, as shown in FIG. 6D. Optionally, the display of the additional background occupies a partial area of the gap area 601-G. For example, the device determines how much of the gap area 601-G is to be occupied with the display of the additional background based on various factors such as a location, type, and/or size of various object(s) within the electronic document, particularly the objects that are near the content boundary that has been pulled inside the edge of the window and therefore defines the gap area.

In some embodiments, the additional background that matches the original background 612 of the electronic document causes the visual illusion of the content boundary 601-a of the electronic document being affixed to the edge of the window even though the content boundary 601-a is actually pulled inside the edge of the window. Optionally, the content boundary 601-a is displayed with a visual effect so as to notify the users of its actual location (e.g., a dotted line as shown in FIG. 6D, a flashing line, or any other visual marker).

Figure 6F:
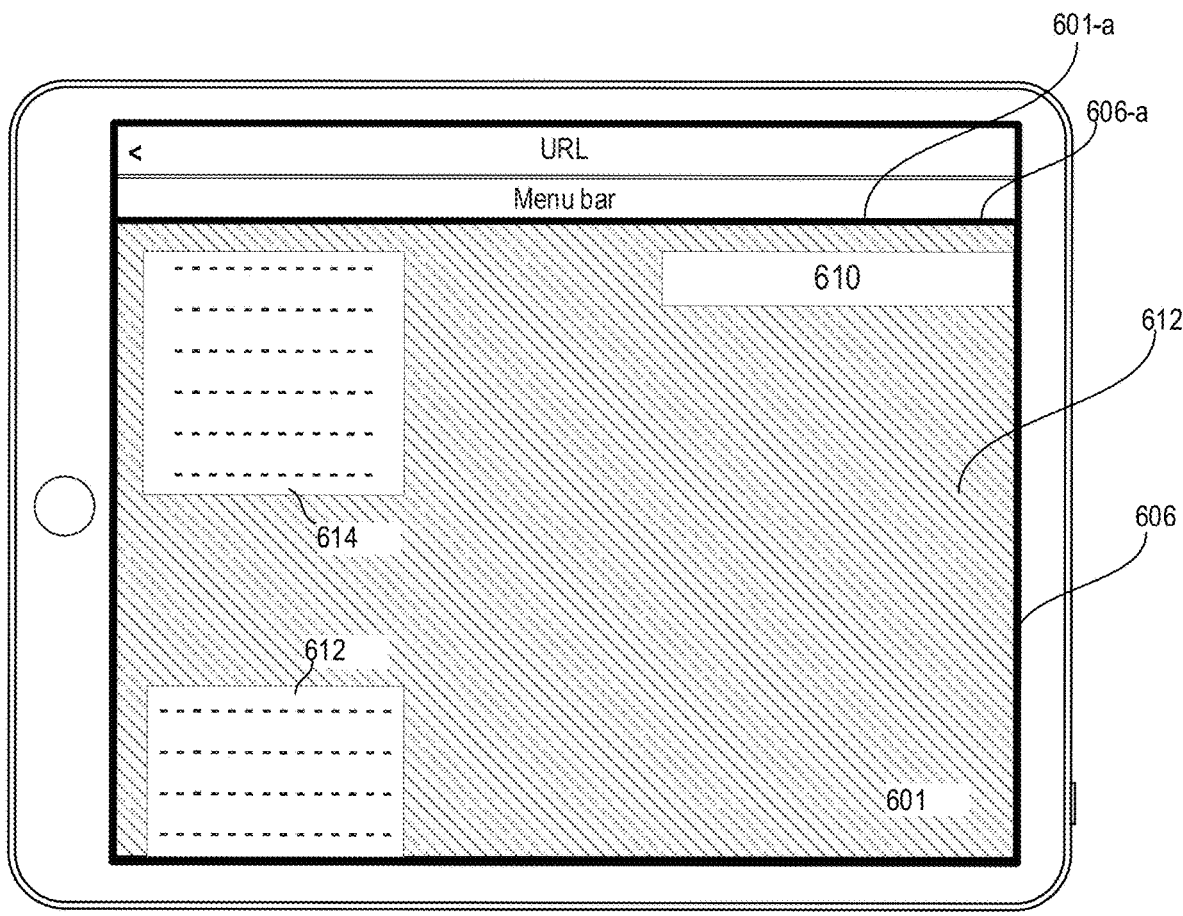

Referring back to FIG. 6E, the device detects a lift-off of the contact at 620-c (optionally, the end of the scroll input, a liftoff of one or more contacts that performed the scroll input, ceasing to detect one or more user gestures that performed the scroll input, etc.), the device starts rolling back the content boundary 601-a toward window edge 606-a until the content boundary 601-a reaches window edge 606-a (FIG. 6F) which optionally occurs without further user intervention (e.g., the content bounces back automatically). As the content boundary 601-a is moved closer to the edge of the window as it is being translated in the upward direction, the size of the gap area 601-G is reduced and, therefore, less amount of additional background is displayed. When the content boundary 601-a reaches window edge 606-a, the gap 601-G is completely removed, and the display of the additional background is also removed (FIG. 6F).

The various features described above with reference to FIGS. 6A-6F are optional, and any one or more of these features can be removed, modified, or combined with any other features described herein with reference to other figures (e.g., FIGS. 5A-5T and FIGS. 6G-6L), as will be apparent to those skilled in the art. For brevity, such modifications and permutations are not repeated but are deemed within the scope of the present disclosure.

Figure 6G:
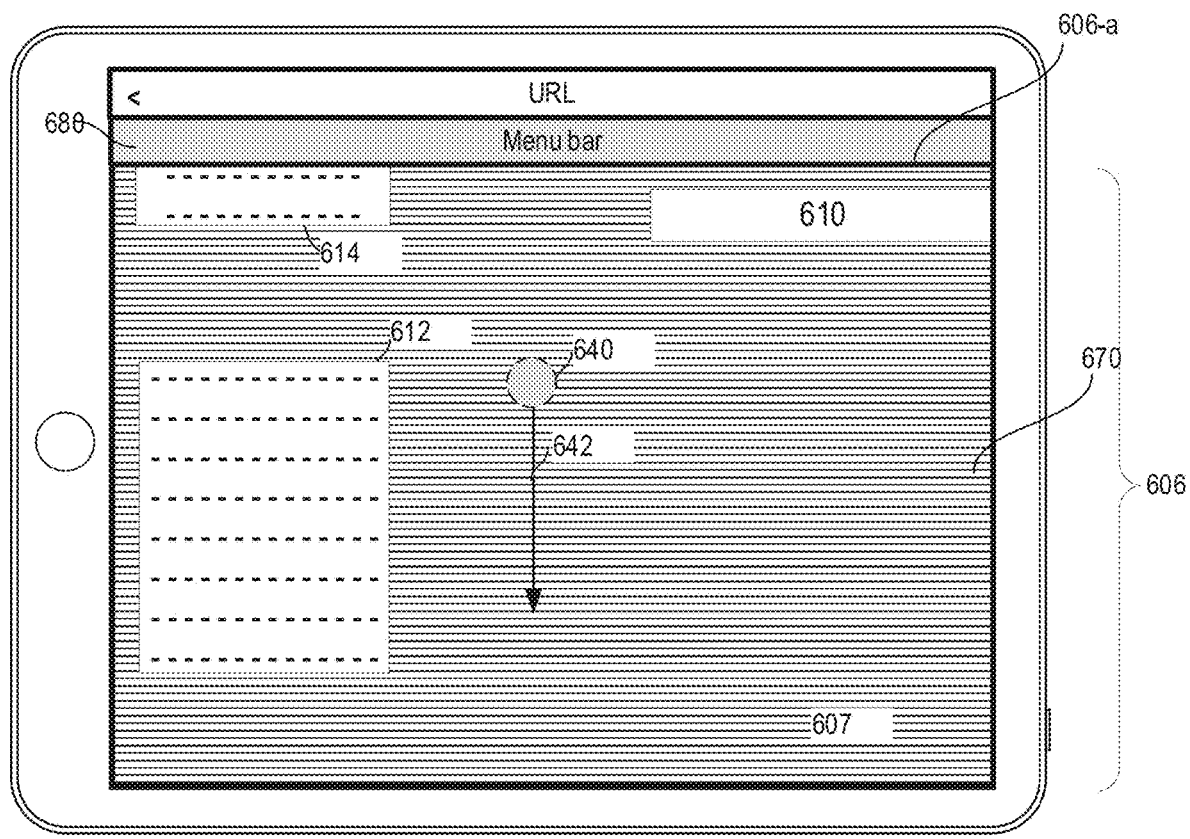
FIGS. 6G-6L illustrate an exemplary implementation of coordinated movement of an electronic document with a background according to various embodiments of the disclosure.

FIGS. 6G-6L illustrate an example of displaying an additional background in a gap between a content boundary of an electronic document and an edge of a window. In FIG. 6G, the electronic document 607 is displayed in window 606. The electronic document includes objects 614, 612 of the third-type, object 610 of the first type, top content boundary 607-a (not shown in FIG. 6G but shown in FIG. 6H) and background 670 (e.g., a pattern of solid horizontal lines). The electronic document is displayed in window 606 with background 670, and the menu bar 680 is displayed above the top edge of the window 606-a. The menu bar 680 has a first set of display characteristic (e.g., not transparent to the electronic document or the additional background, if exists) before detection of the input that corresponds to a request to translate the electronic document 607 displayed in window 606. The first set of display characteristic of the menu bar 680 optionally includes a color, a transparency, a size, a pattern, a resolution, shading, a gradient, etc.

Figure 6H:
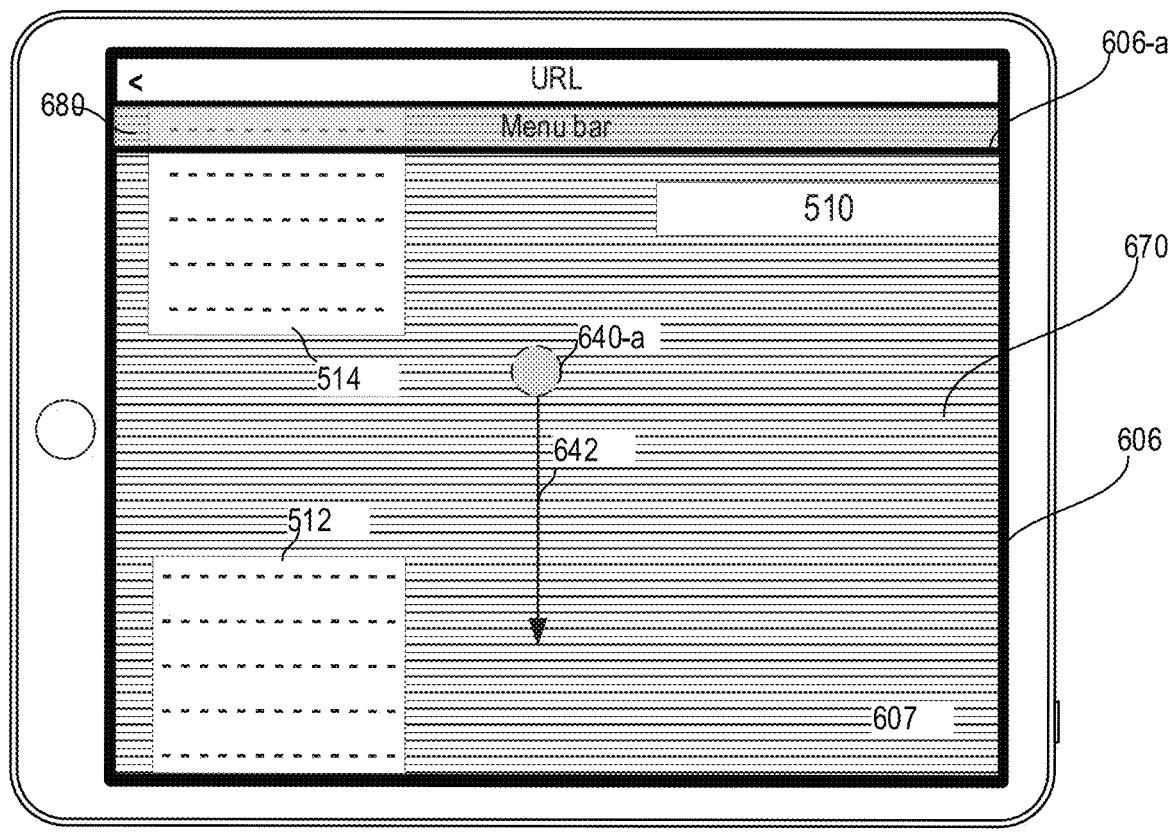

The device then detects a finger contact at 640 followed by continuous movement of the finger in direction 642, without lifting the finger, which is recognized as an input that corresponds to a request to translate the electronic document 607 in a first direction (the downward direction). Upon detecting this input (and at substantially the same time as when respective portions of the electronic document 607 start being translated in the downward direction in accordance with the finger movement), the menu bar 680 changes its display characteristic to have a second set of display characteristic that are different from the first set. For example, as shown in FIG. 6H, the menu bar 680 becomes at least partially transparent to the electronic document 607 but not transparent to the additional background (as shown in FIG. 6H). For example, in FIG. 6H, the menu bar 680 becomes at least partially transparent to the portion of the electronic document 607 that is directly underneath the menu bar 680, including object 514 and background 670. The menu bar 680 is not transparent to the additional background (e.g., in some examples, the additional background is not even created in FIG. 6H since the content boundary 607-a has not been pulled inside window edge 606-a).

In FIG. 6H, the portion of the object 514 that is directly under the menu bar 680 is visible through the menu bar 680 from underneath, and the portion of the background 670 that is directly under the menu bar 680 is also visible through the menu bar 680 from underneath. Optionally, the menu bar 680 has a low or no transparency (e.g., less than 10% transparency) before the detection of the input that corresponds to a request to translate the electronic document 607.

And, the menu bar 680 has an increased transparency (e.g., more than 15%) after the detection of the input that corresponds to a request to translate the electronic document 607 and as the respective portions of the electronic document 607 start being translated according to the detected input.

Figure 6I:
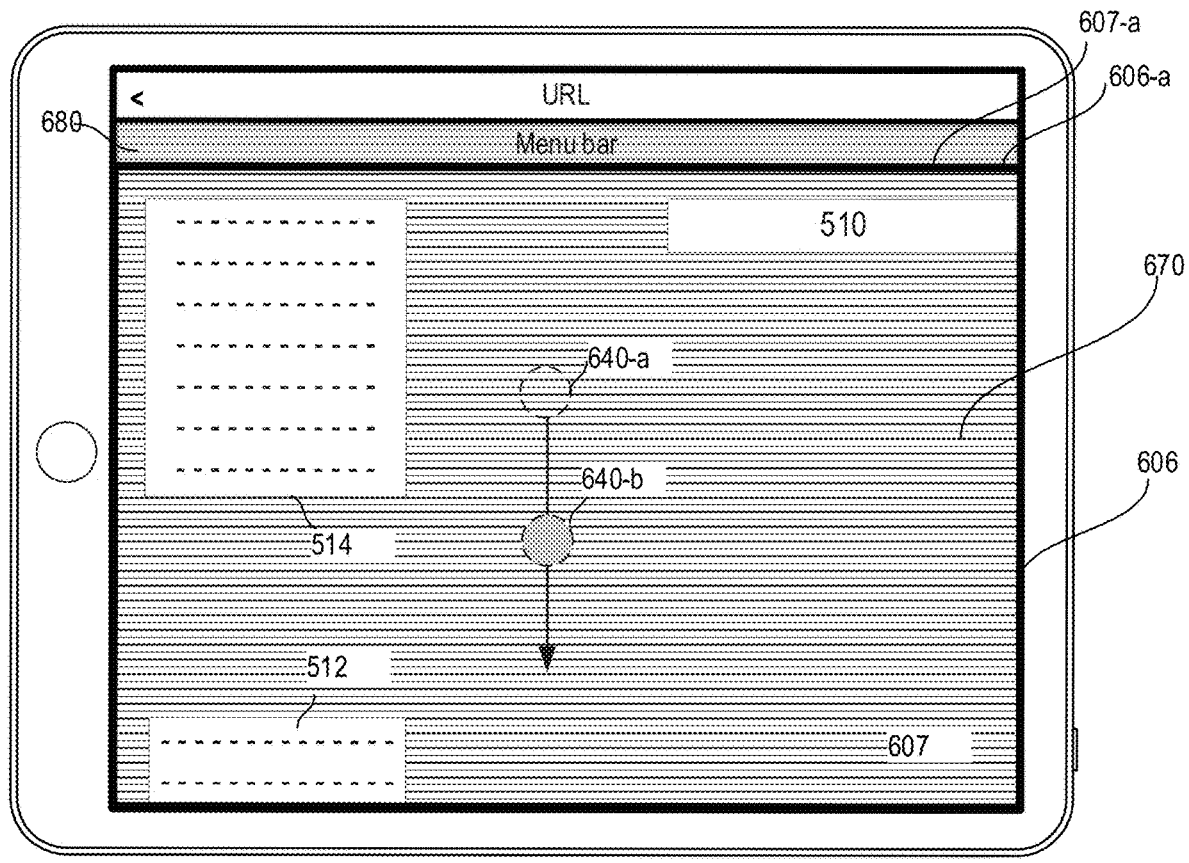

In FIG. 6I, the finger movement continues to 640-*b*, and the respective portions of the electronic document 607 (including the content boundary 607-*a* and background 670) and objects 612 and 614 of the third type, are translated in accordance with the finger movement from 640-*a* to 640-*b*, so that the content boundary 607-*a* reaches window edge 606-*a*. As the upper edge of the electronic document 607, the content boundary 607-*a*, passes the upper end of the menu bar 680, there is nothing to be seen through the menu bar 680 above the content boundary 607-*a*. However, in some embodiments, the menu bar 680 adjusts the visual appearance of at least the part of the menu. bar 680 that has been passed by the content boundary 607-*a* (and thus is now above the content boundary 607-*a*), so that the adjusted visual appearance of the menu bar 680 is continuous with the background 670 of the electronic document 607. Optionally, the adjusted visual appearance of the menu bar 680 creates a visual illusion that the background 670 is attached to the upper end of the menu bar 680, and the background 670 continues to be expanded in accordance with the finger movement and seen through the menu bar 680.

In FIG. 6I, the content boundary 607-*a* has passed the menu bar 680 and is on the lower end of the menu bar 680, which coincides with window edge 606-*a*. So, the entire menu bar 680 is displayed with an adjusted visual appearance so that it appears to be continuous with the background 670. As explained, the menu bar 680 adjusts the visual appearance to cause a visual illusion that an extension of the original background 670 is seen through the menu bar 680.

In some embodiments, the adjustment of the visual appearance of the menu bar 680 for the part that has been passed by the content boundary 607-*a* is performed based on one or more attributes of the original background 670 of the electronic document 607. Optionally, the attributes of the original background 670 that are considered in adjusting the visual appearance of the menu bar 680 are the same as those that are considered in creating the additional background. The creation of the additional background is explained in detail with reference to FIGS. 6A-6F and will not be repeated here, for brevity.

Optionally, the device adjusts the visual appearance of the menu bar so that the changed appearance of the menu bar 680, including the pattern extended and/or extrapolated from the original background 670, is displayed with less clarity than the original background (so that it feels like the created pattern shown in the menu bar 680 is a pattern put underneath the menu bar 680 and is seen through the menu bar). Optionally, the adjusted visual appearance of the menu bar 680 creates the visual illusion that the edge of the electronic document 607 (content boundary 607-*a*) is attached to the upper edge of the menu bar 680 even though the actual position of the content boundary 607-*a* is on the lower edge of the menu bar 680, which is also the top edge of the window 606-*a*, in FIG. 6I.

Figure 6J:
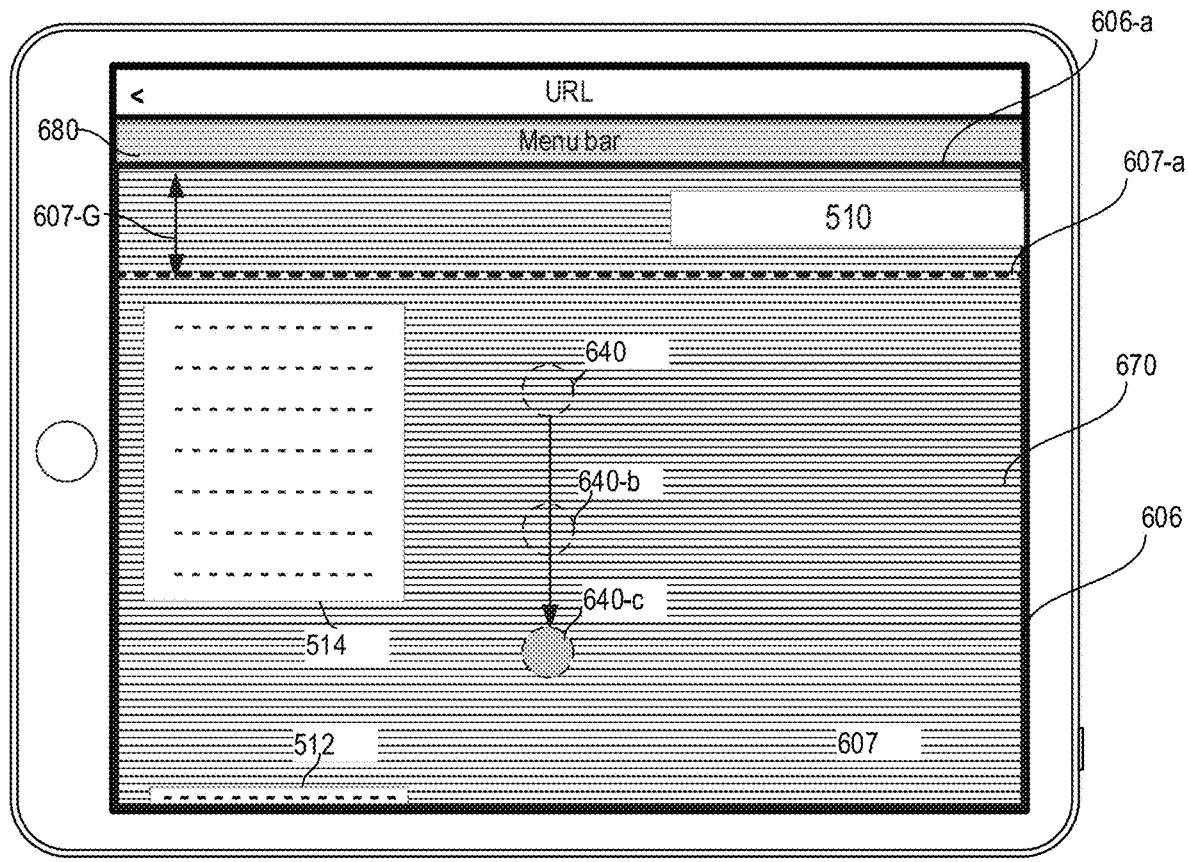

In FIG. 6J, the user continues to move the finger from 640-*b* to 640-*c*, and in accordance with this movement, the content boundary 607-*a* is pulled inside window edge 606-*a*. As the content boundary 607-*a* is pulled inside window edge 606-*a*, gap 607-G is created. The gap 607-G is displayed at least partially with an additional background that is created by matching all or part of the attributes of the original background 670 of the electronic document 607 (e.g., color, pattern, resolution, orientation, etc.). The details of the additional background creation are explained with reference to FIGS. 6A-6F and will not be repeated, for brevity.

In some embodiments, as shown in FIG. 6J, while the additional background is displayed in the gap area 607-G, the menu bar 680 maintains the display of the adjusted visual appearance from FIG. 6I so that it continues to provide the visual effect that there is a material continuous with the additional background displayed in the gap 607-G, which is being seen through the menu bar 680 from underneath.

Figure 6K:
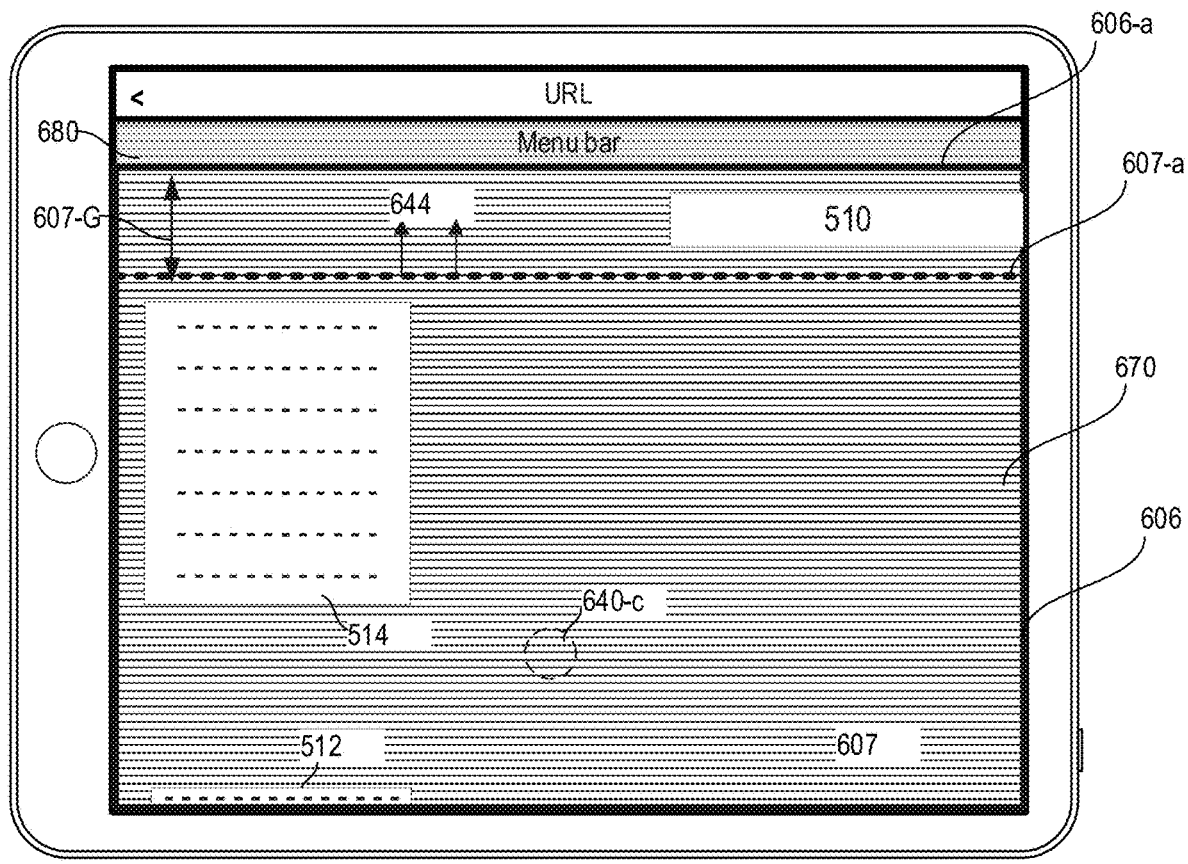

In FIG. 6K, the device detects an end of the input (a lift-off of the contact at 640-*c*), and in response to the detection of the end of the input, the device translate the respective portions of the electronic document 607 in direction 644 that is opposite the direction 642 in which the electronic document was previously translated in accordance with the finger movement.

Figure 6L:
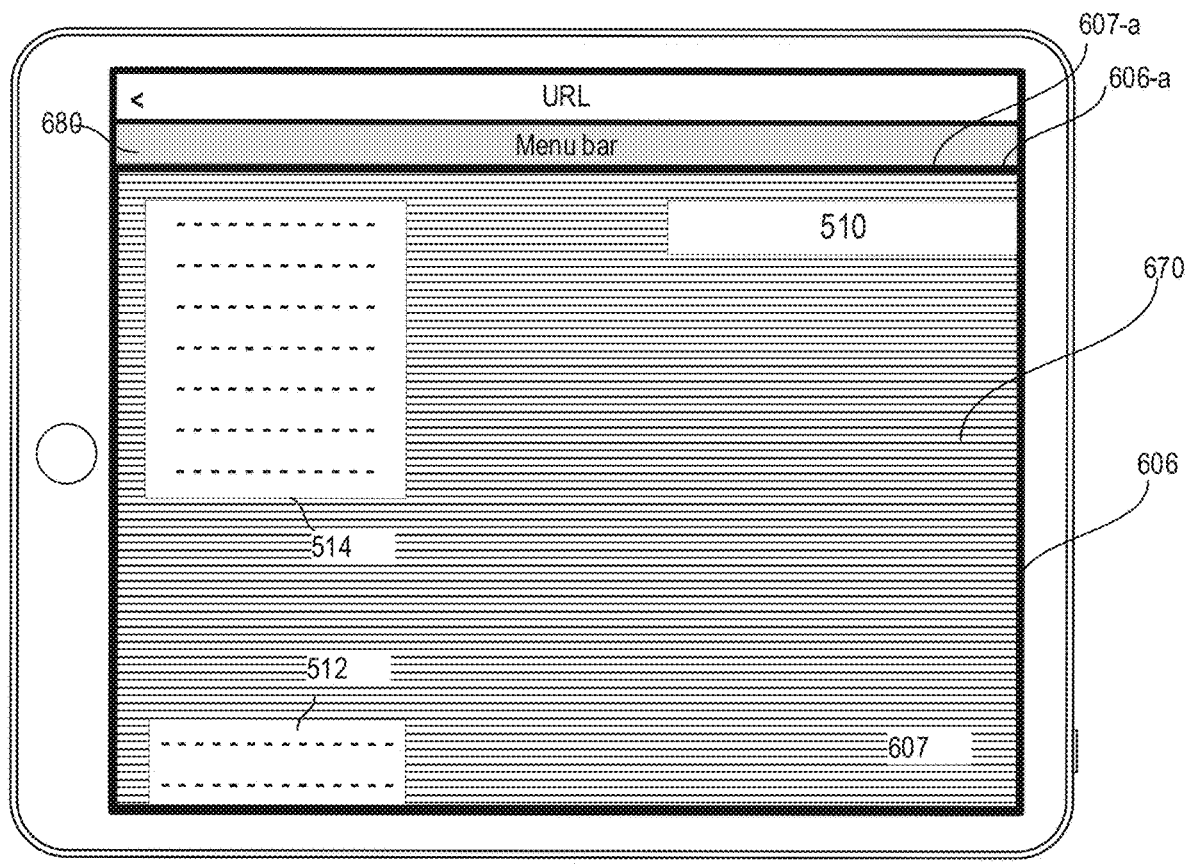

In FIG. 6L, the translation of the respective portions of the electronic document 607 in the upward direction is continued until the content boundary 607-*a* reaches window edge 606-*a*. When the content boundary 607-*a* reaches window edge 606-*a* and the respective portions of the electronic document 607 are no longer translated, the menu bar 680 is displayed without the adjusted visual appearance (e.g., the visual appearance that has contributed to creating the visual effect that a material continuous from the background 670 is seen through the menu bar 680 from underneath is removed) as shown in FIG. 6L. Further, optionally, when the content boundary 607-*a* reaches window edge 606-*a* and the respective portions of the electronic document 607 are no longer translated, the menu bar 680 reverts its display characteristics to the first set of display characteristics, which is the characteristic had by the menu bar 680 before the detection of the input that corresponds to the request to translate the electronic document in the first direction (e.g., the increased transparency of the menu bar 680 reverts back to the low/no transparency level).

In some embodiments, instead of adjusting the visual appearance of the menu bar 680, the menu bar 680 is made transparent to the additional background, and the device creates the additional background based on the original background of the electronic document for display not only in the gap area (e.g., 607-G) between the pulled content boundary and the edge of the window but also in the area underneath the menu bar 680.

It should be understood that the techniques described herein for creating the additional background and enabling the display of the additional background in the gap area between the content boundary and the edge of the window are provided only as exemplary, and various modifications can be made to tailor any specific design needs as will be apparent to those skilled in the art. All of such modifications are deemed within the scope of the present disclosure.

Further, the various features described above with reference to FIGS. 6G-6L are optional, and any one or more of these features can be removed, modified, or combined with any other features described herein with reference to other figures (e.g., FIGS. 5A-5T and FIGS. 6A-6F), as will be apparent to those skilled in the art. For brevity, such modifications and permutations are not repeated but are deemed within the scope of the present disclosure.

FIGS. 7A-7B are a flow diagram illustrating process 700 for coordinating movement behaviors of an electronic document and various objects contained therein in response to an input that corresponds to a request to translate the electronic document. Optionally, process 700 is performed at an electronic device with a display and a touch-sensitive surface, like device 100 (FIG. 1), device 300 (FIG. 3), and/or device 460 (FIG. 4C). At block 702, the device displays an electronic document on a display (e.g., electronic document 505, 535 and 555 as shown in FIGS. 5A-5T). Optionally, the electronic document comprises a first object (e.g., object 510 of a first type in electronic document 505) and a content boundary (e.g., top content boundary 505-*a* of electronic document 505, top content boundary 535-*a* of electronic document 535, top content boundary 555-*a* of electronic document 555, right-side content boundary 505-*c* of electronic document 505). Optionally, the electronic document is displayed in a window (e.g., 504 in FIG. 5A) that optionally comprises a URL bar (e.g., 507 in FIG. 5A), a menu bar (e.g., 508 in FIG. 5A) and a content window (e.g., 506 in FIG. 5A) for displaying the actual content of the electronic document.

At block 704, while the device displays the electronic document in the window displayed on the display, the device detects an input that corresponds to a request to translate the electronic document in a first direction. Optionally, the input includes an initial finger contact with the touch-sensitive display followed by continuous movement of the contact in the first direction (e.g., contact 520-*a* followed by movement 522 in FIG. 5A, contact 540-*a* followed by movement 542 in FIG. 5G, contact 560 followed by movement 562 in FIG. 5L, contact 580 followed by movement 582 in FIG. 5Q). Optionally, the input includes a stylus input, a mouse input, a hand-motion input, a face-motion input, an eye-movement input, and/or other bodily part motion input that requests the device to translate the electronic document in the first direction. Optionally, the first direction in which the translation of the electronic document is requested is the same direction in which the finger is moved (e.g., directions 522, 542, 562, and 582). Optionally, the first direction in which the translation of the electronic document is requested is not the same direction in which the finger is moved or any other input is applied (e.g., a user swipes to the left which is interpreted as a request to translate the electronic document to the right, etc.).

At block 706, in response to detecting the input that corresponds to a request to translate the electronic document in the first direction, the device translates the electronic document in the first direction in accordance with the detected input without translating the first object (e.g., in FIGS. 5A-5E, as the electronic document is translated in the downward direction in accordance with the contact movement 520-*a* to 520-*d,* the object 510 of the first type is not translated and remains stationary relative to the edges of the window 506). The user continues to provide the input to further translate the electronic document, so that the first object (e.g., object 510) is outside the content boundary (e.g., 505-*a*) of the electronic document on the display (e,g., as the content boundary 505-*a* is pulled inside window edge 506-*a,* the object 510 is outside the content boundary as shown in FIG. 5D).

Optionally, the device translates the respective portion of the electronic document in the first direction in accordance with the input by translating the respective portion of the electronic document in the first direction in a linear relationship with the input until the content boundary of the electronic document reaches the edge of the window (e.g., until the content boundary 505-*a* reaches window edge 506-*a* in FIG. 5C) and then translates the respective portion of the electronic document in the first direction in a nonlinear relationship with the input after the content boundary has reached the edge of the window and as it is pulled inside the edge of the window (e.g., FIG. 5D).

Optionally, the device translates the respective portion of the electronic document in the first direction in a linear relationship with the detected input by translating by an amount that is proportional to the distance moved by the finger on the touch-sensitive display (e.g., in FIG. 5B, the distance moved by the finger from 520-*a* to 520-*b* is proportional to the amount translated by the respective portion of the electronic document 505 and the amount translated by the third-type objects 514 and 512; and in FIG. 5C, the distance moved by the finger from 520-*b* to 520-*c* is proportional to the amount translated by the respective portion of the electronic document 505 and the amount translated by the third-type objects 514 and 512).

Optionally, the device translates the respective portion of the electronic document in the first direction in a non-linear relationship with the detected scroll input by translating by an amount that has a non-linear relationship with the distance moved by the finger on the touch-sensitive display (e.g., in FIG. 5D, the distance moved by the finger from 520-*c* to 520-*d* has a non-linear relationship with the amount translated by the respective portion of the electronic document 505 and the amount translated by the third-type objects 514 and 512).

Optionally, the first object (e.g., object 510 in FIGS. 5A-5F) is fixed relative to the edge(s) of the window (e.g., 506-*a*) and remains fixed while the electronic document is translated (e.g., FIGS. 5A-5F). The device translates the respective portion of the electronic document without translating the first object so that a portion of the electronic document is translated under the first object (e.g., in FIG. 5A-5F, as the respective portion of the electronic background 505 is translated up and down, a portion of the electronic document that is directly underneath the first object is translated as if passing under the first object). The first object also remains stationary as the respective portion of the electronic document is translated in the second direction after the end of the input is detected (e.g., in FIGS. 5E and 5F, the first-type object 510 remains stationary as the respective portion of the electronic document is translated in the upward direction after the lift-off of the contact is detected).

Optionally, as shown in FIG. 7B, the electronic document further comprises a second object (e.g., object 530 of a second type in electronic document 535 in FIGS. 5G-5K). When the device translates the respective portion of the electronic document (e.g., 535) in the first direction in accordance with the detected input (e.g., contact movement from 540-*a* to 540-*b* in FIG. 5H), the second object remains stationary until the content boundary reaches the edge of the window (e.g., in FIG. 5H, the second-type object 530 remains stationary until the content boundary 535-*a* reaches window edge 506-*a*). However, when the respective portion of the electronic document is translated in a non-linear relationship as the content boundary of the electronic document is pulled inside the edge of the window, the second object is translated with the respective portion of the electronic document in the non-linear relationship with the input (e.g., in FIG. 5I, the second-type object 530 is translated down with the respective portion of the electronic document in a non-linear relationship with the contact movement from 540-*b* to 540-*c*). The second object is also translated with the respective portion of the electronic document during the translation in the second direction after the end of the input is detected (e.g., in FIGS. 5J and 5K, the second-type object 530 is translated in the upward direction along with the respective portion of the electronic document after the lift-off of the contact is detected).

Optionally, the electronic document further comprises a third object (e.g., objects 512 and 514 of a third type in electronic documents 505, 535 and 555 in FIGS. 5A-5T). When the device translates the respective portion of the electronic document in the first direction in accordance with the detected input, the third object (e.g., objects 512 and 514) is translated with the respective portion of the electronic document in the first direction in a linear relationship with the input until the content boundary of the electronic document reaches the edge of the window. The third object also is translated with the respective portion of the electronic document in the first direction in a non-linear relationship with the input after the content boundary has reached the edge of the window and as the content boundary is pulled inside the edge of the window. Optionally, the third object (e.g., objects 512 and 514 of the third type) is fixed relative to the edges of the electronic document (e.g., content boundaries of the electronic documents) so that the third object is translated along with the movement of the respective portion of the electronic document (either during the translation from the user input and translation after the end of the input).

Optionally, the electronic document further comprises a fourth object (e.g., object 550 of a fourth type in electronic document 555 in FIGS. 5L-5P). When the device translates the respective portion of the electronic document (e,g., 555) in the first direction in accordance with the detected input (e.g., contact movement from 560-*a* to 560-*b* in FIG. 5M), the fourth object (e.g., object 550) is translated with the respective portion of the electronic document in a linear relationship with the input until the content boundary of the electronic document (e.g., 555-*a*) reaches the edge of the window (e.g., 506-*a*). When the respective portion of the electronic document (e.g., 555) is translated in a non-linear relationship with the input (e.g., contact movement from 560-*b* to 560-*c* in FIG. 5N) as the content boundary of the electronic document is pulled inside the edge of the window, the fourth object (e.g., 550) is not translated and remains stationary relative to the edges of the window (e.g., 506-*a*). The fourth object remains stationary even if that means the fourth object (e.g., 550) is pulled out of the content boundary (e.g., 555-*a* in FIG. 5N). The fourth object remains stationary as the respective portion of the electronic document is translated in the second direction after the end of the input is detected (e.g., in FIGS. 5O and 5P, the fourth-type object 550 remains stationary while the electronic document 555 is subject to the restoration behavior in the upward direction after the lift-off of the contact is detected).

At block 708, the device detects a liftoff of the finger contact that provided the scroll input (FIGS. 5E, 5J, 5O and 5S). At block 710, in response to detecting the release of the finger contact (or, optionally, the end of the scroll input, a liftoff of one or more contacts that performed the scroll input, ceasing to detect one or more user gestures that performed the scroll input, etc.), the device translates the respective portion of the electronic document in a second direction different from the first direction without moving the first object (e.g., object 510 of the first type in FIGS. 5E and 5S). Optionally, the electronic document is moved in the second direction until the content boundary (e.g., 505-*a* in FIG. 5E, 535-*a* in FIG. 5J, 555-*a* in FIGS. 5O and 505-*c* in FIG. 5S) reaches the respective edge of the window (e.g., 506-*a* in FIGS. 5E, 5J and 5O and 506-*c* in FIG. 5S). For example, in FIGS. 5E and 5S, the electronic document is translated in the second direction so that the first object (e.g., object 510) is within the content boundary (e.g., 505-*a* in FIG. 5E and 505-*c* in FIG. 5S). Optionally, the second direction (e.g., 524, 544, 564, 584 FIGS. 5E, 5J, 5O and 5S) is opposite the first direction (e.g., 522, 542, 562, 584 FIGS. 5E, 5J, 5O and 5S). Optionally, the electronic document is translated in the second direction at a speed faster than a speed of the translation of the electronic document in the first direction in accordance with the scroll input.

It should be understood that the particular order in which the operations in FIGS. 7A-7B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 800) are also applicable in an analogous manner to method 700 described above with respect to FIGS. 7A-7B. For example, the inputs, translation behaviors of the electronic document, translation behaviors of various objects of different types contained in the electronic document (e.g., objects of the first type, second type, third type and/or fourth type), visual effects and behavior control of the electronic document relative to those of the objects, described above with reference to method 700 optionally have one or more of the characteristics of the inputs, translation behaviors of the electronic document, translation behaviors of various objects of different types contained in the electronic document (e.g., objects of the first type, second type, third type and/or fourth type), visual effects and behavior control of the electronic document relative to those of the objects that are described herein with reference to other methods described herein (e.g., method 800). For brevity, these details are not repeated here.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

Figure 9:
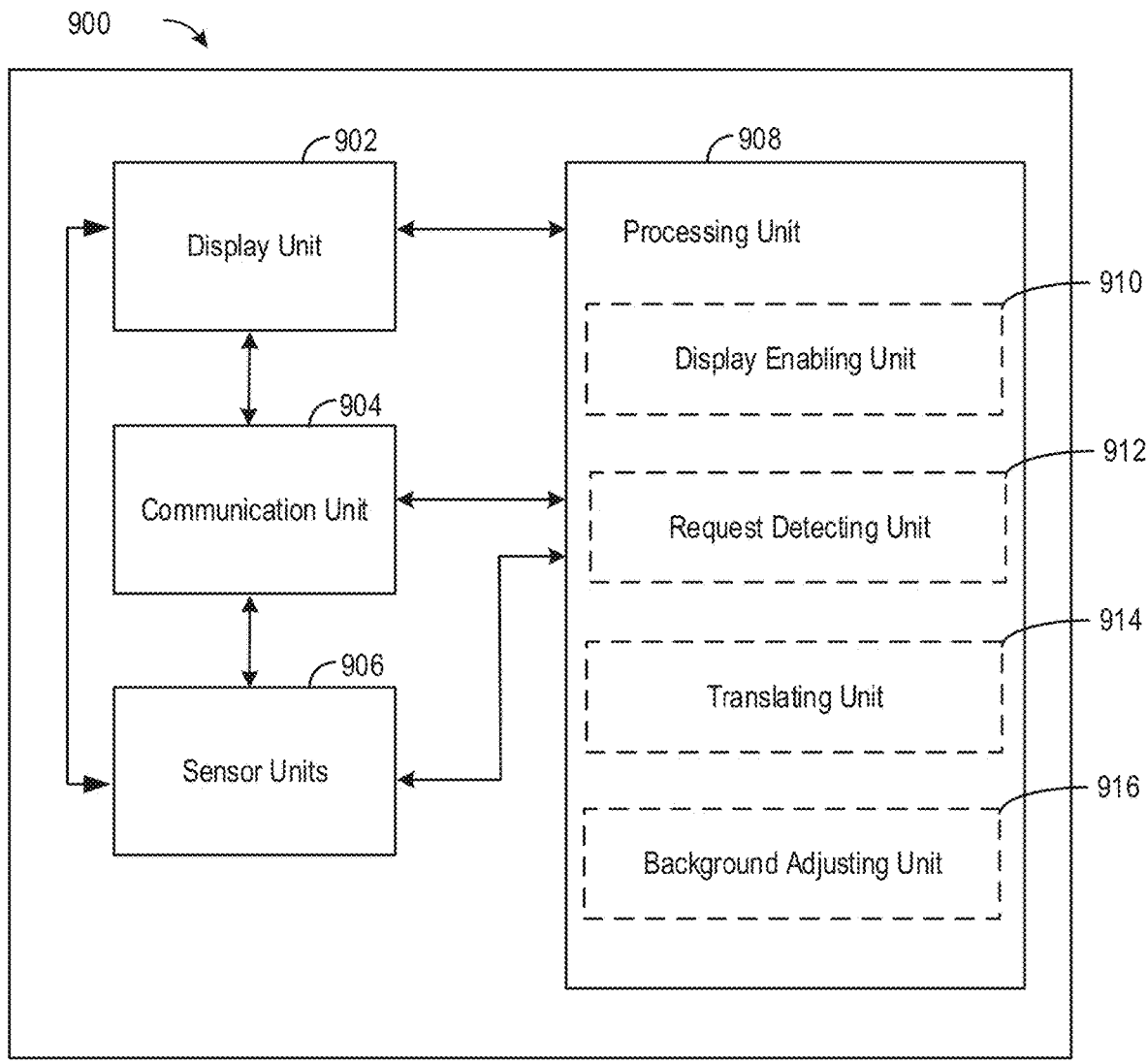
FIG. 9 is a functional block diagram of an electronic device according to various embodiments of the disclosure.

The operations described above with reference to FIGS. 7A-7B are, optionally, implemented by components depicted in FIGS. 1A-1B and 9. For example, detection operations 704 and 708, displaying operation 702, and translating operations 706 and 710 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B and 9.

FIGS. 8A-8C are a flow diagram illustrating process 800 for coordinating the movement behavior of the electronic document and various objects contained therein in response to an input that corresponds to a request to translate the electronic document. Optionally, process 800 is performed at an electronic device with a display and a touch-sensitive surface, like device 100 (FIG. 1), device 300 (FIG. 3), and/or device 460 (FIG. 4C). At block 802, the device displays, in a window of a display, an electronic document comprising a background and a content boundary. For example, in FIG. 6A, the electronic document 601 that comprises background 612 and content boundary 601-*a* (shown in FIG. 6B) is displayed in a window (e.g., window 604 including a URL bar, a menu bar, and content window 606).

At block 804, while the device displays the electronic document in the window, the device detects an input corresponding to a request to translate the electronic document in a first direction (e.g., in FIG. 6A, the initial finger contact with the touch-sensitive display at 620 followed by continuous movement of the contact 622, and in FIG. 6G, the initial finger contact with the touch-sensitive display at 640 followed by continuous movement of the contact 642). Optionally, the input includes a stylus input, a mouse input, a hand-motion input, a face-motion input, an eye-movement input, and/or other bodily part motion input that requests the device to scroll the electronic document in the first direction. Optionally, the first direction in which the scroll of the electronic document is requested is the same direction in which the finger is moved (e.g., directions 622 and 642). Optionally, the first direction in which the scroll of the electronic document is requested is not the same direction in which the finger is moved or any other scroll input is applied (e.g., a user swipes to the left which is interpreted as a request to scroll the electronic document to the right, etc.).

At block 806, in response to detecting the input that corresponds to a request to translate the electronic document in the first direction, the device translates a respective portion of the electronic document in the first direction in accordance with the detected input without moving the first object, so that the content boundary is pulled inside the edge of the window. For example, in FIG. 6B, the respective portion of the electronic document 601 (including the background 612 and content boundary 601-*a*) is translated in accordance with the finger movement from 620-*a* to 620-*b* so that the content boundary 601-*a* reaches the edge of the content window 606-*a*, and continues to be translated in accordance with the further movement of the finger from 620-*b* to 620-*c* so that the content boundary 601-*a* is pulled inside window edge 606-*a*, as shown in FIG. 6C.

In conjunction with translating the respective portion of the electronic document so that the content boundary is pulled inside the edge of the window, the device displays an additional background in at least a portion of a gap area (e.g., 601-G in FIG. 6D and 607-G in FIG. 6J) between the pulled content boundary and the edge of the window. Optionally, the one or more attributes of the additional background match the corresponding one or more attributes of the background of the electronic document (e.g., in FIG. 6D the pattern and color of the additional background displayed in 601-G match the pattern and color of the original background 612 of the electronic document 601, and in FIG. 6J, the pattern and color of the additional background displayed in 601-G match the pattern and color of the original background 670 of the electronic document 607). Optionally, the one or more attributes of the background that are matched in the additional background include at least one of a pattern, an orientation, an image, a resolution, a gradient, a shading, a transparency, a size, etc. Optionally, the additional background is generated based on a replication and/or extrapolation of the one or more attributes of the original background.

Optionally, the device generates the additional background based on the one or more attributes of the original background of the electronic document prior to displaying the additional background in at least the portion of the area (e.g., 601-G in FIG. 6D and 607-G in FIG. 6J) between the content boundary and the edge of the window. Optionally, the device generates the additional background prior to detecting the scroll input that would cause the content boundary to be pulled inside the edge of the window (before the gap area 601-G in FIG. 6D and 607-G in FIG. 6J is created), or after detecting such scroll input.

Optionally, as shown in FIG. 8B, the device translates the respective portion of the electronic document in the first direction in accordance with the input by translating in a linear relationship with the detected input (e.g., in FIG. 6B the translation had by the respective portion of the electronic document 601 has a linear relationship with the contact movement from 620-*a* to 620-*b;* and in FIG. 6I the translation had by the respective portion of the electronic document 607 has a linear relationship with contact movement from 640-*a* to 640-*b*) until the content boundary (e.g., 601-*a*, 607-*a*) reaches the edge of the window (e.g., 606-*a*). Subsequently, the device translates the respective portion of the electronic document in the first direction in a non-linear relationship with the detected input (e.g., contact movement from 620-*b* to 620-*c* in FIGS. 6C and 6D, and contact movement from 640-*b* to 640-*c* in FIG. 6J) as the content boundary is pulled inside the edge of the window (e.g., 601-*a* in FIGS. 6C and 6D, and 607-*a* in FIG. 6J).

Optionally, while the respective portion of the electronic document is translated in the first direction in the non-linear relationship with the detected input, the additional background is displayed in all or at least a portion of the area between the content boundary and the edge of the window (e.g., gap area 601-G in FIG. 6D and gap area 607-G in FIG. 6J). The size of the portion of the area where the additional background is displayed increases as the content boundary of the electronic document continues to be pulled further inside the edge of the window.

Optionally, the electronic document comprises a first object (e.g., object 510 in FIGS. 6A-6L) that remains stationary while the respective portion of the electronic document is translated in the first direction in accordance with the detected scroll input or translated in the second direction after the release of the contact that provided the scroll input. Optionally, while the respective portion of the electronic document is translated without translating the first object, a portion of the electronic document is passed under the first object, and sometimes, the content boundary is translated under the first object so that the first object is pulled outside the content boundary (e.g., 610 FIGS. 6D and 6J). Optionally, the portion of the electronic document that is passed under the first object is at least partially visible through the first object from underneath.

Continuing to FIG. 8C, optionally, a respective portion of the window (e.g., menu bar 680 in FIGS. 6G-6L) changes a visual appearance in response to the input that corresponds to a request to translate the electronic document 607. For example, the respective portion of the window (e.g., menu bar 680 in FIGS. 6G-6L) is not transparent to either the electronic background or the additional background before the detection of the input (e.g., in FIG. 6G, the menu bar 680 is displayed as opaque to the electronic document 607). After the detection of the input that corresponds to a request to translate the electronic document and as the respective portion of the electronic document starts being translated as requested, the respective portion of the window (e.g., menu bar 680 in FIGS. 6G-6L) becomes transparent to the electronic document. Optionally, the respective portion of the window is not transparent to the additional background.

While the content boundary of the electronic document (e.g., an edge of the electronic document 607-*a* in FIGS. 6I and 6J) has been translated under the respective portion of the window (e.g., menu bar 680 in FIGS. 6G-6L) in accordance with the input (e.g., contact movement from 640-*a* to 640-*b* in FIG. 6I and to 640-*c* in FIG. 6J), the respective portion of the window is displayed with an adjusted visual appearance based on an appearance of the electronic document (e.g., 607) including the background (e.g., 670). Optionally, the adjusted visual appearance of the respective portion of the window (e.g., menu bar 680 in FIGS. 6G-6L) creates a visual illusion that there is an additional background underneath the respective portion of the window, which is at least partially seen through the respective portion of the window from under (e.g., the adjusted appearance of the menu bar 680 in FIGS. 6I and 6J). Optionally, the actual additional background is displayed only in the gap area (e.g., 607-G in FIG. 6J) and not in the area underneath the menu bar, and the continuity between the menu bar 680 and the additional background is achieved by the adjusted visual appearance of the menu bar. The adjusted appearance of the menu bar 680 creates an illusion that there is an additional background that extends to the area underneath the menu bar 680 from the actual additional background in the gap area 607-G.

Optionally, while the content boundary of the electronic document (e.g., 607-*a*) that was adjacent the actual additional background (e.g., in 607-G in FIG. 6K) has become adjacent to the respective portion of the window (e.g., 680) such that the electronic document is not scrolled under the respective portion of the window (e.g., in FIG. 6L, upon the completion of the restoration behavior, the content boundary 607-*a* that was adjacent to the gap area 607-G is now adjacent to the menu bar 680, and the restoring translation stops when the content boundary 607-*a* reaches window edge 606-*a*, therefore, no part of the electronic document is translated under the menu bar 680), the device displays the respective portion of the window (e.g., 680) without adjustment for the appearance of the additional background (e.g., menu bar 680 in FIG. 6L). For example, the content boundary 607-*a* that was previously adjacent the gap 607-G in FIG. 6K is translated in the upward direction (e.g., 644) after the detection of the end of the input so that the content boundary 607-*a* is now adjacent to the menu bar 680 upon the completion of the restoration behavior, as shown in FIG. 6L (e.g., content boundary 6087-*a* is adjacent to the menu bar 680, and the gap area 607-G is removed). Then, the menu bar 680 is displayed without the pattern that was previously created to adjust for the background 670 and/or additional background in 607-G. Optionally, the respective portion of the electronic document (e.g., menu bar 680) has a first value of transparency prior to the detection of the input that corresponds to a request to translate the electronic document (e.g., FIG. 6G), and has a second value of transparency higher than the first value after the detection of the input (e.g., FIGS. 6H-6K). Then, after the restoration behavior is complete after the detection of the end of the input, the respective portion of the window (e.g., 680) returns to have the first value of transparency (e.g., FIG. 6L).

At block 808, the device detects an end of the input (e.g., a liftoff of the contact from the display). At block 810, in response to detecting the end of the input, the device translates the respective portion of the electronic document in the second direction opposite the first direction until the content boundary of the electronic document reaches the edge of the window. For example, in FIG. 6E, upon detecting the liftoff of the contact from the display at 620-*c*, the respective portion of the electronic document 601 is translated in the second direction 624 opposite the first direction 622 until the content boundary 601-*a* reaches window edge 606-*a*. This movement of the respective portion of the electronic document 601 in the second direction 624 causes a reduction in size of the gap area in which the additional background is displayed (e.g., the size of the gap 601-G reduces in accordance with the movement of the electronic document in direction 624). The translation of the respective portion of the electronic document in the second direction continues until the portion of the area (e.g., 601-G) is completely removed, as shown in FIG. 6F. Optionally, the respective portion of the electronic document is translated in the second direction upon the detection of the end of the input at a speed faster than a speed of the translation of the respective portion of the electronic document in the first direction in accordance with the input.

It should be understood that the particular order in which the operations in FIGS. 8A-8C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 800 described above with respect to FIGS. 8A-8C. For example, the inputs, translation behaviors of the electronic document, translation behaviors of various objects of different types contained in the electronic document (e.g., objects of the first type, second type, third type and/or fourth type), visual effects and behavior control of the electronic document relative to those of the objects, described above with reference to method 800 optionally have one or more of the characteristics of the inputs, translation behaviors of the electronic document, translation behaviors of various objects of different types contained in the electronic document (e.g., objects of the first type, second type, third type and/or fourth type), visual effects and behavior control of the electronic document relative to those of the objects described herein with reference to other methods described herein (e.g., method 700). For brevity, these details are not repeated here.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

Figure 10:
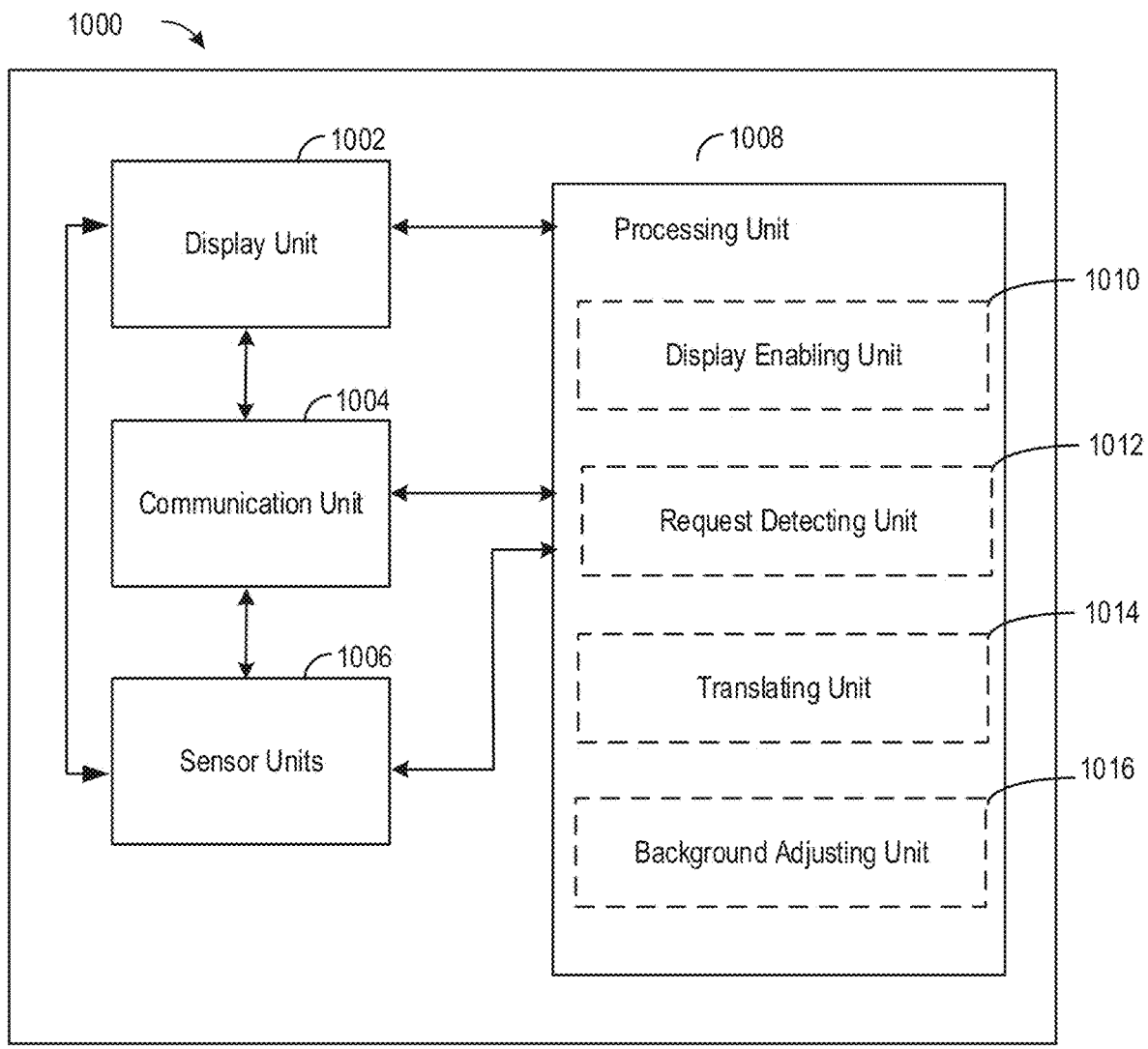
FIG. 10 is a functional block diagram of an electronic device according to various embodiments of the disclosure.

The operations described above with reference to FIGS. 8A-8C are, optionally, implemented by components depicted in FIGS. 1A-1B and 10. For example, detection operations 804 and 808, displaying operation 802, and translating operations 806 and 810 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B and 10.

FIG. 9 shows exemplary functional blocks of an electronic device 900 that, in some examples, perform the features described above. The functional blocks of the device are, optionally, implemented by hardware, software, or a combination of hardware and software to carry out the principles of the various described embodiments. It is understood by persons of skill in the art that the functional blocks described in FIG. 9 are, optionally, combined or separated into sub-blocks to implement the principles of the various described embodiments. Therefore, the description herein optionally supports any possible combination or separation or further definition of the functional blocks described herein.

As shown in FIG. 9, an electronic device 900 optionally includes a display unit 902 configured to display an electronic document in a window, a communication unit 904 configured to communicate with an external device (e.g., to receive the electronic document, and/or receive any further information about the background of the electronic document, etc.); one or more sensor units 906 configured to detect an input that corresponds to a request to translate the electronic document; and a processing unit 908 coupled to display unit 902, communication unit 904, and sensor units 906. Optionally, processing unit 908 is configured to display, in a window on display unit 902, an electronic document that comprises a content boundary, one or more objects of different types (e.g., first-type, second-type, third-type and fourth-type), and a background, using display enabling unit 910.

Optionally, processing unit 908 is configured to recognize that the detected input corresponds to a request to translate the electronic document in a first direction, using request detecting unit 912. Optionally, processing unit 908 is configured to translate a respective portion of the electronic document as requested in accordance with the detected input, using translating unit 914. Optionally, processing unit 908 is configured to generate an additional background to be displayed in all or part of the gap area between the content boundary and the edge of the window as the input causes the content boundary to be pulled inside the edge of the window (e.g., FIGS. 5D, 5I, 5N, 5R, 6D, 6J).

Optionally, the device displays, on display unit 902, an electronic document on a display, using display enabling unit 910. Optionally, the electronic document (e.g., electronic document 505, 535 and 555 in FIGS. 5A-5T) comprises a first object (e.g., object 510 of a first type in electronic document 505) and a content boundary (e.g., top content boundary 505-a of electronic document 505, top content boundary 535-a of electronic document 535, top content boundary 555-a of electronic document 555, right-side content boundary 505-c of electronic document 505). Optionally, the electronic document is displayed in a window (e.g., 504 in FIG. 5A) that comprises a URL bar (e.g., 507 in FIG. 5A), a menu bar (e.g., 508 in FIG. 5A) and/or a content window (e.g., 506 in FIG. 5A) for displaying the content of the electronic document.

Optionally, while the device displays the electronic document in a window displayed on the display, the device detects an input provided by a user, using sensor units 906 (e.g., contact 520-a followed by movement 522 in FIG. 5A, contact 540-a followed by movement 542 in FIG. 5G, contact 560 followed by movement 562 in FIG. 5L, contact 580 followed by movement 582 in FIG. 5Q), and determines that such input corresponds to a request to translate the electronic document in a first direction, using request detecting unit 912. Optionally, the device detects using sensor units 906 an input that includes a stylus input, a mouse input, a hand-motion input, a face-motion input, an eye-movement input, and/or other bodily part motion input, and determines using request detecting unit 912 that the detected input corresponds to a request to scroll the electronic document in the first direction. Optionally, the device determines using request detecting unit 912 that the first direction in which the scroll of the electronic document is requested is the same direction in which the finger is moved (e.g., directions 522, 542, 562, and 582). Optionally, the device determines using request detecting unit 912 that the first direction in which the scroll of the electronic document is requested is not the same direction in which the finger is moved or any other scroll input is applied (e.g., a user swipes to the left which is interpreted as a request to scroll the electronic document to the right, etc.).

Optionally, in response to detecting the input that corresponds to a request to translate the electronic document in the first direction, the device translates a respective portion of the electronic document (e.g., content boundary, background of the electronic document) in the first direction in accordance with the detected input without translating the first object, using translating unit 914 (e.g., in 5A-5E, as the electronic document is translated in the downward direction in accordance with the detected finger movement 520-a to 520-d on the display, the object 510 of the first type is not translated and remains stationary). If the input continues to be detected, the translation of the respective portion is also continued by translating unit 914, so that the first object (e.g., object 510) is outside the content boundary (e.g., 505-a) of the electronic document on the display (e.g., as the content boundary 505-a is pulled inside window edge 506-a, the object 510 is outside the content boundary as shown in FIG. 5D).

Optionally, translating unit 914 causes the device to translate the respective portion of the electronic document in the first direction in accordance with the input by translating in a linear relationship with the detected input until the content boundary of the electronic document reaches the edge of the window (e.g., the translation is in a linear relationship with the finger movement 520-a to 520-c until the content boundary 505-a reaches window edge 506-a in FIGS. 5A-5C) and translating the respective portion of the electronic document in the first direction in a non-linear relationship with the detected input after the content boundary has reached the edge of the window and as the content boundary is pulled inside the edge of the window (e.g., the translation is in a non-linear relationship with the finger movement 520-c to 520-d in FIG. 5D).

Optionally, translating unit 914 causes the device to translate the respective portion of the electronic document in the first direction in a linear relationship with the detected input by an amount that is proportional to the distance moved by the finger on the touch-sensitive display. For example, in FIG. 5B, the distance moved by the finger from 520-*a* to 520-*b* is proportional to the amount of the translations of the electronic document 505 (e.g., the amount moved by objects 514 and 512). In FIG. 5C, the distance moved by the finger from 520-*b* to 520-*c* is proportional to the amount of the translation of the electronic document 505 (e.g., the amount moved by objects 514 and 512).

Optionally, translating unit 914 causes the device to translate the respective portion of the electronic document in the first direction in a non-linear relationship with the detected scroll input by an amount that has a non-linear relationship with the distance moved by the finger on the touch-sensitive display. For example, in FIG. 5D, the distance moved by the finger from 520-*c* to 520-*d* has a non-linear relationship with the amount of the translation of the electronic documents (e.g., the amount moved by objects 514 and 512).

Optionally, translating unit 914 causes the first object (e.g., object 510 in FIGS. 5A-5F) to be fixed relative to the edge(s) of the window (e.g., 506-*a*) and remain stationary while the respective portion of the electronic document is translated (e.g., FIGS. 5A-5F). Optionally, translating unit 914 causes the device to translate the respective portion of the electronic document without translating the first object so that a portion of the electronic document is passed under the first object (e.g., in FIG. 5A-5F, the electronic background 505 is translated up and down, and a portion of the electronic documents that becomes directly under the first object as the document is translated is passed under the first object). The first object remains stationary as the respective portion of the electronic document is translated in the second direction after the end of the input is detected (e.g., in FIGS. 5E and 5F, the first-type object 510 remains stationary as the respective portion of the electronic document is translated in the upward direction after the liftoff of the finger is detected).

Optionally, the electronic document further comprises a second object (e.g., object 530 of a second type in electronic document 535 in FIGS. 5G-5K), and translating unit 914 causes the device to translate the respective portion of the electronic document (e.g., 535) in the first direction in accordance with the detected scroll input (e.g., contact movement from 540-*a* to 540-*b* in FIG. 5H) by maintaining the second object stationary until the content boundary reaches the edge of the window (e.g., in FIG. 5H, the second-type object 530 remains stationary while the electronic document until the content boundary 535-*a* reaches window edge 506-*a*). Optionally, translating unit 914 causes the device to translate the respective portion of the electronic document in a non-linear relationship with the input as the content boundary of the electronic document is pulled inside the edge of the window by translating the second object with the electronic document in the non-linear relationship with the input (e.g., in FIG. 5I, the second-type object 530 moves down with the electronic document in a non-linear relationship with the contact movement from 540-*b* to 540-*c*). The second object is translated with the respective portion of the electronic document as the respective portion of the electronic document is translated in the second direction after the end of the input is detected (e.g., in FIGS. 5J and 5K, the second-type object 530 is translated in the upward direction with the respective portion of the electronic document after the liftoff of the contact is detected).

Optionally, the electronic document further comprises a third object (e.g., objects 512 and 514 of a third type in electronic documents 505, 535 and 555 in FIGS. 5A-5T), and translating unit 914 causes the device to translate the respective portion of the electronic document in the first direction in accordance with the detected input by translating the third object e.g., objects 512 and 514) with the respective portion of the electronic document in the first direction in a linear relationship with the input until the content boundary of the electronic document reaches the edge of the window. The translating unit 914 also causes the device to translate the respective portion of the electronic document in the first direction in accordance with the detected input by translating the third object with the respective portion of the electronic document in the first direction in a non-linear relationship with the input after the content boundary has reached the edge of the window and as the content boundary is pulled inside the edge of the window. For example, the third objects (e.g., objects 512 and 514 of the third type) are fixed relative to the edges of the electronic document (e.g., content boundaries of the electronic documents) so that they move along with the movement of the respective portion of the electronic document.

Optionally, the electronic document further comprises a fourth object (e.g., object 550 of a fourth type in electronic document 555 in FIGS. 5L-5P), and translating unit 914 causes the device to translate the respective portion of the electronic document (e.g., 555) in the first direction in accordance with the detected input (e.g., contact movement from 560-*a* to 560-*b* in FIG. 5M), by translating the fourth object (e.g., object 550) with the respective portion of the electronic document as the respective portion of the electronic document is translated in a linear relationship with the input until the content boundary of the electronic document (e,g., 555-*a*) reaches the edge of the window (e.g., 506-*a*). The translating unit 914 causes the device to maintain the fourth object stationary when the respective portion of the electronic document (e.g., 555) is translated in a non-linear relationship with the input (e.g., contact movement from 560-*b* to 560-*c* in FIG. 5N) as the content boundary of the electronic document is pulled inside the edge of the window. The fourth object remains stationary even if that means the fourth object (e.g., 550) is pulled out of the content boundary (e.g., 555-*a* in FIG. 5N). The fourth object remains stationary as the respective portion of the electronic document is translated in the second direction after the end of the input is detected (e.g., in FIGS. 5O and 5P, the fourth-type object 550 remains stationary as the respective portion of the electronic document 555 is translated in the upward direction with objects 512 and 530 after the liftoff of the contact is detected).

Optionally, the device detects an end of the input (e.g., a lift off of the finger contact in FIGS. 5E, 5J, 5O and 5S) using sensor units 906 and recognizes that the detected state represents an end of the translation request, using request detecting unit 912. In response to detecting the end of the input, the device translates, using the translation unit 914, the respective portion of the electronic document in a second direction different from the first direction without translating the first object (e.g., object 510 of the first type in FIGS. 5E and 5S). Optionally, the translating unit 914 causes the electronic document to be translated in the second direction until the content boundary (e.g., 505-*a* in FIG. 5E, 535-*a* in FIG. 5J, 555-*a* in FIG. 5O and 505-*c* in FIG. 5S) reaches the respective edge of the window (e.g., 506-*a* in FIGS. 5E, 5J and 5O and 506-*c* in FIG. 5S). In FIGS. 5E and 5S, the electronic document is translated in the second direction so that the first object (e.g., object 510) is back within the content boundary (e.g., 505-*a* in FIG. 5E and 505-*c* in FIG. 5S). Optionally, the second direction (e.g., 524, 544, 564, 584 FIGS. 5E, 5J, 5O and 5S) is opposite the first direction (e.g., 522. 542, 562. 584 FIGS. 5E, 5J, 5O and 5S). Optionally, the respective portion of the electronic document is translated in the second direction at a speed faster than a speed of the translation of the respective portion of the electronic document in the first direction in accordance with the input.

It should be noted that details of other functions described herein with respect to other devices and functions blocks of the other devices described herein (e.g., device 1000 and its functional blocks) are also applicable in an analogous manner to device 900 described above with respect to FIG. 9. For example, processing unit 908, display enabling unit 910, request detecting unit 912, translating unit 914 and background adjusting unit 916, described above with reference to device 900 optionally have one or more of the characteristics of the processing unit 1008, display enabling unit 1010, request detecting unit 1012, translating unit 1014 and background adjusting unit 1016, described herein with reference to other devices described herein (e,g., device 1000). For brevity, these details are not repeated here.

FIG. 10 shows exemplary functional blocks of an electronic device 1000 that, in some examples, perform the features described above. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 1000 optionally includes a display unit 1002 configured to display an electronic document in a window, a communication unit 1004 configured to communicate with an external device (e.g., to receive the electronic document, and/or receive any further information about the background of the electronic document, etc.); one or more sensor units 1006 configured to detect an input that corresponds to a request to translate the electronic document; and a processing unit 1008 coupled to display unit 1002, communication unit 1004, and sensor units 1006. Optionally, processing unit 908 is configured to display, in a window on display unit 1002, an electronic document that comprises a content boundary, one or more objects of different types (e.g., first-type, second-type, third-type and fourth-type), and a background, using display enabling unit 1010.

In some embodiments, the device 1000 displays, in a window of display 1002, an electronic document (e.g., 601 in FIG. 6A and 607 in FIG. 6G) comprising a background (e.g., 612 in FIG. 6A and 670 in FIG. 6G) and a content boundary (e.g., 601-a in FIG. 6A and 607-a in FIG. 6G), using display enabling unit 1010.

Optionally, while the device displays the electronic document in the window (e.g., window 604 including a URL bar, a menu bar, and/or content window 606), the device detects, using sensor units 1006, an input provided by a user (e.g., in FIG. 6A, the initial finger contact with the touch-sensitive display at 620 followed by continuous movement of the contact 622, and in FIG. 6G, the initial finger contact with the touch-sensitive display at 640 followed by continuous movement of the contact 642), and determines, using request detecting unit 1012, that the detected input corresponds to a request to translate the electronic document in a first direction. Optionally, the device detects, using sensor units 1006, an input that includes a stylus input, a mouse input, a hand-motion input, a face-motion input, an eye-movement input, and/or other bodily part motion input, and determines using request detecting unit 1012 that the detected input corresponds to a request to scroll the electronic document in the first direction. Optionally, the device determines using request detecting unit 1012 that the first direction in which the scroll of the electronic document is requested is the same direction in which the finger is moved (e.g., directions 622 and 642). Optionally, the device determines using request detecting unit 1012 that the first direction in which the scroll of the electronic document is requested is not the same direction in which the finger is moved or any other scroll input is applied (e.g., a user swipes to the left which is interpreted as a request to scroll the electronic document to the right, etc.), Optionally, in response to detecting the input that corresponds to a request to translate the electronic document in the first direction, the device translates the electronic document in the first direction in accordance with the detected input without translating the first object, using translating unit 1014. In accordance with the input, translating unit 1014 causes the content boundary of the electronic document to be pulled inside the edge of the window (e.g., in FIG. 6B, the electronic document 601 is translated in accordance with the finger movement from 620-a to 620-b so that the top content boundary 601-a reaches the top edge of the content window 606-a, and continues to be translated in accordance with the further movement of the finger from 620-b to 620-c so that the content boundary 601-a is pulled inside window edge 606-a, as shown in FIG. 6C).

Optionally, in conjunction with translating the respective portion of the electronic document so that the content boundary is pulled inside the edge of the window, the device displays an additional background in at least a portion of an area (e.g.,601-G in FIG. 6D and 607-G in FIG. 6J) between the pulled content boundary and the edge of the window, using background adjusting unit 1016. Optionally, the background adjusting unit 1016 causes the one or more attributes of the additional background to match the corresponding one or more attributes of the background of the electronic document (e.g., in FIG. 6D the pattern and color of the additional background displayed in 601-G match the pattern and color of the original background 612 of the electronic document 601, and in FIG. 6J, the pattern and color of the additional background displayed in 601-G match the pattern and color of the original background 670 of the electronic document 607). Optionally, the background adjusting unit 1016 causes the one or more attributes of the background that are to be matched in the additional background include at least one of a pattern, an orientation, an image, a resolution, a gradient, a shading, a transparency, a size, etc. Optionally, the background adjusting unit 1016 causes the additional background to be generated based on a replication and/or extrapolation of the one or more attributes of the original background.

Optionally, the device generates the additional background using background adjusting unit 1016 based on the one or more attributes of the original background of the electronic document prior to displaying the additional background in at least the portion of the area (e.g., 601-G in FIG. 6D and 607-G in FIG. 6J) between the content boundary and the edge of the window. Optionally, the device generates the additional background using background adjusting unit 1016 prior to detecting the scroll input that would cause the content boundary to be pulled inside the edge of the window (before the gap area 601-G in FIG. 6D and 607-G in FIG. 6J is created), or after detecting such scroll input.

Optionally, when the device translates the respective portion of the electronic document in the first direction in accordance with the input using translating unit 1014, the translating unit 1014 causes the device to translate the respective portion of the electronic document in the first direction in a linear relationship with the detected input (e.g., contact movement from 620-*a* to 620-*b* in FIG. 6B, and contact movement from 640-*a* to 640-*b* in FIG. 6I) until the content boundary (e.g., 601-*a* in FIG. 6B, and 607-*a* in FIG. 6I) reaches the edge of the window (e.g., 606-*a*). The translating unit 1014 then causes the device to translate the respective portion of the electronic document in the first direction in a non-linear relationship with the detected input as the content boundary (e.g., 601-*a* in FIGS. 6C and 6D, and 607-*a* in FIG. 6J) is pulled inside the edge of the window (e.g., 606-*a*).

Optionally, while the electronic document is translated in the first direction in the non-linear relationship with the detected input, background adjusting unit 1016 causes the additional background to be displayed in all or at least a portion of the area between the content boundary and the edge of the window (e.g., gap area 601-G in FIG. 6D and gap area 607-G in FIG. 6J). The background adjusting unit 1016 causes the size of the portion of the area where the additional background is displayed to increase as the content boundary of the electronic document continues to be pulled further inside the edge of the window.

Optionally, the electronic document comprises a first object (e.g., object 510 in FIGS. 6A-6L), and the translating unit 1012 causes the first object to remain stationary while the electronic document is translated in the first direction in accordance with the detected scroll input or translated in the second direction after the release of the contact that provided the scroll input. Optionally, while the electronic document is translated without moving the first object, the translating unit 1014 causes a portion of the electronic document to be passed under the first object, and sometimes, the content boundary is slid under the first object so that the first object is pulled out of the content boundary (as shown in FIGS. 6D and 6J). Optionally, the translating unit 1014 causes the portion of the electronic document that is passed under the first object to be at least partially visible through the first object from underneath.

Optionally, the background adjusting unit 1016 causes a respective portion of the window (e.g., menu bar 680 in FIGS. 6G-6L) to change a visual appearance on the display during the scroll movement of the electronic document. Optionally, the background adjusting unit 1016 causes the respective portion of the window to be not transparent (e.g., opaque, or having a low or no transparency) to either the electronic background or the additional background before the device detects the scroll input (e.g., FIG. 6G). Optionally, after the device detects the input and as the respective portion of the electronic document starts moving in the first direction, the background adjusting unit 1016 causes the respective portion of the window (e.g., the menu bar 680 in FIG. 6H) to become transparent to the electronic document but not transparent to the additional background. Optionally, while the content boundary of the electronic document (e.g., an edge of the electronic document 607-*a* in FIGS. 6I and 6J) has been translated under the respective portion of the window in accordance with the input (e.g., contact movement from 640-*a* to 640-*b* in FIG. 6I and to 640-*c* in FIG. 6J), the background adjusting unit 1016 causes the respective portion of the window (e.g., menu bar 680) to be displayed with an adjusted visual appearance based on an appearance of the electronic document (e.g., 607) including the background (e.g., 670) of the electronic document. The adjusted visual appearance of the respective portion of the window creates a visual illusion that there is an additional background under the respective portion of the window that is at least partially seen through the respective portion of the window from underneath (e.g., menu bar 680 in FIGS. 6H-6J). For example, in FIG. 6J, the actual additional background is only displayed in the gap area 607-G, and not in the area directly under the menu bar 680, however, the visual effect of the adjusted appearance of the menu bar 680 creates an illusion that the additional background extends into the area under the menu bar 680.

Optionally, while the content boundary of the electronic document (e.g., 607-*a*) that was adjacent the actual additional background (e.g., in 607-G in FIG. 6K) is adjacent to the respective portion of the window (e.g., 680) such that the electronic document is not scrolled under the respective portion of the window (e.g., FIG. 6L), the background adjusting unit 1016 causes the device to display the respective portion of the window (e.g., 680) without adjustment for the appearance of the additional background (e.g., menu bar 680 in FIG. 6L). For example, the content boundary 607-*a* that was previously adjacent the gap 607-G in FIG. 6K is moved in the upward direction (e.g., 644) after detection of the end of the input, and the content boundary is adjacent to the respective portion of the window after the restoration behavior of the electronic document is complete after the end of the input (e.g., in FIG. 6L, content boundary 607-*a* is adjacent to the menu bar 680, and the gap area 607-G is removed). Optionally, the respective portion of the electronic document (e.g., menu bar 680) has a first value of transparency prior to the detection of the input (e.g., FIG. 6G), and has a second value of transparency higher than the first value after the detection of the input (e.g., FIGS. 6H-6K) during the input-based translation and restoration translation upon the end of the input. Optionally, after the input-based translation and restoration translation of the respective portion of the electronic document is complete, the respective portion of the window (e.g., menu bar 680) has the first transparency value (e.g., FIG. 6L).

Optionally, the device detects an end of the input (e.g., a liftoff of the contact from the display) using sensor units 1006, and determines that the detected state corresponds to an end of the request using request detecting unit 1012. In response to detecting the end of the input, the device translates, using translation unit 1014, the respective portion of the electronic document in the second direction opposite the first direction until the content boundary of the electronic document reaches the edge of the window. For example, in FIG. 6E, upon detecting the liftoff of the contact from the display at 620-*c*, the respective portion of the electronic document 601 is translated in the second direction 624 opposite the first direction 622 until the content boundary 601-*a* reaches window edge 606-*a*. This restoration translation of the respective portion of the electronic document 601 in the second direction 624 causes a reduction in size of the gap area in which the additional background is displayed (e.g., the size of the gap 601-G reduces in accordance with the movement of the electronic document in direction 624), and the restoration translation continues until the gap area (e.g., 601-G) is removed completely (FIG. 6F). Similarly, in FIG. 6K, upon detecting the liftoff of the contact from the display at 640-*c*, the translation unit 1014 causes the respective portion of the electronic document 607 to be translated in the second direction 644 opposite the first direction 642 until the content boundary 607-*a* reaches window edge 606-*a*. This restoration translation of the respective portion of the electronic document 607 in the second direction 644 causes a reduction in size of the gap area in which the additional background is displayed (e.g., the size of the gap 607-G reduces in accordance with the movement of the electronic document in direction 644), and the restoration translation continues until the gap area (e.g., 601-G) is removed completely (FIG. 6L). Optionally, the respective portion of the electronic document is translated in the second direction, upon the detection of the end of the input that performed the scroll, at a speed faster than a speed at which the respective portion of the electronic document was previously translated in the first direction in accordance with the scroll input.

It should be noted that details of other functions described herein with respect to other devices and functions blocks of the other devices described herein (e.g., device 900 and its functional blocks) are also applicable in an analogous manner to device 1000 described above with respect to FIG. 10. For example, processing unit 1008, display enabling unit 1010, request detecting unit 1012, translating unit 1014 and background adjusting unit 1016, described above with reference to device 1000 optionally have one or more of the characteristics of the processing unit 908, display enabling unit 910, request detecting unit 912, translating unit 914 and background adjusting unit 916, described herein with reference to other devices described herein (e.g., device 900). For brevity, these details are not repeated here.

Although examples of this disclosure have been described with reference to the accompanying drawings, it is to be noted that various changes and modifications will become apparent to those skilled in the art Such changes and modifications are to be understood as being included within the scope of examples of this disclosure as defined by the appended claims.

The invention claimed is:

1. An electronic device, comprising:
a display;
one or more processors; and
memory storing one or more programs configured to be executed by the one or more processors, the one or more programs including instructions for:
displaying, on the display, an electronic document comprising a first object and a content boundary;
while displaying the electronic document, detecting an input corresponding to a request to translate the electronic document in a first direction;
in response to detecting the input corresponding to a request to translate the electronic document, translating a respective portion of the electronic document in the first direction in accordance with the detected input without translating the first object, so that the first object is outside of the content boundary of the electronic document, wherein the first object is positioned in an area outside of the content boundary of the electronic document that includes an additional background, and wherein one or more attributes of the additional background matches corresponding one or more attributes of a background of the electronic document;
after translating the respective portion of the electronic document without translating the first object, detecting an end of the input; and
in response to detecting the end of the input, translating the respective portion of the electronic document in a second direction different from the first direction without translating the first object, so that the first object is within the content boundary of the electronic document.

2. The electronic device of claim 1, wherein translating the respective portion of the electronic document in the first direction in accordance with the detected input comprises:
translating the respective portion of the electronic document in the first direction in a linear relationship with the detected input until the content boundary of the electronic document reaches an edge of a window displaying the electronic document; and
translating the respective portion of the electronic document in the first direction in a non-linear relationship with the detected input as the content boundary of the electronic document is pulled inside the edge of the window.

3. The electronic device of claim 2, wherein:
the display is a touch-sensitive display;
the detected input comprises movement of a finger on the touch-sensitive display;
translating the respective portion of the electronic document in the first direction in a linear relationship with the detected input comprises translating the electronic document in the first direction by an amount that is proportional to the distance moved by the finger on the touch-sensitive display; and
translating the respective portion of the electronic document in the first direction in a non-linear relationship with the detected input comprises translating the electronic document in the first direction by an amount that has a non-linear relationship with the distance moved by the finger on the touch-sensitive display.

4. The electronic device of claim 2, wherein:
the electronic document further comprises a second object; and
translating the respective portion of the electronic document in the first direction in accordance with the detected input comprises:
maintaining the second object stationary until the content boundary of the electronic document reaches the edge of the window displaying the electronic document; and
translating the second object with the respective portion of the electronic document in the first direction in the non-linear relationship with the detected input as the content boundary of the electronic document is pulled inside the edge of the window.

5. The electronic device of claim 2, wherein:
the electronic document further comprises a third object; and
translating the respective portion of the electronic document in the first direction in accordance with the detected input comprises:
translating the third object with the respective portion of the electronic document in the first direction in the linear relationship with the detected input until the content boundary of the electronic document reaches the edge of the window; and
translating the third object with the respective portion of the electronic document in the first direction in the non-linear relationship with the detected input as the content boundary of the electronic document is pulled inside the edge of the window.

6. The electronic device of claim 2, wherein:
the electronic document further comprises a fourth object; and translating the respective portion of the electronic document in the first direction in accordance with the detected input comprises:
   translating the fourth object with the respective portion of the electronic document in the first direction in the linear relationship with the detected input until the content boundary of the electronic document reaches the edge of the window; and
   maintaining the fourth object stationary as the content boundary of the electronic document is pulled inside the edge of the window.

7. The electronic device of claim 1, wherein the first object is fixed relative to t edge of the window displaying the electronic document.

8. The electronic device of claim 1, wherein:
   translating the respective portion of the electronic document in the first direction in accordance with the detected input without translating the first object comprises passing a portion of the electronic document under the first object.

9. The electronic device of claim 1, wherein the second direction is opposite the first direction.

10. The electronic device of claim 1, wherein the one or more programs further include instructions for:
   in response to detecting the end of the input, translating the respective portion of the electronic document in the second direction at a speed faster than a speed of the translation of the respective portion of the electronic document in the first direction in accordance with the detected input.

11. The electronic device of claim 1, wherein the one or more programs further include instructions for:
   in response to detecting the end of the input, translating the respective portion of the electronic document in the second direction until the content boundary of the electronic document reaches the edge of the window.

12. A non-transitory computer readable storage medium storing one or more programs, the one or more programs configured to be executed by one or more processors of an electronic device with a display, the one or more programs including instructions for:
   displaying, on the display, an electronic document comprising a first object and a content boundary;
   while displaying the electronic document, detecting an input corresponding to a request to translate the electronic document in a first direction;
   in response to detecting the input corresponding to a request to translate the electronic document, translating a respective portion of the electronic document in the first direction in accordance with the detected input without translating the first object, so that the first object is outside of the content boundary of the electronic document, wherein the first object is positioned in an area outside of the content boundary of the electronic document that includes an additional background, and wherein one or more attributes of the additional background matches corresponding one or more attributes of a background of the electronic document;
   after translating the respective portion of the electronic document without translating the first object, detecting an end of the input; and
   in response to detecting the end of the input, translating the respective portion of the electronic document in a second direction different from the first direction without translating the first object, so that the first object is within the content boundary of the electronic document.

13. The non-transitory computer readable storage medium of claim 12, wherein translating the respective portion of the electronic document in the first direction in accordance with the detected input comprises:
   translating the respective portion of the electronic document in the first direction in a linear relationship with the detected input until the content boundary of the electronic document reaches an edge of a window displaying the electronic document; and
   translating the respective portion of the electronic docmuent in the first direction in a non-linear relationship with the detected input as the content boundary oche electronic document is pulled inside the edge of the window.

14. The non-transitory computer readable storage medium of claim 13, wherein:
   the display is a touch-sensitive display;
   the detected input comprises movement of a finger on the touch-sensitive display;
   translating the respective portion of the electronic document in the first direction in a linear relationship with the detected input comprises translating the electronic document in the first direction by an amount that is proportional to the distance moved by the finger on the touch-sensitive display; and
   translating the respective portion of the electronic document in the first direction in a non-linear relationship with the detected input comprises translating the electronic document in the first direction by an amount that has a non-linear relationship with the distance moved by the finger on the touch-sensitive display.

15. The non-transitory computer readable storage medium of claim 13, wherein:
   the electronic document further comprises a second object; and
   translating the respective portion of the electronic document in the first direction in accordance with the detected input comprises:
      maintaining the second object stationary until the content boundary of the electronic document reaches the edge of the window displaying the electronic document; and
      translating the second object with the respective portion of the electronic document in the first direction in the non-linear relationship with the detected. input as the content boundary of the electronic document is pulled inside the edge of the window.

16. The non-transitory computer readable storage medium of claim 13, wherein:
   the electronic document further comprises a third object; and
   translating the respective portion of the electronic document in the first direction in accordance with the detected input comprises;
      translating the third object with the respective portion of the electronic document in the first direction in the linear relationship with the detected input until the content boundary of the electronic document reaches the edge of the window; and
      translating the third object with the respective portion of the electronic document in the first direction in the non-linear relationship with the detected input as the content boundary of the electronic document is pulled inside the edge of the window.

17. The non-transitory computer readable storage medium of claim 13, wherein:
the electronic document further comprises a fourth object; and
translating the respective portion of the electronic document in the first direction in accordance with the detected input comprises:
translating the fourth object with the respective portion of the electronic document in the first direction in the linear relationship with the detected input until the content boundary of the electronic document reaches the edge of the window; and
maintaining the fourth object stationary as the content boundary of the electronic document is pulled inside the edge of the window.

18. The non-transitory computer readable storage medium of claim 12, wherein the first object is fixed relative to the edge of the window displaying the electronic document.

19. The non-transitory computer readable storage medium of claim 12, wherein:
translating the respective portion of the electronic document in the first direction in accordance with the detected input without translating the first object comprises passing a portion of the electronic document under the first object.

20. The non-transitory computer readable storage medium of claim 12, wherein the second direction is opposite the first direction.

21. The non-transitory computer readable storage medium of claim 12, wherein the one or more programs further include instructions for:
in response to detecting the end of the input, translating the respective portion of the electronic document in the second direction at a speed faster than a speed of the translation of the respective portion of the electronic document in the first direction in accordance with the detected input.

22. The non-transitory computer readable storage medium of claim 12, wherein the one or more programs further include instructions for:
in response to detecting the end of the input, translating the respective portion of the electronic document in the second direction until the content boundary of the electronic document reaches the edge of the window.

23. A method, comprising:
at an electronic device with a display:
displaying, on the display, an electronic document comprising a first object and a content boundary;
while displaying the electronic document, detecting an input corresponding to a request to translate the electronic document in a first direction;
in response to detecting the input corresponding to a request to translate the electronic document, translating a respective portion of the electronic document in the first direction in accordance with the detected input without translating the first object, so that the first object is outside of the content boundary of the electronic document, wherein the first object is positioned in an area outside of the content boundary of the electronic document that includes an additional background, and wherein one or more attributes of the additional background matches corresponding one or more attributes of a background of the electronic document;
after translating the respective portion of the electronic document without translating the first object, detecting an end of the input; and
in response to detecting the end of the input, translating the respective portion of the electronic document in a second direction different from the first direction without translating the first object, so that the first object is within the content boundary of the electronic document.

24. The method of claim 23, wherein translating the respective portion of the electronic document in the first direction in accordance with the detected input comprises:
translating the respective portion of the electronic document in the first direction in a linear relationship with the detected input until the content boundary of the electronic document reaches an edge of a window displaying the electronic document; and
translating the respective portion of the electronic document in the first direction in a non-linear relationship with the detected input as the content boundary of the electronic document is pulled inside the edge of the window.

25. The method of claim 24, wherein:
the display is a touch-sensitive display;
the detected input comprises movement of a finger on the touch-sensitive display;
translating the respective portion of the electronic document in the first direction in a linear relationship with the detected input comprises translating the electronic document in the first direction by an amount that is proportional to the distance moved by the finger on the touch-sensitive display; and
translating the respective portion of the electronic document in the first direction in a non-linear relationship with the detected input comprises translating the electronic document in the first direction by an amount that has a non-linear relationship with the distance moved by the finger on the touch-sensitive display.

26. The method of claim 24, wherein:
the electronic document further comprises a second object; and
translating the respective portion of the electronic document in the first direction in accordance with the detected input comprises:
maintaining the second object stationary until the content boundary of the electronic document reaches the edge of the window displaying the electronic document; and
translating the second object with the respective portion of the electronic document in the first direction in the non-linear relationship with the detected input as the content boundary of the electronic document is pulled inside the edge of the window.

27. The method of claim 24, wherein:
the electronic document further comprises a third object; and
translating the respective portion of the electronic document in the first direction in accordance with the detected input comprises:
translating the third object with the respective portion of the electronic document in the first direction in the linear relationship with the detected input until the content boundary of the electronic document reaches the edge of the window; and
translating the third object with the respective portion of the electronic document in the first direction in the non-linear relationship with the detected input as the content boundary of the electronic document is pulled inside the edge of the window.

28. The method of claim 24, wherein:

the electronic document further comprises a fourth object; and translating the respective portion of the electronic document in the first direction in accordance with the detected input comprises:

translating the fourth object with the respective portion of the electronic document in the first direction in the linear relationship with the detected input until the content boundary of the electronic document reaches the edge of the window; and maintaining the fourth object stationary as the content boundary of the electronic document is pulled inside the edge of the window.

29. The method of claim 23, wherein the first object is fixed relative to the edge of the window displaying the electronic document.

30. The method of claim 23, wherein:

translating the respective portion of the electronic document in the first direction in accordance with the detected input without translating the first object comprises passing a portion of the electronic document under the first object.

31. The method of claim 23, wherein the second direction is opposite the first direction.

32. The method of claim 23, further comprising:

in response to detecting the end of the input, translating the respective portion of the electronic document in the second direction at a speed faster than a speed of the translation of the respective portion of the electronic document in the first direction in accordance with the detected input.

33. The method of claim 23, further comprising:

in response to detecting the end of the input, translating the respective portion of the electronic document in the second direction until the content boundary of the electronic document reaches the edge of the window.

\* \* \* \* \*

UNITED STATES PATENT AND TRADEMARK OFFICE
CERTIFICATE OF CORRECTION

PATENT NO. : 11,644,966 B2
APPLICATION NO. : 17/509563
DATED : May 9, 2023
INVENTOR(S) : Beth Dakin et al.

Page 1 of 1

It is certified that error appears in the above-identified patent and that said Letters Patent is hereby corrected as shown below:

In the Claims

Column 69, Line 14, delete "relative to t edge" and add --relative to the edge--.

Column 70, Line 13-14, delete "docmuent" and add --document--.

Column 70, Line 15, delete "oche" and add --of the--.

Column 70, Line 48, delete "detected. input" and add --detected input--.

Column 70, Line 57, delete "comprises;" and add --comprises:--.

Signed and Sealed this
Twentieth Day of August, 2024

Katherine Kelly Vidal
*Director of the United States Patent and Trademark Office*